(12) United States Patent
Komatsu et al.

(10) Patent No.: US 6,802,893 B1
(45) Date of Patent: Oct. 12, 2004

(54) INK FOR INK-JET RECORDING AND PROCESS FOR PRODUCING THE SAME, INK SET FOR INK-JET RECORDING, AND INK CARTRIDGE

(75) Inventors: Hidehiko Komatsu, Nagano (JP); Hiroto Nakamura, Nagano (JP); Masahiro Yatake, Nagano (JP); Hiroko Hayashi, Nagano (JP); Makoto Matsuzaki, Nagano (JP); Fumitsugu Ito, Nagano (JP); Hitoshi Ohta, Nagano (JP)

(73) Assignee: Seiko Epson Corporation, Toyko (JP)

( * ) Notice: Subject to any disclaimer, the term of this patent is extended or adjusted under 35 U.S.C. 154(b) by 56 days.

(21) Appl. No.: 09/762,722
(22) PCT Filed: Jun. 8, 2000
(86) PCT No.: PCT/JP00/03737
§ 371 (c)(1), (2), (4) Date: Apr. 11, 2001
(87) PCT Pub. No.: WO00/75245
PCT Pub. Date: Dec. 14, 2000

(30) Foreign Application Priority Data

| Jun. 9, 1999 | (JP) | 11/162106 |
| Jun. 9, 1999 | (JP) | 11/162107 |
| Jun. 9, 1999 | (JP) | 11/162108 |
| Jun. 9, 1999 | (JP) | 11/162675 |
| Jun. 10, 1999 | (JP) | 11/163781 |
| Jun. 10, 1999 | (JP) | 11/163783 |
| Feb. 23, 2000 | (JP) | 2000/46400 |

(51) Int. Cl.[7] .................................. C09D 11/02
(52) U.S. Cl. ............... 106/31.6; 106/31.86; 106/31.89
(58) Field of Search .................... 106/31.6, 31.86, 106/31.89

(56) References Cited

U.S. PATENT DOCUMENTS

| 2,083,372 A | 6/1937 | Guthmann | 134/29 |
| 3,291,580 A | 12/1966 | Malick | 44/53 |
| 5,156,675 A | 10/1992 | Breton et al. | 106/22 |
| 5,183,502 A | 2/1993 | Meichsner et al. | 106/22 |
| 5,196,056 A | 3/1993 | Prasad | 106/15.05 |
| 6,019,828 A * | 2/2000 | Rehman | 106/31.58 |
| 6,027,210 A * | 2/2000 | Kurabayashi et al. | 106/31.75 |
| 6,083,315 A * | 7/2000 | Nakamura et al. | 106/31.6 |
| 6,153,001 A * | 11/2000 | Suzuki et al. | 106/31.65 |
| 6,261,353 B1 * | 7/2001 | Doi et al. | 106/31.6 |
| 6,280,513 B1 * | 8/2001 | Osumi et al. | 106/31.6 |
| 6,332,919 B2 * | 12/2001 | Osumi et al. | 106/31.6 |

(List continued on next page.)

FOREIGN PATENT DOCUMENTS

| EP | 834537 | 4/1998 |
| EP | 851005 | 7/1998 |
| EP | 859037 | 8/1998 |
| EP | 0 872 344 A | 10/1998 |
| EP | 0 877 065 A | 11/1998 |
| JP | 56147861 | 11/1981 |
| JP | 115542 | 3/1989 |
| JP | 22907 | 1/1990 |
| JP | 23837 | 1/1990 |
| JP | 3157464 | 7/1991 |

(List continued on next page.)

Primary Examiner—Mark L. Bell
Assistant Examiner—Veronica F. Faison
(74) Attorney, Agent, or Firm—Ladas & Parry

(57) ABSTRACT

An ink for ink jet recording including at least a particulate pigment having a sulfur-containing dispersibility providing group chemically bonded to the pigment surface with a treatment containing sulfur, a penetrating agent and a liquid component including water. In one embodiment, the liquid component includes polyvalent metal ions and has a sulfur content that is 2,000 ppm or less as calculated in terms of $SO_4^{2-}$. In other embodiments, the ink has (a) a sulfonic acid anion group or a sulfinic acid anion group and an alkaline metal or monovalent counter ion; (b) a penetrating agent having the formula R—$EOn_2$—$POm_2$—X; and (c) a sulfur-containing dispersibility providing group in an amount of $10 \times 10^6$ equivalent or more per gram of particulate pigment.

47 Claims, 1 Drawing Sheet

U.S. PATENT DOCUMENTS

| | | | |
|---|---|---|---|
| 6,378,999 B1 * | 4/2002 | Doi et al. | 347/100 |
| 6,440,203 B2 * | 8/2002 | Kato | 106/31.6 |
| 6,454,846 B2 * | 9/2002 | Yatake | 106/31.58 |
| 6,524,383 B2 * | 2/2003 | Komatsu et al. | 106/493 |

FOREIGN PATENT DOCUMENTS

| | | |
|---|---|---|
| JP | 5202328 | 8/1993 |
| JP | 6106735 | 4/1994 |
| JP | 8283596 | 10/1996 |
| JP | 9111165 | 4/1997 |
| JP | 10110127 | 4/1998 |
| JP | 10110129 | 4/1998 |
| JP | 10204347 | 8/1998 |
| JP | 1149974 | 2/1999 |
| JP | 1149995 | 2/1999 |

* cited by examiner

INK FOR INK-JET RECORDING AND PROCESS FOR PRODUCING THE SAME, INK SET FOR INK-JET RECORDING, AND INK CARTRIDGE

TECHNICAL FIELD

The present invention relates to an ink for ink jet recording, a process for the preparation thereof, an ink set for ink jet recording, and an ink cartridge.

More particularly, the present invention relates to an ink for ink jet recording comprising at least a particulate pigment having a sulfur-containing dispersibility providing group chemically bonded to the surface thereof with a treatment containing sulfur, a penetrating agent, and water, characterized by the following aspects:

(a) An ink for ink jet recording wherein the sulfur content in the liquid component of the ink is kept to a predetermined level or less (hereinafter referred to as "first ink of the invention");

(b) An ink for ink jet recording wherein the amount of the sulfur-containing dispersibility providing group is kept to a predetermined value or more (hereinafter referred to as "second ink of the invention") and a process for the preparation thereof;

(c) An ink for ink jet recording wherein the sulfur-containing dispersibility providing group is a predetermined ion group and the cation as its counter ion is predetermined (hereinafter referred to as "third ink of the invention") and a process for the preparation thereof;

(d) An ink for ink jet recording comprising a specific preservative incorporated therein (hereinafter referred to as "fourth ink of the invention"); and (e) An ink for ink jet recording comprising a predetermined penetrating agent incorporated therein (hereinafter referred to as "fifth ink of the invention").

The present invention further relates to an ink set for ink jet recording comprising the foregoing first and second inks of the invention. The present invention still relates to an ink cartridge for ink jet recording apparatus.

BACKGROUND ART (Prior Art Concerning Ink)

As a colorant to be incorporated in an ink for ink jet recording there has heretofore been mainly used a dye. The use of a dye, which exhibits an excellent fastness, has recently been studied.

A pigment is superior to a dye in respect to fastness such as water resistance and light-resistance. However, since a pigment cannot be dissolved in water unlike a dye, it is important for pigment ink to allow the pigment to be finely dispersed in water in a stable manner. Further, when a penetrating agent is incorporated in a pigment ink for the purpose of enhancing the penetrating power of the ink, the dispersion stability of the particulate pigment is remarkably impaired, making it impossible to secure the ink with a desired storage stability.

As a method for rendering the surface of a particulate pigment wettable with water to prevent the agglomeration and precipitation of pigment particles, it has been practiced to disperse pigment particles in an aqueous solvent with a dispersant such as various surface active agents and aqueous resins. For examples, JP-A-3-157464 (The term "JP-A" as used herein means an "unexamined published Japanese patent application") gives a study of a pigment ink comprising an acetylene glycol-based penetrating agent incorporated therein wherein as a dispersant for particulate pigment there is used a polymer dispersant and as an aqueous medium there is used water, nonvolatile organic solvent or lower alcohol to secure the dispersion stability thereof. However, when a dispersant is thus used for particulate pigment, the preparation of the ink requires more factors, making it difficult to allow desired design of ink physical properties such as viscosity. With this pigment ink, too, the foregoing problem that desired print density can be hardly secured is left unsolved.

As another method for dispersing a pigment in water there has been proposed a technique involving the introduction of sulfonic acid group onto the surface of a particulate pigment. For example, JP-A-10-110129 discloses a recording solution for ink jet recording comprising a sulfonated surface-treated organic pigment obtained by treating with a sulfonating agent an organic pigment dispersed in a solvent free of active proton. The above cited patent application discloses that the foregoing recording solution for ink jet recording has a stable dispersibility and thus can be securely ejected from the nozzle. Further, JP-A-11-49974 discloses that an organic bulk pigment which can be positively charged on the surface thereof is prepared by treating an organic bulk pigment having a sulfonic acid group introduced therein with a monovalent metal ion. The above cited patent application also discloses an aqueous ink composition which comprises a particulate pigment prepared from the surface positively chargeable organic bulk pigment, a dispersant and water and thus exhibits an excellent storage stability.

The inks comprising a surface-treated particulate pigment proposed in the foregoing two patent applications can satisfy various requirements as compared with the conventional pigment-based ink jet recording inks but leave something to be desired in storage stability because they comprise various components incorporated therein in combination to have desired print quality and dryability.

On the other hand, an ink for ink jet printer is required to meet various physical properties. In particular, it is important to secure desired storage stability and ejection stability (prevention of dot drop and clogging). Further, printing on recording paper is required to meet the following requirements (1) to (3):

(1) The printed image has little irregular bleeding;

(2) The image which has been printed can rapidly dry; and (3) The printed image has a high print density.

In order to meet the foregoing requirements (1) to (3), various studies have long been made. For example, an approach involving the enhancement of the penetrating power of an ink for the purpose of eliminating bleeding on printed image and improving the dryability of printed image has been studied. U.S. Pat. No. 5,156,675 proposes the use of diethylene glycol monobutyl ether. U.S. Pat. No. 5,183,502 proposes the use of an acetylene glycol-based surface active agent.

However, the foregoing ink which comprises such a penetrating agent incorporated therein to have a drastically improved penetrating power is disadvantageous in that the colorant, too, penetrates deep into the recording paper, making it difficult to secure the printed image with a desired print density.

It has thus been desired to provide an ink for ink jet printer which can meet not only the foregoing requirements for physical properties, particularly storage stability and ejection stability (prevention of dot drop and clogging) but also the foregoing requirements (1) to (3).

(Prior Art Concerning Ink, Particularly Penetrating Agent)

An ink to be used in ink jet recording is required to meet requirements that the printed matter thus obtained dry fairly dry and show no bleeding, the ink can be printed uniformly on the surface of all recording media and a plurality of colors, if any, be not mixed. A particular problem that can occur is that when paper is used as a recording medium, the ink can undergo bleeding with fibers having different penetrabilities.

The most conventional inks for ink jet recording comprise glycol ether incorporated therein as a wetting agent as disclosed in JP-B-2-2907 (The term "JP-B" as used herein means an "examined Japanese patent application"), comprise a water-soluble organic solvent as disclosed in JP-B-1-15542 or comprise a dye dissolution accelerator incorporated therein as disclosed in JP-B-2-3837.

In order to enhance penetrating power, the addition of diethylene glycol monobutyl ether has been studied as disclosed in U.S. Pat. No. 5,156,675, the addition of Surfynol 465 (produced by Air Products Co., Ltd.), which is an acetylene glycol-based surface active agent, has been studied as disclosed in U.S. Pat. No. 5,183,502, and the addition of both diethylene glycol monobutyl ether and Surfynol 465 has been studied as disclosed in U.S. Pat. No. 5,196,056. Diethylene glycol mono-n-butyl ether is called "butyl carbitol" and is disclosed in, e.g., U.S. Pat. No. 3,291,580. Further, U.S. Pat. No. 2,083,372 give a study of the use of ethers such as diethylene glycol as an ink.

Most inks comprising a pigment are mainly arranged to have a lowered penetrating power that prevents themselves from wetting the surface of paper to secure desired print quality. These inks have been put to practical use. Further, an ink comprising triethylene glycol monomethyl ether incorporated therein as a pigment has been proposed as disclosed in JP-A-56-147861. An ink comprising an ether such as ethylene glycol, diethylene glycol and triethylene glycol incorporated therein as a pigment has been proposed as disclosed in JP-9-111165.

(Prior Art Concerning Ink Set)

An ink jet recording method is a printing method which comprises allowing a droplet of ink composition to fly and adhere to a recording medium such as paper to effect printing. In accordance with this printing method, a high resolution and fidelity image can be printed at a high speed using a relatively inexpensive apparatus.

As an ink jet recording method there has recently been proposed a method which comprises applying a polyvalent metal salt solution to a recording medium, and then applying an ink composition comprising a dye material having at least one carboxyl group thereto (as disclosed in JP-A-5-202328). It is proposed that this ink jet recording method allows the formation of an insoluble composite from a polyvalent metal ion and a dye and the presence of the composite makes it possible to obtain a high fidelity water-resistant image free from color bleeding.

It has also been proposed that the combined use of at least a surface active agent or penetrating solvent for providing penetrating power, a color ink containing a salt, and a black ink which undergoes thickening or agglomeration when acted upon by the salt makes it possible to obtain a high fidelity color image having a high image density free from color bleeding (as disclosed in JP-A-6-106735). In other words, an ink jet recording method has been proposed which comprises printing two solutions, i.e., first solution containing a salt and ink composition to obtain a good image.

The recent trend of an ink jet recording method is that a plurality of color ink compositions are subjected to ink jet recording to form a color image. In general, a color image is formed by three color ink compositions, i.e., yellow ink composition, magenta ink composition and cyan ink composition, optionally four color ink compositions, i.e., black ink composition in addition to the foregoing three color ink compositions.

An ink composition to be used in the formation of such a color image is required to have a good color developability itself as well as allow the development of a good half tone color when combined with a plurality of ink compositions.

(Prior Art Concerning Ink Cartridge)

In a printer such as ink jet printer, an ink cartridge is used to feed the ink to the printer. Such an ink cartridge comprises a porous material impregnated with an ink received in a case.

A porous material to be impregnated with an ink often has various reactive materials or impurities attached thereto or left therein. Accordingly, when such a porous material is impregnated with an ink, the reactive materials or impurities in the porous material are eluted with the ink to change the composition of the ink or act with the ingredients in the ink. The resulting crystal can have adverse effects on the printing characteristics. For example, a polyurethane foam which is widely used as an ink impregnating porous material is prepared in the presence of an organic metal compound (e.g., organic tin compound) as a catalyst. Accordingly, when the polyether urethane foam comes in contact with an ink, the organic metal compound is eluted with the ink to undergo recrystallization in the ink. The organic metal compound thus recrystallized adheres to the inner surface of the nozzle. This causes the ink thus ejected to fry in a deviated direction or the ink to clog the nozzle.

It has thus been desired to develop an ink for ink jet recording which meets the foregoing physical properties, particularly desired storage stability and ejection stability, and the foregoing requirements (1) to (3) at the same time and an ink cartridge which causes substantially no change of these physical properties and printing properties of ink for ink jet printer.

DISCLOSURE OF THE INVENTION (Problems that the Invention is to Solve]

The inventors made extensive studies of requirements for the foregoing ink for ink jet printer, ink set for ink jet printer and ink cartridge. As a result, a specific particulate pigment having a sulfur-containing dispersibility providing group chemically bonded to the surface thereof with a treatment containing sulfur was developed. Thus, the present invention has been worked out. Objects (problems) of the invention will be described in detail with reference to roughly divided aspects, i.e., "ink for ink jet recording (first to fourth inks of the invention)", "ink for ink jet recording (fifth ink of the invention", "ink set for ink jet recording" and "ink cartridge" according to the invention.

<Object (Problem) of Ink for Ink Jet Recording (First to Fourth Inks of the Invention) According to the Invention>

The inventors made extensive studies of an ink which satisfies the foregoing ink physical properties and printing properties required for ink for ink jet recording at the same time. As a result, it was found that the ink which satisfies the foregoing ink physical properties and printing properties at the same time can be realized by an ink for ink jet recording comprising at least a particulate pigment having a sulfur-containing dispersibility providing group chemically bonded to the surface thereof with a treatment containing sulfur, a penetrating agent, and water, characterized by the following aspects:

(a) An ink for ink jet recording wherein the sulfur content in the liquid component of the ink is kept to a predetermined level or less (hereinafter referred to as "first ink of the invention");

(b) An ink for ink jet recording wherein the amount of the sulfur-containing dispersibility providing group is kept to a predetermined value or more (hereinafter referred to as "second ink of the invention") and a process for the preparation thereof;

(c) An ink for ink jet recording wherein the sulfur-containing dispersibility providing group is a predetermined ion group and the cation as its counter ion is predetermined (hereinafter referred to as "third ink of the invention") and a process for the preparation thereof; and (d) An ink for ink jet recording comprising a specific preservative incorporated therein (hereinafter referred to as "fourth ink of the invention").

The ink for ink jet recording (first to fourth inks of the invention) according to the invention is based on the foregoing knowledge. An object of the invention is to provide a pigment ink for ink jet recording (first to fourth inks of the invention) excellent in fastness (light-resistance, water resistance, etc.), characterized in that the foregoing requirements for ink for ink jet recording can be satisfied at the same time while securing the desired storage stability of the ink:

(1) Little irregular bleeding on the printed matter;
(2) The image which has been printed can rapidly dry;
(3) The printed image has a high print density;
(4) The ink is provided with an excellent storage stability; and
(5) The ink can be easily prepared.

<Object (Problem) of Ink for Ink Jet Recording (Fifth Ink of the Invention) According to the Invention>

As previously described in the clause "(Prior art concerning ink: mainly concerning penetrating agent)", the penetrating properties of an ink has been studied. Most of the prior art inks leave something to be desired. In the case where a method involving the inhibition of wetting on the surface of paper is used, the prior art inks bleed over ordinary paper, particularly regenerated paper, which is often used, and thus take much time to dry. Accordingly, when printed continuously, the ink which has been printed on paper can difficultly dry, making it impossible to allow immediate printing thereon. Regenerated paper is a mixture of various paper components and thus is an aggregate of paper components having different penetrabilities. The difference in penetrability between paper components makes it easy for the ink to bleed.

An ink comprising a pigment is disadvantageous in that when printed on, e.g., a paper containing an ordinary sizing agent as a recording medium, the pigment is left behind on the surface of paper or the like, accelerating fretting, unless the ink is provided with some penetrating power. However, when the penetrating power thus provided is insufficient, the kind of the paper to be used must be restricted or the quality of printed image can be deteriorated. Further, most inks comprising a pigment comprise a methyl ether as used in JP-A-56-147851 as a glycol ether for controlling the penetrating powder thereof. No pigment-based inks for ink jet recording which can exhibit a penetrating power improved with butyl ethers to print on various papers with little bleeding have been known.

The fifth ink of the invention gives solution to these problems. An object (problem) of the invention is to provide an ink for ink jet recording which can penetrate very rapidly into ordinary paper and regenerated paper or coated paper, which is widely used in recent years, to print with little bleeding and a high print quality.

<Object (Problem) of Ink Set for Ink Jet Recording According to the Invention>

In the case where as a coloring agent for ink there is used a pigment, different pigments give different surface physical properties. In order to stabilize dispersion, the kind and added amount of the dispersant to be used must be properly changed depending on the kind of the pigment to be dispersed. Such a dispersion has the following disadvantages (problems) (6) and (7):

(6) Even if a pigment which can give a proper color reproduction range and a high saturation is selected as a coloring agent for ink, the resulting ink cannot exhibit physical properties desirable for ink jet recording. After all, the capability inherently given by the combination of pigments cannot be made the use of to disadvantage.

(7) Most inks for ink jet recording exhibit an enhanced penetrating power with respect to paper to accomplish the prevention of color bleeding. However, ink additives for providing paper with penetrating power occasionally cause the desorption of the dispersant from the pigment to produce aggregates or change the physical properties of the ink.

The inventors obtained knowledge that an ink for ink jet recording comprising a pigment as a coloring agent for ink can avoid the foregoing problems by using various pigments having the same surface conditions. The inventors obtained another knowledge that a specific combination of pigments can accomplish a good color image.

The ink set for ink jet recording according to the invention is based on the foregoing knowledge. Objects of the invention are as follows:

To provide an ink set for ink jet recording which allows optimization of pigment concentration, extremely easy design of pigment ink and development of desired half tone colors to attain a good color image;

To provide an ink set for ink jet recording which can comprise specific pigments in combination to attain a better color image, particularly a good hue; and To provide an ink set for ink jet recording excellent in the stability of ink dispersion.

<Object (Problem) of Ink Cartridge According to the Invention>

The inventors found that an ink for ink jet recording which can satisfy the foregoing ink physical properties and print properties at the same time can be realized by keeping the sulfur content in an ink containing various surface-treated particulate pigments to a predetermined level or less as in the foregoing first ink of the invention. The inventors also found that an excellent ink cartridge can be prepared by impregnating an ink impregnating foam with this ink.

The ink cartridge according to the invention is based on the foregoing knowledge. An object of the invention is to provide an excellent ink cartridge which can give desired storage stability and ejection stability (prevention of clogging) and maintain the print properties of the foregoing ink securely.

(Means for Solving the Problems)

<First Ink of the Invention>

The first ink of the invention gives, as a technical constitution for accomplishing the foregoing "object (problem) of ink for ink jet recording (first to fourth inks of the invention) according to the invention", an ink for ink jet recording comprising at least a particulate pigment having a sulfur-containing dispersibility providing group chemically bonded to the surface thereof with a treatment containing sulfur, a penetrating agent, and water, characterized in that the sulfur content in the liquid component of the ink is 2,000 ppm or less, preferably 1,000 ppm as calculated in terms of $SO_4^{2-}$.

In a preferred embodiment of the first ink of the invention, the amount of polyvalent metal ions contained in the liquid component is 800 ppm or less. In another preferred embodiment of the first ink of the invention, the pigment is a carbon black pigment and/or organic pigment. In a further preferred embodiment of the first ink of the invention, the penetrating agent is an acetylene glycol-based surface active agent, acetylene alcohol-based surface active agent, 1,2-alkylene glycol and/or glycol ether.

A still further preferred embodiment of the first ink of the invention is an ink for ink jet recording further containing a material having a structure represented by the following general formula (1):

$$R\text{—}EOn_1\text{—}POm_1\text{—}X \qquad (1)$$

wherein R represents a $C_{4-10}$ alkanol group which is an n-group and/or other isomers; EO represents an ethylene oxy group; PO represents a propylene oxy group, with the proviso that EO and PO are present in the molecule and their order of arrangement are arbitrary; X represents a hydrogen atom or —$SO_3M$ (in which M represents a hydrogen ion, alkaline metal, inorganic base or organic amine); and $n_1$ and $m_1$ each represent the number of repetition of EO and PO, respectively, which are each a value averaged over the entire system, i.e., from 0 to 10 and from 1 to 5, respectively.

A still further preferred embodiment of the first ink of the invention is an ink for ink jet recording further containing a particulate polymer. The added amount of the particulate polymer is preferably from 0.5 to 10% by weight.

<Second Ink of the Invention>

The second ink of the invention gives, as a technical constitution for accomplishing the foregoing "object (problem) of ink for ink jet recording (first to fourth inks of the invention) according to the invention", an ink for ink jet recording comprising at least a particulate pigment having a sulfur-containing dispersibility providing group chemically bonded to the surface thereof with a treatment containing sulfur, a penetrating agent, and water, characterized in that the amount of the sulfur-containing dispersibility providing group is $10 \times 10^{-6}$ equivalent or more per g of particulate pigment.

In a preferred embodiment of the second ink of the invention, the sulfur-containing dispersibility providing group is a sulfonic acid group (—$SO_2OH$) and/or sulfinic acid group (—$RSO_2H$ in which R is a $C_{1-12}$ alkyl or phenyl group or modification product thereof).

In another preferred embodiment of the second ink of the invention, the absolute value of zeta-potential of particulate pigment at 20° C. and pH value of from 8 to 9 in a diluted ink solution obtained by diluting the ink with ion-exchanged water such that the concentration of the foregoing particulate pigment is from 0.001 to 0.01% by weight is 30 mV or more. The adjustment of the pH value can be accomplished by the use of sodium hydroxide and hydrochloric acid.

A further preferred embodiment of the second ink of the invention is an ink for ink jet recording comprising at least a particulate pigment having a sulfur-containing dispersibility providing group chemically bonded to the surface thereof with a treatment containing sulfur, a penetrating agent, and water, characterized in that the amount of the sulfur-containing dispersibility providing group is $10 \times 10^{-6}$ equivalent or more per g of particulate pigment, the sulfur-containing dispersibility providing group is a sulfonic acid group (—$SO_2OH$) and/or sulfinic acid group (—$RSO_2H$ in which R is a $C_{1-12}$ alkyl or phenyl group or modification product thereof), and the absolute value of zeta-potential of particulate pigment at 20 C. and pH value of from 8 to 9 in a diluted ink solution obtained by diluting the ink with ion-exchanged water such that the concentration of the foregoing particulate pigment is from 0.001 to 0.01% by weight is 30 mV or more.

<Third Ink of the Invention>

The third ink of the invention gives, as a technical constitution for accomplishing the foregoing "object (problem) of ink for ink jet recording (first to fourth inks of the invention) according to the invention", an ink for ink jet recording comprising at least a particulate pigment, a penetrating agent, and water, characterized in that said particulate pigment has a sulfonic acid anion group (—$SO^{3-}$) and/or sulfinic acid anion group (—$RSO_2$ in which R is a $C_{1-12}$ alkyl or phenyl group or modification product thereof) chemically bonded to the surface thereof and the counter cation of the sulfonic acid anion group and/or the counter cation of the sulfinic acid anion group is selected from the group consisting of alkaline metal ions and monovalent ions represented by the chemical formula $(R_1R_2R_3R_4N)^+$ (in $R_1$, $R_2$, $R_3$, and $R_4$ may be the same or different and each represent a hydrogen atom, alkyl group, hydroxylalkyl group or halogenated alkyl group).

In a preferred embodiment of the third ink of the invention, the counter cation of the sulfonic acid anion group and/or the counter cation of the sulfinic acid anion group comprises at least one of lithium ion ($Li^+$), sodium ion ($Na^+$), potassium ion ($K^+$), ammonium ion ($NH_4^+$) and alkanolamine cation.

In a further preferred embodiment of the third ink of the invention, the counter cation of the sulfonic acid anion group and/or the counter cation of the sulfinic acid anion group comprises at least $Na^+$ and $NH_4^+$. In a still further preferred embodiment of the third ink of the invention, the total amount of alkaline metal ion in the liquid component (vehicle) of the ink is 10,000 ppm or less, preferably 2,000 ppm or less, more preferably 1,000 ppm or less.

<Fourth Ink of the Invention>

The fourth ink of the invention gives, as a technical constitution for accomplishing the foregoing "object (problem) of ink for ink jet recording (first to fourth inks of the invention) according to the invention", an ink for ink jet recording comprising at least a surface-treated pigment independently dispersible in an aqueous solvent having a sulfur-containing dispersibility providing group chemically bonded to the surface thereof, a penetrating agent, and water, characterized in that there are incorporated one or more selected from the group consisting of oxazolidine-based compound, alkylisothiazolone, chloroalkylisothiazolone, benzisothiazolone, bromonitroalcohol and chloroxylenol.

In a preferred embodiment of the fourth ink of the invention, the oxazolidine-based compound is 4,4-dimethyloxazolidine, alkylisothiazolone is octylisothiazolone and/or methylisothiazolone, and chloroalkylisothiazolone is choromethylisothiazolone the added amount of which is preferably from 0.01 to 0.5% by weight.

<Fifth Ink of the Invention>

The fourth ink of the invention gives, as a technical constitution for accomplishing the foregoing "object (problem) of ink for ink jet recording (fifth ink of the invention) according to the invention", an ink for ink jet recording comprising at least a particulate pigment having a sulfur-containing dispersibility providing group chemically bonded to the surface thereof with a sulfur-containing treatment, a penetrating agent, and water, characterized in that said penetrating agent is a material having a structure represented by the following general formula (2), an acetylene glycol-based surface active agent, an acetylene alcohol-based surface active agent, 1,2-alkylene glycol and/or glycol ether.

$$R\text{—}EOn_2\text{—}POm_2\text{—}X \qquad (2)$$

wherein R represents a $C_{4-10}$ alkanol group which is an n-group and/or other isomers; EO represents an ethylene oxy group; PO represents a propylene oxy group, with the proviso that EO and PO are present in the molecule and their order of arrangement are arbitrary; X represents a hydrogen atom or —$SO_3M$ (in which M represents a hydrogen ion, alkaline metal, inorganic base or organic amine); and $n_2$ and $m_2$ each represent the number of repetition of EO and PO, respectively, which are each a value averaged over the entire system.

In a preferred embodiment of the fifth ink of the invention, R in the general formula (2) is a butyl group, pentyl group, hexyl group, heptyl group, octyl group, nonyl group and/or decyl group wherein the butyl group is mainly composed of n-butyl group, isobutyl group and/or t-butyl group, the pentyl group is mainly composed of n-pentyl group and/or other isomers, the hexyl group is mainly composed of n-hexyl group and/or other isomers, the heptyl group is mainly composed of n-heptyl group and/or other isomers, the octyl group is mainly composed of n-octyl group and/or other isomers, the nonyl group is mainly composed of n-nonyl group and/or other isomers, and the decyl group is mainly composed of n-decyl group and/or other isomers.

In a further preferred embodiment of the fifth ink of the invention, $n_2$ in the general formula (2) is from 0 to 10, $m_2$ in the general formula (2) is from 1 to 5, and the average molecular weight of the material represented by the general formula (2) is 2,000 or less.

In a still further preferred embodiment of the fifth ink of the invention, the acetylene glycol-based surface active agent and acetylene alcohol-based surface active agent each are 2,4-dimethyl-5-hexyne-3-ol, 2,4,7,9-tetramethyl-5-desyne-4,7-diol, 3,6-dimethyl-4-octine-3,6-diol and/or 2,4-dimethyl-5-hexyne-3-ol, 2,4,7,9-tetramethyl-5-desyne-4,7-diol or 3,6-dimethyl-4-octine-3,6-diol having 30 or less ethylene oxy groups and/or propylene oxy groups added thereto on the average, the 1,2-alkylene glycol is 1,2-($C_{4-10}$ alkyl)diol, and the glycol ether is one or a mixture of two or more selected from the group consisting of diethylene glycol mono($C_{4-8}$ alkyl)ether, triethylene glycol mono($C_{4-8}$ alkyl)ether, propylene glycol mono($C_{3-6}$ alkyl)ether and dipropylene glycol mono($C_{3-6}$ alkyl)ether.

<Process for the Preparation of Second Ink According to the Invention>

The process for the preparation of the second ink of the invention gives, as a technical constitution of the process for the preparation of the ink for ink jet recording according to the invention, a process for the preparation of an ink for ink jet recording which comprises treating the surface of a particulate pigment with a treatment containing sulfur to allow a sulfur-containing dispersibility providing group to be chemically bonded to the particulate pigment, and then mixing the particulate pigment thus treated with a penetrating agent and water, characterized in that the treatment is used in such an amount that the amount of the sulfur-containing dispersibility providing group to be incorporated is $10 \times 10^{-6}$ equivalent or more per g of the particulate pigment.

In a preferred embodiment of the process for the preparation of the second ink for ink jet recording according to the invention, the sulfur-containing dispersibility providing group is a sulfonic acid group (—$SO_2OH$) and/or sulfinic acid group (—$RSO_2H$ in which R is a $C_{1-12}$ alkyl or phenyl group or modification product thereof). In another preferred embodiment of the process for the preparation of the second ink for ink jet recording according to the invention, there is provided a step of subjecting sulfonic acid group and/or sulfinic acid group to ionic dissociation in the ink before the addition of the ink solvent.

In a further preferred embodiment of the process for the preparation of the second ink for ink jet recording according to the invention, the absolute value of zeta-potential of particulate pigment at 20° C. and pH value of from 8 to 9 in a diluted ink solution obtained by diluting the ink with ion-exchanged water such that the concentration of the foregoing particulate pigment is from 0.001 to 0.01% by weight is 30 mV or more. The adjustment of the pH value can be accomplished by the use of sodium hydroxide and hydrochloric acid.

<Process for the Preparation of Third Ink According to the Invention>

On the other hand, the process for the preparation of the third ink comprises allowing a sulfonic acid anion group (—$SO^{3-}$) and/or sulfinic acid anion group (—$RSO_2$ in which R is a $C_{1-12}$ alkyl or phenyl group or modification product thereof) to be chemically bonded to the surface of the particulate pigment, and then mixing the particulate pigment thus treated with a penetrating agent and water, characterized in that the counter cation of the sulfonic acid anion group and/or the counter cation of the sulfinic acid anion group is selected from the group consisting of alkaline metal ions and monovalent ions represented by the chemical formula $(R_1R_2R_3R_4N)^+$ (in $R_1$, $R_2$, $R_3$, and $R_4$ may be the same or different and each represent a hydrogen atom, alkyl group, hydroxylalkyl group or halogenated alkyl group).

In a preferred embodiment of the process for the preparation of the third ink, the counter cation of the sulfonic acid anion group and/or the counter cation of the sulfinic acid anion group comprises at least one of lithium ion ($Li^+$), sodium ion ($Na^+$), potassium ion ($K^+$), ammonium ion ($NH_4^+$) and alkanolamine cation.

In another preferred embodiment of the process for the preparation of the third ink, there are present at least $Na^+$ and $NH_4^+$ as the counter cation of the sulfonic acid anion group and/or the counter cation of the sulfinic acid anion group. In a still further embodiment of the process for the preparation of the third ink, the total amount of alkaline metal ion in the liquid component (vehicle) of the ink is 10,000 ppm or less, preferably 2,000 ppm or less, more preferably 1,000 ppm or less.

<Ink Set of the Invention>

The ink set for ink jet recording according to the invention gives, as a technical constitution for accomplishing the object (problem) of the foregoing ink set, an ink set for ink jet recording comprising at least a pigment, a penetrating agent and water, characterized in that said pigment is a surface-treated particulate pigment having a sulfur-containing dispersibility providing group chemically bonded to the surface thereof with a treatment containing sulfur and comprises black, yellow, magenta and cyan pigments in combination.

In a preferred embodiment of the ink set for ink jet recording, the black surface-treated pigment is carbon black, the yellow surface-treated pigment comprises one or two or more selected from the group consisting of C.I. pigment yellow 55, 74, 97, 109, 110, 128, 138, 147, 151, 154 and 180, the magenta surface-treated pigment comprises one or two or more selected from the group consisting of C.I. pigment red 122, 202 and 209, and C.I. pigment violet 19, and the cyan surface-treated pigment comprises one or two or more selected from the group consisting of C.I. pigment blue 15, 15:1, 15:2, 15:3, 15:4, 15:6 and 16.

The ink set for ink jet recording according to the invention further comprises orange and green pigments in addition to the foregoing black, yellow, magenta and cyan pigments, totaling 6 color pigments.

In a preferred embodiment of the ink set for ink jet recording comprising 6 color pigments, there are incorporated the foregoing black surface-treated pigment, the foregoing yellow surface-treated pigment, the foregoing magenta surface-treated pigment and the foregoing cyan surface-treated pigment, the orange surface-treated pigment comprises one or two or more selected from the group consisting of C.I. pigment 43 and 36 and the foregoing green surface-treated pigment comprises one or two or more selected from the group consisting of C.I. pigment green 7 and 36.

The amount of the dispersibility providing group in the foregoing surface-treated particulate pigment to be used in the ink set comprising 4 or 6 color pigments in combination is preferably $10 \times 10^{-6}$ equivalent or more per g of pigment particle.

<Ink Cartridge of the Invention>

The ink cartridge according to the invention gives, as a technical constitution for accomplishing the object (problem) of the foregoing-ink cartridge, an ink cartridge comprising an ink impregnating foam and an ink incorporated in the ink impregnating foam, characterized in that the ink comprises at least a particulate pigment having a sulfur-containing dispersibility providing group provided on the surface thereof, a penetrating agent and water and the content of sulfur in the liquid component in the ink incorporated in the ink impregnating foam is 2,000 ppm or less, preferably 1,000 ppm or less as calculated in terms of $SO_4^{2-}$ ion.

In a preferred embodiment of the ink cartridge of the invention, the pigment is carbon black pigment and/or organic pigment and the penetrating agent is an acetylene glycol-based surface active agent, acetylene alcohol-based surface active agent, 1,2-alkylene glycol and/or glycol ether.

In another preferred embodiment of the ink cartridge of the invention, the ink impregnating foam is a urethane foam which is prepared in the presence of an organic metal compound as a catalyst and the amount of the organic metal compound to be added is from 0.01 to 0.2% by weight based on the weight of the urethane foam.

In a further preferred embodiment of the ink cartridge of the invention, the total amount of metallic ions and other polyvalent metallic ions from the organic metal compound catalyst contained in the liquid component of the ink is 800 ppm or less.

The ink cartridge according to the invention is suitable particularly for ink jet recording apparatus.

Figure 1:
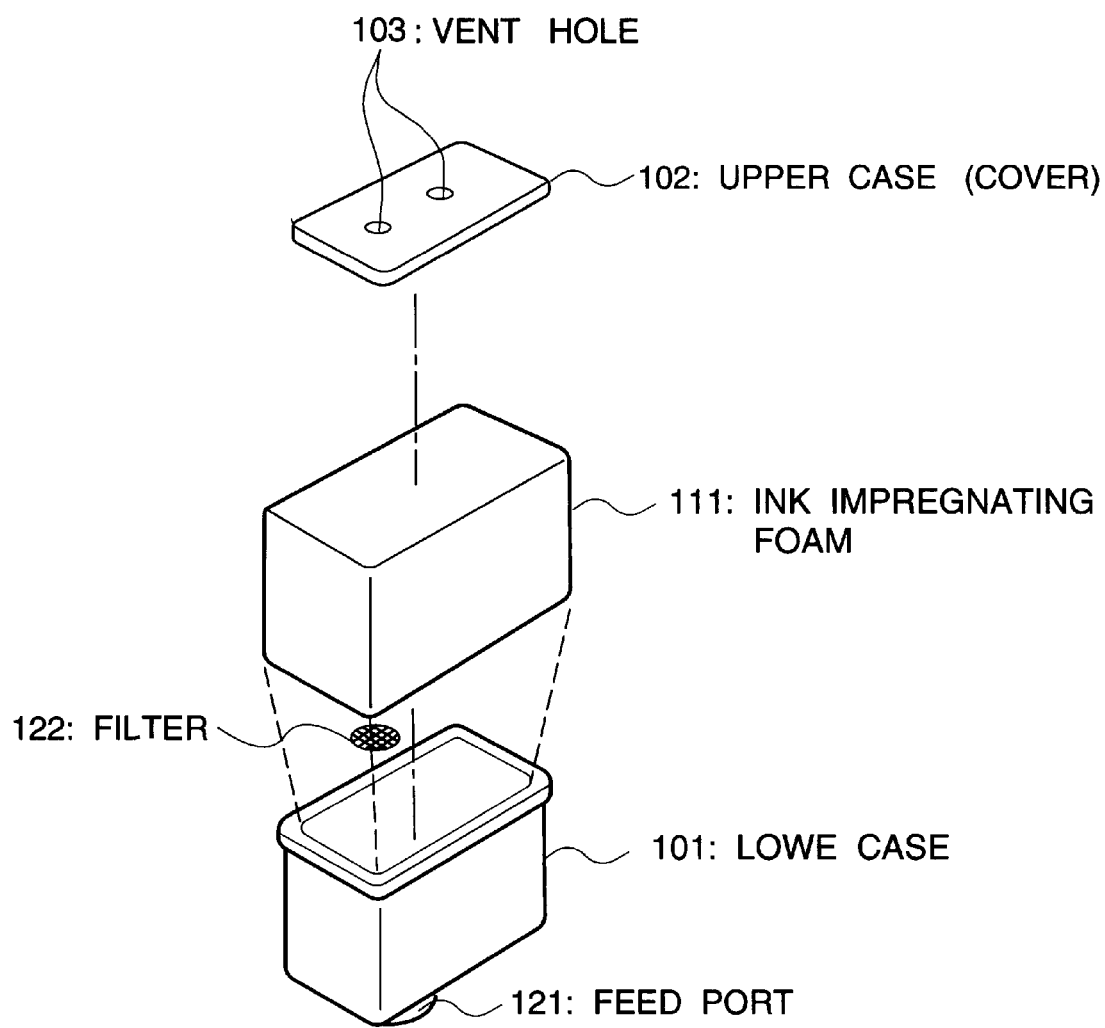
FIG. 1 is a schematic diagram illustrating the ink cartridge to be used in the ink cartridge of the invention.

The reference numerals and signs in the drawing are as follows.

101 . . . Lower case
102 . . . Upper case (cover)
103 . . . Vent hole
111 . . . Ink impregnating foam
121 . . . Feed port
122 . . . Filter

BEST MODE FOR CARRYING OUT THE INVENTION

Embodiments of implication of the ink for ink jet recording (first to fifth inks of the invention), ink set for ink jet recording and ink cartridge for ink jet recording according to the invention will be described in detail hereinafter. The first to fifth inks of the invention as used herein will be hereinafter referred to as "ink(s) of the invention" unless otherwise specified.

<Embodiment of the Ink of the Invention>

The embodiment of implication of the present invention common to the first to fifth inks of the invention will be hereinafter described. The following embodiment is common also to the ink to be used in the ink set for ink jet recording and the ink cartridge of the invention.

(Surface-treated Pigment)

The ink of the invention comprises a particulate pigment having a sulfur-containing dispersibility providing group chemically bonded to the surface thereof with a treatment containing sulfur (hereinafter simply referred to as "surface-treated pigment").

The term "sulfur-containing dispersibility providing group (hereinafter simply referred to as "dispersibility providing group")" as used herein is meant to indicate a functional group containing sulfur element, which is capable of allowing pigment particles to be dispersed independently in an ink, which undergoes ionic dissociation in the ink.

The particulate pigment constituting the surface-treated pigment is not specifically limited so far as it can have a sulfur-containing dispersibility providing group supported on the surface thereof and is not dissolved in the sulfur-containing treatment used during the incorporation of the dispersibility providing group. From this standpoint of view, as preferred examples of the ink of the invention there can be exemplified the following pigments.

Examples of black inorganic pigment include carbon blacks (C.I. pigment black 7) such as furnace black, lamp black, acetylene black and channel black, and iron oxide pigments.

Examples of yellow ink pigment include C.I. pigment yellow 1 (Hanza Yellow), 2, 3 (Hanza Yellow 10G), 4, 5 (Hanza Yellow 5G), 6, 7, 10, 11, 12, 13, 14, 16, 17, 24 (Flavanthrone Yellow), 34, 35, 37, 53, 55, 65, 73, 74, 75, 81, 83, 93, 94, 95, 97, 98, 99, 108 (Anthrapyrimidine Yellow), 109, 110, 113, 117 (copper complex salt pigment), 120, 124, 128, 129, 133 (quinophthalone), 138, 139 (isoindolinone), 147, 151, 153 (nickel complex pigment), 154, 167, 172, and 180.

Examples of pigment for magenta ink include C.I. pigment 1 (Para Red), 2, 3 (Toluidine Red), 4, 5 (ITR Red), 6, 7, 8, 9, 10, 11, 12, 14, 15, 16, 17, 18, 19, 21, 22, 23, 30, 31, 32, 37, 38 (Pyrazolone Red), 40, 41, 42, 88 (Thio Indigo), 112 (Naphthol AS-based pigment), 114 (Naphthol AS-based pigment), 122 (dimethyl quinacridone), 123, 144, 146, 149, 150, 166, 168 (Anthanthrone Orange), 170 (Naphthol AS-based pigment), 171, 175, 176, 177, 178, 179 (Perylene Maroon), 185, 187, 209 (dichloroquinacridone), 219, 224 (perylene-based pigment), 245 (Naphthol AS-based pigment), and C.I. pigment violet 19 (quinacridone), 23 (dioxazine violet), 32, 33, 36, 38, 43 and 50.

Examples of pigment for cyan ink include C.I. pigment blue 15, 15:1, 15:2, 15:3, 16 (metal-free phthalocyanine), 18

(alkaline blue toner), 25, 60 (threneblue), 65 (Violanthrone), and 66 (Indigo).

Examples of organic pigment for black ink include black organic pigments such as aniline black (C.I. pigment black 1).

As the organic pigment to be incorporated in color inks other than magenta, cyan or yellow ink there may be used C.I. pigment green 7 (phthalocyanine green), 10 (green gold), 36 or 37, C.I. pigment brown 3, 5, 25 or 26, or C.I. pigment orange 1, 2, 5, 7, 13, 15, 16, 24, 34, 36, 38, 40, 43 or 63.

The ink of the invention may comprise the foregoing pigments incorporated therein singly or in combination of two or more thereof.

The sulfur-containing dispersibility providing group to be supported on the surface of the particulate pigment to be incorporated in the ink of the invention is not specifically limited except for the third ink of the invention so far as it is a functional group containing sulfur atom which provides water dispersibility. Specific examples of such a functional group include sulfinic acid ($SO_2^-$) group and sulfonic acid ($SO_3^-$) group. The particulate pigment to be used in the ink of the invention may have the foregoing dispersibility providing group present at least on the surface thereof or may have the dispersibility providing group incorporated thereinside.

(Preparation of Surface-treated Pigment)

The surface-treated pigment can be prepared by treating the surface of a particulate pigment with a treatment containing sulfur (sulfonating agent).

(Penetrating Agent)

The ink of the invention comprises a penetrating agent incorporated therein for the purpose of enhancing the penetrating power thereof. In some detail, an acetylene glycol-based surface active agent and/or glycol ether is preferably used.

A preferred example of the acetylene glycol-based surface active agent is a compound represented by the following general formula:

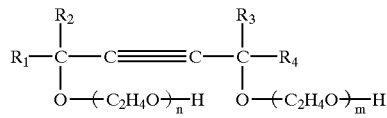

wherein $R_1$, $R_2$, $R_3$ and $R_4$ each independently represent an alkyl group; and the sum of n and m is from 0 to 30, such as Surfynol TG, Surfynol 420, Surfynol 440 and Surfynol 465 (produced by Air Products Inc.).

The amount of such a penetrating agent to be incorporated in the ink for ink jet recording is preferably from 0.1 to 5% by weight, more preferably from 0.5 to 3% by weight. When the amount of such a penetrating agent falls below 0.1% by weight, the resulting ink exhibits an insufficient penetrating power that causes color bleeding. On the contrary, when the amount of such a penetrating agent exceeds 5% by weight, the resulting ink wets ununiformly the periphery of the nozzle in the ink ejection head and thus cannot be easily ejected securely.

The ink of the invention may comprise a glycol ether incorporated therein instead of the foregoing acetylene glycol-based surface active agent. Alternatively, the ink of the invention may comprise the foregoing acetylene glycol-based surface active agent and glycol ether incorporated therein in combination.

Specific examples of glycol ether include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propylether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, and dipropylene glycol mono-n-butyl ether.

The amount of the glycol ether to be incorporated in the ink for ink jet recording is preferably from 0 to 30% by weight, more preferably from 0.5 to 10% by weight. When the amount of the glycol ether to be incorporated exceeds 30% by weight, the resulting ink wets ununiformly the periphery of the nozzle in the ink ejection head and thus cannot be easily ejected securely.

The ink of the invention may comprise the foregoing penetrating agents incorporated therein singly or in combination of two or more thereof.

(Penetrating Aid)

The ink of the invention may comprise as auxiliaries of the foregoing penetrating aid other nonionic, anionic, cationic and amphoteric surface active agents and hydrophilic high boiling and less volatile solvents such as high boiling and less volatile polyvalent alcohol and monoetherification product, dietherification product and etherification product thereof incorporated therein singly or in combination of two or more thereof for the purpose of controlling the penetrating power of the ink and improving the clogging resistance of the nozzle, the moisture retention of the ink or the solubility of the penetrating agent.

Examples of the nonionic surface active agent employable herein include fluorine-based copolymer, silicone-based copolymer, acrylic acid copolymer, polyoxyethylene alkyl ether, polyoxyethylene alkyl phenyl ether, polyoxyethylene secondary alcohol ether, polyoxyethylene sterol ether, polyoxyethylene lauryl ether, polyoxyethylene lanolin derivative, ethylene oxide derivative of condensed alkylphenol formalin, polyoxyethylene polyoxypropylene block copolymer, polyoxyethylene polyoxypropylene alkyl ether, aliphatic acid ester of polyoxyethylene compound, polyethylene oxide-condensed polyethylene glycol aliphatic acid ester, aliphatic acid monoglyceride, polyglycerin aliphatic acid ester, sorbitan aliphatic acid ester, propylene glycol aliphatic acid ester, sucrose aliphatic acid, aliphatic acid alkanolamide, polyoxyethylene aliphatic acid amide, polyoxyethylene alkyl amine, and alkylamine oxide. The present invention is not limited to these nonionic surface active agents.

Examples of the anionic surface active agent employable herein include higher aliphatic acid salt, higher alkyl dicarboxylic acid salt, higher alcohol sulfuric acid ester salt, higher alkylsulfonic acid salt, alkylbenzenesulfonic acid, alkylnaphthalenesulfonic acid salt, naphthalenesulfonic acid salt, formalin polycondensate, product of condensation of higher aliphatic acid with amino acid, dialkylsulfosuccinic acid ester, alkylsulfosuccinic acid salt, naphthenic acid salt, alkylethercarboxylic acid salt, acylated peptide, α-olefinsulfonic acid salt, N-acylmethyltaurin, alkylethersulfuric acid salt, secondary higher alcohol ethoxy sulfate, sodium salt of polyoxyethylene alkyl phenyl ether sulfuric acid, ammonium salt of polyoxyethylene alkyl phenyl ether sulfuric acid, monoglysulfate, alkyletherphosphoric acid ester, and alkylphosphoric acid ester. The present invention is not limited to these anionic surface active agents. The foregoing salts may be in the form of, e.g., sodium salt, potassium salt, lithium salt or calcium salt.

Examples of the cationic surface active agents employable herein include aliphatic amine salt, quaternary ammonium salt, sulfonium salt, and phosphonium salt. Examples of the amphoteric surface active agent employable herein include carboxybetaine type surface active agent, aminocarboxylic acid salt, and lecithin. The present invention is not limited to these surface active agents.

Examples of the high boiling less volatile polyvalent alcohol employable herein include glycerin, ethylene glycol, diethylene glycol, triethylene glycol, propylene glycol, dipropylene glycol, hexylene glycol, polyethylene glycol, and diol such as polypropylene glycol, 1,5-pentanediol and 1,2-hexanediol. Other examples of the high boiling less volatile polyvalent alcohol employable herein include monoetherification product, dietherification product and esterification product of these compounds. Further examples of the high boiling less volatile polyvalent alcohol employable herein include nitrogen-containing organic solvents such as N-methyl-2-pyrrolidone, 2-pyrrolidone, 1,3-dimethylimidazolidinone, monoethanolamine, N,N-dimethylethanolamine, N,N-diethylethanolamine, diethanolamine, N-n-butyldiethanolamine and triisopropanolamine.

(Other Additives)

The ink of the invention may comprise a small amount of a highly volatile monovalent alcohol such as ethanol, propanol, isopropanol and butanol in addition to water, which is a main solvent, for the purpose of enhancing the dryability thereof.

The ink of the invention may further comprise a pH buffer incorporated therein to adjust the pH value thereof to a proper value. Examples of the pH buffer employable herein include potassium hydrogen phthalate, potassium dihydrogenphosphite, sodium dihydrogenphosphate, sodium tetraborate, potassium hydrogen tartrate, sodium hydrogencarbonate, sodium carbonate, tris(hyroxymethyl)aminomethane, and tris(hydroxymethyl)aminomethane hydrochloride. The content of the pH buffer is preferably such that the pH value of the ink is from about 7 to 10 from the standpoint of the durability of the head member and the stability of the ink.

The ink of the invention may further comprise other additives such as mildewproofing agent, preservative and rust preventive (e.g., benzoic acid, dichlorophene, sorbic acid, p-hydroxybenzoic acid ester, ethylenediaminetetraacetic acid (EDTA), sodium dehydroacetate, 1,2-benzotiazoline-3-one [trade name: Proxel XL (produced by ICI)], benzotriazole, 3,4-isothiazoline-3-one) incorporated therein as necessary. The ink of the invention may further comprise urea, thiourea, and/or ethylene urea, etc. incorporated therein for the purpose of inhibiting the drying of the nozzle.

(Preparation of the Ink of the Invention)

The ink of the invention can be prepared by mixing the foregoing surface-treated pigment, the foregoing penetrating pigment and the foregoing other optional additives.

Referring to the foregoing preparation process, a process is preferably employed which comprises mixing all the ink additives other than the surface-treated pigment (dispersion), and then gradually adding the mixture to the surface-treated pigment (dispersion) which has been previously measured out in a predetermined amount. The reason why this process is employed is because a process involving the rapid addition of the particulate pigment to a solvent normally causes solvent shock that destroys the dispersion.

<Embodiments of Implication of the First Ink of the Invention>

Embodiments of the implication of the first ink of the invention (hereinafter simply referred to as "first ink") will be hereinafter described partly with reference to its action.

The first ink is an ink for ink jet recording comprising at least the foregoing surface-treated pigment (particulate pigment having a sulfur-containing dispersibility providing group chemically bonded to the surface thereof with a treatment containing sulfur) and penetrating agent, and water, characterized in that the content of sulfur in the liquid component of the ink is 2,000 ppm or less as calculated in terms of $SO_4^{2-}$.

The term "liquid component" as used herein is meant to indicate a "liquid portion" holding a solid portion such as particulate pigment dispersed therein. Accordingly, by measuring by any known method the amount of $SO_4^{2-}$ ion or polyvalent metal ion (e.g., alkaline earth metal ion, polyvalent metal (aluminum (Al), zinc (Zn), iron (Fe), nickel (Ni), silicon (Si), chromium (Cr), tin (Sn), manganese (Mn), cobalt (Co)) ion) contained in the supernatant liquid separated from the precipitated component by centrifugally processing the first ink, the amount of $SO_4^{2-}$ ion or polyvalent metal ion contained in the "liquid component" can be determined.

(Action)

The first ink comprises a particulate pigment having a sulfur-containing dispersibility providing group provided on the surface thereof. Accordingly, when this ink is ejected from the head of the ink jet printer to adhere to the surface of an ordinary paper for recording, polyvalent metal ions (ion of polyvalent metal such as calcium, magnesium and aluminum) and the foregoing sulfur-containing dispersibility providing group (particularly sulfinic acid group or sulfonic acid group) undergo salting-out reaction to combine, causing the condensation of the ink and hence making it possible to obtain an excellent print quality. The print thus obtained exhibits a high water resistance as compared with a pigment ink of the type having a difficulty in dissolution close to that of sulfate and comprising an ordinary dispersant (e.g., surface active agent type dispersant, alkalinically neutralized resin dispersion type dispersant).

(Sulfur Content Contained in the Liquid Component of the Ink)

The first ink is prepared in such a manner that the content of sulfur in the liquid component of the ink is 2,000 ppm or less, preferably 1,000 ppm or less as calculated in terms of $SO_4^{2-}$ ion.

In the present invention, even if the ink is prepared with the greatest possible care, the sulfur content can undergo salting-out with polyvalent metal ions (particularly alkaline earth metal ion) contained in the various additives to the ink to form insoluble salts in the ink.

When the sulfur content exceeds 2,000 ppm, the salts thus formed can clog the nozzle. Another possible problem is that the gelation of the ink can occur. When the sulfur content is 2,000 ppm or less, the gelation of the ink can occur less easily and the frequency of occurrence of clogging of nozzle decreases, eliminating practical problems. When the sulfur content is 1,000 ppm or less, there can occur neither gelation of the ink nor clogging of the nozzle, securing the stability in ejection of the ink to advantage.

The sulfur content in the liquid component doesn't contain the sulfur content in the dispersibility providing group chemically bonded to the surface of the particulate pigment. Accordingly, the term "sulfur content in the liquid component" as used herein is meant to indicate the sulfur content derived from the sulfonating agent which has not been consumed and removed during the sulfonation of the surface of the particulate pigment or the sulfur content derived from sulfur contained as impurities in the compounding ingredients such as pigment and penetrating agent. The sulfur content normally exists in the form of free ion in the aqueous liquid component of the first ink.

In a preferred embodiment of the first ink, the sulfur content contained in the liquid component is 2,000 ppm or less (preferably 1,000 ppm or less) as calculated in terms of $SO_4^{2-}$ ion and the content of the foregoing polyvalent metal ion in the liquid component is preferably 800 ppm or less (more preferably 600 ppm or less, most preferably 400 ppm or less, as described previously.

Examples of the polyvalent metal employable herein include alkaline earth metal such as strontium (Sr), calcium (Ca), magnesium (Mg) and beryllium (Be). Other examples of the polyvalent metal include aluminum (Al), zinc (Zn), iron (Fe), nickel (Ni), silicon (Si), chromium (Cr), manganese (Mn), cobalt (Co), scandium (Sc), titanium (Ti), vanadium (V), and lead (Pb).

The reason why an ink for ink jet recording having excellent ink physical properties and excellent printing properties can be obtained by suppressing the amount of the polyvalent metal ions in the liquid component to not higher than the foregoing predetermined level has not been necessarily made clear. However, it can be presumed as follows. Of course, the present invention is not limited to the following inference.

It is well known that a polyvalent metal normally forms a stable water-insoluble sulfate with $SO_4^{2-}$. On the other hand, the first ink comprises a sulfinic acid group (—$SO_2H$) or sulfonic acid group (—$SO_2OH$) present on the surface of a particulate pigment as a dispersibility providing group. Thus, it can be thought that when polyvalent metals are present in the liquid component in an amount exceeding a predetermined level, the foregoing dispersibility providing group and the polyvalent metal react with each other as the foregoing sulfate does to have an adverse effect on the dispersion of pigment particles in the first ink. Further, when the sulfonating agent which has been added during the surface treatment of the particulate pigment is left unreacted and insufficiently removed, and when polyvalent metals are present in the liquid component in an amount exceeding a predetermined level, they react with each other to form water-insoluble sulfates which then accumulate in the ink passage to disadvantage.

(Surface-treated Pigment)

The amount of the sulfur-containing dispersibility providing group to be introduced into the foregoing particulate pigment to be used in the first ink is preferably $10 \times 10^{-6}$ equivalent or more per g of particulate pigment. When the amount of the sulfur-containing dispersibility providing group to be introduced falls below $10 \times 10^{-6}$ equivalent or more per g of particulate pigment, the resulting ink not only exhibits a deteriorated storage stability but also cannot provide a high print density.

The introduced amount of the foregoing dispersibility providing group can be determined by treating an aqueous dispersion of the pigment by oxygen flask combustion method, allowing the pigment thus treated to be adsorbed by an aqueous solution of hydrogen peroxide, determining the amount of sulfuric acid ion (divalent) by ion chromatography, and then calculating from the results in terms of sulfonic acid group and sulfin group.

The average particle diameter of the particulate pigment to be incorporated in the first ink is not specifically limited so far as the amount of the foregoing dispersibility providing group to be introduced is $10 \times 10^{-6}$ equivalent per g of particulate pigment. However, it is preferably 10 nm to 300 nm. When the average particle diameter of the particulate pigment falls below 10 nm, the resulting ink may lose light resistance. When the average particle diameter of the particulate pigment exceeds 300 nm, the particulate pigment can precipitate, making it impossible for the ink to be ejected in a stable manner.

In another preferred embodiment of the first ink, the pigment to be incorporated in the ink is a carbon black pigment and/or organic pigment. (For specific examples of the carbon black pigment and organic pigment, reference can be made to the foregoing clause (Surface-treated pigment) in the article

[Embodiment of Ink of the Invention])

(Preparation of Surface-treated Pigment)

The particulate pigment having a sulfur-containing dispersibility providing group provided on the surface thereof to be used in the first ink can be prepared from the foregoing pigment compound by any known method. A particulate pigment having the foregoing sulfur-containing dispersibility providing group provided on the surface thereof can be obtained in the form of aqueous dispersion prepared by the method disclosed in JP-A-8-283596, JP-A-10-110110, JP-A-10-110111, or JP-A-10-110114.

An example of the process for the preparation of an aqueous dispersion of a particulate pigment having a sulfur-containing dispersibility providing group provided on the surface thereof will be given below.

A finely particulate pigment is put in an aprotic solvent (e.g., N-methyl-2-pyrrolidone or sulfolan) in an amount of from 3 to 200 times that of the pigment by volume. The pigment is then treated with a sulfonating agent while being dispersed. As the sulfonating agent there may be used sulfonated pyridine, sulfamic acid, amidesulfuric acid, fluorosulfuric acid, chlorosulfuric acid, sulfur trioxide, fuming sulfuric acid and sulfuric acid, singly or in combination of two or more thereof. The treatment with a sulfonating agent can be effected under heating (to a temperature of from about 60° C. to 200° C.) with stirring. The heating can be effected before or after the addition of the sulfonating agent.

After the sulfonation, the aprotic solvent and the remaining sulfonating agent are removed from the pigment slurry thus obtained. The removal of these components can be carried out by repeating rinsing, ultrafiltration, reverse osmosis, centrifugal separation and/or filtration.

Subsequently, the pigment thus sulfonated is added to an aqueous liquid (particularly ion-exchanged water or distilled water) in an amount such that the concentration thereof reaches 10 to 40% by weight. The solution can be optionally subjected to ordinary dispersion for a short period of time to obtain an aqueous dispersion of sulfonated pigment without going through a step of drying the pigment.

(Preparation of First Ink)

In a further preferred embodiment of the first ink, the penetrating agent is an acetylene glycol-based surface active agent, acetylene alcohol-based surface active agent, 1,2-alkylene glycol and/or glycol ether.

Among these penetrating agents, the acetylene alcohol-based surface active agent is 2,4-dimethyl-5-hexyne-3-ol, 2,4,7,9-tetramethyl-5-desyne-4,7-diol, 3,6-dimethyl-4- octine-3,6-diol and/or 2,4-dimethyl-5-hexyne-3-ol, 2,4,7,9-tetramethyl-5-desyne-4,7-diol or 3,6-dimethyl-4-octine-3,6-diol having 30 or less ethylene oxy groups and/or propylene oxy groups added thereto on the average. However, the present invention is not limited to these compounds.

1,2-Alkylene glycol is preferably 1,2-($C_{4-10}$ alkyl)diol, but the present invention is not limited thereto.

A preferred example of the acetylene alcohol-based surface active agent employable herein include is Surfynol 61 (produced by Air Products Inc.). Preferred example of 1,2-alkylene glycol employable herein include 1,2-pentanediol, and 1,2-hexanediol.
(For specific examples of the acetylene glycol-based surface active agent and glycol ether, reference can be made to the foregoing clause (Penetrating agent) in the article [Embodiment of ink of the invention])

In a still further preferred embodiment of the first ink, a material having a structure represented by the following general formula (1) can be further incorporated in the ink.

$$R—EOn_1—POm_1—X \tag{1}$$

wherein R represents a $C_{4-10}$ alkanol group which is an n-group and/or other isomers; EO represents an ethylene oxy group; PO represents a propylene oxy group, with the proviso that EO and PO are present in the molecule and their order of arrangement are arbitrary; X represents a hydrogen atom or —$SO_3M$ (in which M represents a hydrogen ion, alkaline metal, inorganic base or organic amine); and $n_1$ and $m_1$ each represent the number of repetition of EO and PO, respectively, which are each a value averaged over the entire system, i.e., from 0 to 10 and from 1 to 5, respectively.

In a still further preferred embodiment of the first ink, a particulate polymer can be incorporated in the ink. By incorporating such a particulate polymer in the first ink, the resulting recorded matter can be provided with enhanced water resistance, scratching resistance and/or gloss. The amount of the particulate polymer to be incorporated is preferably from 0.5 to 10% by weight from the standpoint of the foregoing "enhancement of water resistance, scratching resistance and gloss".

The foregoing particulate polymer is preferably in the form of resin emulsion comprising water as a continuous phase. Examples of the particulate polymer employable herein include acrylic resin, vinyl acetate-based resin, styrene-butadiene resin, vinyl chloride-based resin, acryl-styrene-based resin, butadiene-based resin, styrene-based resin, crosslinked acryl resin, crosslinked styrene resin, urethane resin, acrylamide resin, phenolic resin, silicone resin, epoxy resin, and mixture thereof.

In particular, when a film-forming particulate polymer is used, the polymer particles in the ink composition on the recording medium coalesce and fuse to each other to form a film, making it possible to further enhance the scratching resistance, water resistance and gloss of the recorded matter.

The term "film-forming particulate polymer" as used herein is meant to indicate a particulate polymer which, when kept at a temperature of not lower than the lowest film forming temperature, can undergo coalescence of particles to form a film.

In the first ink, the particulate polymer to be incorporated in the ink comprising a surface-treated pigment (pigment having a sulfur-containing dispersibility providing group chemically bonded to the surface thereof with a treatment containing sulfur) is preferably an anionic polymer which forms a film at a temperature of not higher than room temperature. The particulate polymer is preferably in the form of core-shell type dispersion from the standpoint of its stability in the ink.

The foregoing particulate polymer can be obtained in the form of resin emulsion normally by subjecting a monomer to emulsion polymerization in the presence of a surface active agent and a water-soluble polymerization initiator in water. For example, a resin emulsion of acrylic resin or styrene-acryl resin can be obtained by subjecting (meth) acrylic acid ester or (meth)acrylic acid ester and styrene to emulsion polymerization in the presence of a surface active agent and a water-soluble polymerization initiator.

The first ink can be prepared according to the process described in the clause (Preparation of the ink of the invention) of the article [Embodiment of the ink of the invention].

In the foregoing preparation process, the content of the foregoing surface-treated pigment (particulate pigment having a sulfur-containing dispersibility providing group chemically bonded to the surface thereof with a treatment containing sulfur) is preferably from 0.5 to 30% by weight, more preferably from 1.0 to 12% by weight, most preferably from 2 to 10% by weight. When the content of the foregoing pigment falls below 0.5% by weight, the resulting print density can be insufficient. On the contrary, when the content of the foregoing pigment exceeds 30% by weight, the amount of the moisture-retaining component to be incorporated in the ink is limited, causing the ink to clog the nozzle or giving a rise of the viscosity of the ink that makes it impossible for the ink to be ejected from the ink ejection nozzle securely.

The various physical properties of the first ink thus prepared can be properly controlled. In a still further preferred embodiment of the first ink, the viscosity of the ink is preferably 10 mPa.sec or less (20° C.), more preferably 5 mPa.sec or less (20° C.). The ink having this range of viscosity can be ejected from the ink ejection head securely. The surface tension of the ink can be properly controlled. In practice, however, it is preferably from 25 to 50 mN/m (20° C.), more preferably from 30 to 40 mN/m (20° C.).

<Embodiments of Second Ink of the Invention>

Embodiments of the implication of the second ink of the invention (hereinafter simply referred to as "second ink") will be hereinafter described partly with reference to its action.

The second ink is an ink for ink jet recording comprising at least a surface-treated pigment (particulate pigment having a sulfur-containing dispersibility providing group chemically bonded to the surface thereof with a treatment containing sulfur), a penetrating agent, and water, characterized in that the amount of the foregoing dispersibility providing group is $10 \times 10^{-6}$ equivalent or more per g of particulate pigment.

The introduced amount of the foregoing dispersibility providing group can be determined by treating an aqueous dispersion of the pigment by oxygen flask combustion method, allowing the pigment thus treated to be adsorbed by an aqueous solution of hydrogen peroxide, determining the amount of sulfuric acid ion (divalent) by ion chromatography, and then calculating from the results in terms of sulfonic acid group (monovalent) and/or sulfinic acid group (monovalent).

In a preferred embodiment of the second ink, there is used a surface-treated pigment wherein the foregoing dispersibility providing group is a sulfonic acid group (—$SO_2OH$) and/or sulfinic acid group (—$RSO_2H$ in which R is a $C_{1-12}$ alkyl or phenyl group or modification product thereof) and the absolute value of zeta-potential of particulate pigment at 20° C. and pH value of from 8 to 9 in a diluted ink solution obtained by diluting the ink with ion-exchanged water such that the concentration of the foregoing particulate pigment is from 0.001 to 0.01% by weight is 30 mV or more.

In another preferred embodiment of the second ink, the second ink is prepared by subjecting the sulfonic acid group and/or sulfinic acid group to ionic dissociation before the addition of the ink solvent mainly composed of water to further enhance the dispersibility of the particulate pigment during the preparation of the ink.
(Action)

As a method for minimizing the bleeding of printed image formed by an ink for ink jet recording there can be proposed a method which comprises minimizing the penetration of the ink into the recording paper. It is sure that if the surface tension of the ink is raised to prevent the ink from penetrating into the recording paper, the sizing effect of the recording paper causes the ink droplet thus deposited to be kept undeformed forever, making it possible to obtain an image free from bleeding and making it easy to obtain a desired print density. However, this method is disadvantageous in that the ink can be difficultly dried. In particular, the modern ink jet printer which normally operates on a full-color basis cannot employ such an ink because this ink cannot be prevented from causing color bleeding.

Accordingly, a method can be proposed which comprises adding a penetrating agent to the ink so that the ink can momentarily penetrate into the recording paper to prevent irregular bleeding of printed image. Such an ink can be fairly dried and cannot cause color bleeding.

However, the conventional ink having a particulate pigment dispersed in an aqueous medium with a dispersant such as various surface active agents and aqueous resin is disadvantageous in that such a penetrating agent can make the dispersibility of the particulate pigment unstable, more bleeding can occur, and a sufficient print density cannot be obtained. The reason why more bleeding occurs is presumably that the dispersant separated from the surface of the particulate pigment makes the penetrating power of the ink insufficient. The reason why a sufficient print density can be difficultly obtained is presumably that the dispersant and surface active agent adsorbed to the surface of the particulate pigment, which is a colorant, cause the ink solvent as well as the particulate pigment to penetrate and diffuse into the fibers constituting the paper, making it difficult to obtain a desired print density. Further, it can be thought that the incorporation of the dispersant complicates the composition of the ink, causing the various components of the ink to affect each other and hence making it difficult to obtain desired ink physical properties.

The second ink comprises a "particulate pigment a dispersibility providing group chemically bonded to the surface thereof in an amount of $10 \times 10^{-6}$ equivalent or more per g of particulate pigment with a treatment containing sulfur", a "penetrating agent" and "water". In this arrangement, a fast-drying image having a high print density can be obtained free from print bleeding. Further, the ink thus obtained has a high storage stability. Moreover, the ink can be easily prepared.

In other words, the foregoing particulate pigment having such a dispersibility providing group chemically bonded to the surface thereof undergoes electrical repulsion between the pigment particles (preferably upon the ionic dissociation of the dispersibility providing group chemically bonded to the surface of the particulate pigment) to secure the dispersion stability, i.e., storage stability of the ink. Accordingly, the action of the ink penetrating agent makes it easy for the conventional dispersant such as various surface active agents and water-soluble resins to be desorbed from the surface of the particulate pigment in the ink to keep a desired dispersion stability without easily impairing the dispersibility of the particulate pigment.

Incidentally, even such a particulate pigment having a dispersibility providing group chemically bonded to the surface thereof not only provides the ink with a deteriorated storage stability but also can difficultly provide a high print density when incorporated in an amount of less than $10 \times 10^{-6}$ equivalent per g of particulate pigment. This is presumably because the introduced amount of the dispersibility providing group is insufficient and the surface active agent and other components which have been added as penetrating agents are somewhat adsorbed by the surface of the particulate pigment, causing the particulate pigment to penetrate and diffuse into the fibers constituting the paper as in the case of the conventional pigment ink comprising a dispersant and hence making it impossible to obtain a desired print density.

Further, a "state in which a high print density can be obtained while securing a desired ink storage stability" from another numerical standpoint of view has been accomplished as a result of the inventors' experiment. In other words, by predetermining the absolute value of zeta-potential of particulate pigment at 20° C. and pH value of from 8 to 9 in a diluted ink solution obtained by diluting the ink with ion-exchanged water such that the concentration of the foregoing particulate pigment is from 0.001 to 0.01% by weight to 30 mV or more, the adsorption of the surface active agent to the surface of the particulate pigment can be prevented to obtain a high print density. Some inks don't exhibit a pH value of from 8 to 9 when simply diluted with ion-exchanged water. The inventors found that even these inks can satisfy requirements for excellent storage stability and high print density so far as the absolute value of zeta-potential of the particulate pigment the pH value of which is adjusted to a range of from 8 to 9 with a proper pH adjustor (e.g., 0.1 N hydrochloric acid or 0.1 N caustic soda) is 30 mV.

In particular, the use of a pigment dispersion (pigment+ alkaline compound+water) the surface tension of which is 65 mN/m or more at 20° C. makes it possible to raise the print density.
(Preparation of Surface-treated Pigment)

The surface-treated pigment to be incorporated in the second ink can be obtained by subjecting a known pigment to direct oxidation reaction in a solvent with a treatment containing sulfur as described later.

Examples of known inorganic pigments include carbon black, iron oxide pigment, titanium oxide, zinc white, chrome yellow, prussian blue, ultramarine, and red lead.

Examples of known organic pigments include quinacridone-based pigments such as quinacridone red and quinacridone magenta, phthalocyanine-based pigments such as phthalocyanine blue and phthalocyanine green, perylene-based pigments such as perylene red and perylene scarlet, insoluble azo-based pigments such as toluidine red, toluidine maroon, hanza yellow, benzidine yellow and pyrazolone red, soluble azo-based pigments such as lithol red, Helio Bordeaux, pigment scarlet and permanent red 2B, quinophthalone-based pigments, isoindolinone-based pigments such as isoindolinone yellow and isoindolinone orange, pyranthrone-based pigments such as pyranthrone red and pyranthrone orange, thioindigo-based pigments, condensed azo-based pigments, benzimidazolone-based pigments, flavanthrone yellow, acylamide yellow, quinophthalone yellow, nickel azo yellow, copper azo methine yellow, perynone orange, anthrone orange, dianthraquinonyl red, dioxazine violet, and derivatives from vat dye such as alizarin, indanthrone and thioindigo maroon.

Among the foregoing organic pigments, at least one organic pigment selected from the group consisting of quinacridone-based pigments, phthalocyanine-based pigments, benzimidazolone-based pigments, isoindolinone-based pigments and quinophthalone-based pigments is preferably used from the standpoint of fastness.

The pigment to be incorporated in the second ink is not limited to the foregoing pigments. Any pigments can be used so far as they are not dissolved in a sulfur-containing treatment as mentioned below. (For pigments which can be used herein, reference can be made to those exemplified in the clause
(Surface-treated Pigment) of the Foregoing Article [Embodiment of the Ink of the Invention])

Examples of the treatment containing sulfur employable herein include sulfuric acid, fuming sulfuric acid, sulfur trioxide, chlorosulfuric acid, fluorosulfuric acid, amidesulfuric acid, sulfonated pyridine, and sulfamic acid. Preferred among these treatments are sulfonating agents such as sulfur trioxide, sulfonated pyridine and sulfamic acid. These treatments may be used singly or in combination of two or more thereof. (The term "sulfonating agent" as used herein is meant to indicate a treatment for providing sulfonic acid ($-SO_2OH$) and/or sulfinic acid ($-RSO_2H$ in which R is a $C_{1-12}$ alkyl or phenyl group or modification product thereof)).

The foregoing sulfur trioxide can be complexed with a mixture of a solvent capable of complexing with sulfur trioxide (basic solvent such as N,N-dimethylformamidedioxane, pyridine, triethylamine and trimethylamine, nitromethane, acetonitrile, etc.) and one or more of solvents described later to advantage.

In particular, if sulfur trioxide itself exhibits too great a reactivity and thus causes the pigment to be decomposed or degenerated itself, or if the control over reaction by a strong acid is made difficult, the particulate pigment is preferably subjected to surface treatment (sulfonation in this case) with the foregoing complex of sulfur trioxide with tertiary amine.

With respect to a strong acid which can easily dissolve the particulate pigment therein so that reaction occurs to every molecule such as sulfuric acid, fuming sulfuric acid, chlorosulfuric acid and flurosulfuric acid, the reaction needs to be controlled. Thus, attention should be given to the kind and amount of the solvent described below.

The solvent to be used in the reaction is selected from those which don't react with the treatment containing sulfur and cannot or can difficultly dissolve the foregoing pigments therein. Examples of these solvents include sulfolane, N-methyl-2-pyrrolidone, dimethylacetamide, quinoline, hexamethylphosphoric triamide, chloroform, dichloroethane, tetrachloroethane, tetrachloroethylene, dichloromethane, nitromethane, nitrobenzene, liquid sulfur dioxide, carbon disulfide, and trichlorofluoromethane.

The treatment with a treatment containing sulfur can be accomplished by dispersing the particulate pigment in a solvent, adding a treatment containing sulfur to the dispersion, and then heating the mixture to a temperature of from 60° C. to 200° C. with stirring for 3 to 10 hours. In some detail, it is preferred that the particulate pigment be previously sheared and dispersed at a high speed by a high speed mixer or the like or impact-dispersed by a bead mill or jet mill to form a slurry (dispersion). Thereafter, the slurry is slowly stirred. To the slurry is then added a treatment containing sulfur so that a dispersibility providing group is introduced onto the surface of the particulate pigment. In this process, the determination of the amount of the dispersibility providing group to be introduced depends greatly on the reaction conditions and the kind of the treatment containing sulfur. Thereafter, the slurry is subjected to heat treatment. The solvent and remaining sulfur-containing treatment are removed from the slurry of particulate pigment. The removal of these components is carried out by repeating rinsing, ultrafiltration, reverse osmosis, centrifugal separation and/or filtration. The average particle diameter of the particulate pigment thus treated is preferably 25 $\mu$m or less, more preferably 1 $\mu$m or less as determined by laser scattering method.

The amount of the dispersibility providing group to be introduced onto the surface of the particulate pigment is preferably $10 \times 10^{-6}$ equivalent or more per g of particulate pigment. When the introduced amount of the dispersibility providing group falls below $10 \times 10^{-6}$ equivalent, agglomerates of pigment particles can be easily produced in the ink, causing the deterioration of storage stability such as viscosity change and making it impossible to obtain a high print density.

The upper limit of the introduced amount of the dispersibility providing group is not specifically limited. In practice, however, it is preferably $60 \times 10^{-6}$ equivalent or less from the standpoint of cost because when it is not lower than $60 \times 10^{-6}$ equivalent, the effect of improving the storage stability cannot be exerted more as the introduced amount of the dispersibility providing group increases. Further, when the dispersibility providing group is introduced in an amount exceeding this limit, the pigment is water-solubilized (rendered dye-like), causing the deterioration of water resistance and dispersion stability.

(Preparation of Second Ink)

The second ink can be prepared according to the process described in the clause (Preparation of the ink of the invention) of the foregoing article [Embodiment of the ink of the invention].

In the foregoing preparation process, the content of the foregoing surface-treated pigment (particulate pigment having a sulfur-containing dispersibility providing group chemically bonded to the surface thereof with a treatment containing sulfur) is preferably from 0.5 to 30% by weight, more preferably from 1.0 to 12% by weight, most preferably from 2 to 10% by weight as in the case of the foregoing first ink. When the content of the foregoing pigment falls below 0.5% by weight, the resulting print density can be insufficient. On the contrary, when the content of the foregoing pigment exceeds 30% by weight, the amount of the moisture-retaining component to be incorporated in the ink is limited, causing the ink to clog the nozzle or giving a rise of the viscosity of the ink that makes it impossible for the ink to be ejected from the ink ejection nozzle securely.

The various physical properties of the second ink thus prepared can be properly controlled. In a preferred embodiment of the second ink, when the ink is diluted with ion-exchanged water such that the concentration of particulate pigment is from 0.001 to 0.01% by weight, the absolute value of zeta-potential of the particulate pigment at 20° C. and pH of from 8 to 9 is preferably 30 mV or more from the standpoint of print density. This range of the absolute value of zeta-potential can be realized by predetermining the amount of the dispersibility providing group to be introduced onto the surface of the particulate pigment to a specific value ($10 \times 10^{-6}$ equivalent or more). (The adjustment of pH value is made using sodium hydroxide and hydrochloric acid)

The viscosity of the ink is preferably 10 mPa.sec or less (20° C.), more preferably 5 mPa.sec or less (20° C.). The ink having this range of viscosity can be ejected from the ink ejection head securely.

The surface tension of the ink can be properly controlled by optimizing the added amount of the penetrating agent (acetylene glycol-based surface active agent and/or glycol ether). In practice, however, it is preferably from 25 to 50 mN/m (20° C.), more preferably from 30 to 40 mN/m (20° C.).

<Embodiments of Implication of the Third Ink of the Invention>

Embodiments of the implication of the third ink of the invention (hereinafter simply referred to as "third ink") will be hereinafter described partly with reference to its action.

The third ink is an ink for ink jet recording comprising at least a particulate pigment, a penetrating agent and water, characterized in that the particulate pigment has a sulfonic acid anion group ($-SO^{3-}$) and/or sulfinic acid anion group ($-RSO_2$ in which R is a $C_{1-12}$ alkyl or phenyl group or modification product thereof) chemically bonded to the surface thereof and the counter cation of the sulfonic acid anion group and/or the counter cation of the sulfinic acid anion group is selected from the group consisting of alkaline metal ions and monovalent ions represented by the chemical formula $(R_1R_2R_3R_4N)^+$ (in $R_1$, $R_2$, $R_3$, and $R_4$ may be the same or different and each represent a hydrogen atom, alkyl group, hydroxylalkyl group or halogenated alkyl group).

(Action)

The technical problem with ink for ink jet recording is as described in detail in the clause "Action" of the foregoing article of the second ink.

Due to the foregoing characteristics, the third ink can provide a fast-drying image having a high print density free from print bleeding. Further, the third ink exhibits a high storage stability. Moreover, the third ink can be easily prepared.

In a preferred embodiment of the third ink, the counter cation of the sulfonic acid anion group and/or the counter cation of the sulfinic acid anion group comprises at least one of lithium ion ($Li^+$), sodium ion ($Na^+$), potassium ion ($K^+$), ammonium ion ($NH_4^+$) and alkanolamine cation.

More preferably, the foregoing cation comprises sodium ion ($Na^+$) and ammonium ion ($NH_4^+$).

In other words, such a particulate pigment undergoes dissociation of the sulfonic acid anion group and/or sulfinic acid anion group introduced onto the surface thereof. Thus, electrical repulsion occurs between pigment particles to secure dispersion stability.

Accordingly, the action of the ink penetrating agent makes it easy for the conventional dispersant such as various surface active agents and water-soluble resins to be desorbed from the surface of the particulate pigment in the ink to keep a desired dispersion stability without easily impairing the dispersibility of the particulate pigment.

According to the inventors' knowledge, when the foregoing counter cation of the sulfonic acid anion group and/or the foregoing counter cation of the sulfinic acid anion group is $Na^+$, an image having a high print image can be obtained. When the foregoing counter cation of the sulfonic acid anion group and/or the foregoing counter cation of the sulfinic acid anion group is $NH_4^+$, the storage stability (dispersion stability) of the ink can be enhanced. Accordingly, when the counter cation comprises at least $Na^+$ and $NH_4^+$, the image can be provided with a desired print density and storage stability at the same time.

In another preferred embodiment of the third ink, the total amount of alkaline metal ion in the liquid component (vehicle) of the ink is 10,000 ppm or less. When the total amount of alkaline metal ion exceeds 10,000 ppm, the pigment particles undergo agglomeration and precipitation. Accordingly, in order to secure the ink with a desired storage stability, the total amount of alkaline metal ion in the liquid component (vehicle) is preferably 10,000 ppm or less, more preferably 2,000 ppm or less, even more preferably 1,000 ppm or less.

The term "liquid component" as used herein is meant to indicate a "liquid portion (filtrate)" holding a solid portion such as particulate pigment dispersed therein. Accordingly, by measuring by any known method the amount of alkaline metal ion contained in the supernatant liquid separated from the precipitated component by centrifugally processing the third ink, the amount of alkaline metal ion contained in the "liquid component" can be determined. (The term "total amount of alkaline metal ion in the liquid component" is meant to include not only cation with sulfonic acid anion group or sulfinic acid group chemically bonded to the surface of the particulate pigment as counter anion but also alkaline metal ions with other counter anions)

(Preparation of Surface-treated Pigment)

The surface-treated pigment to be incorporated in the third ink can be obtained by preparing a "particulate pigment having a sulfonic acid anion group and/or sulfinic acid anion group chemically bonded to the surface thereof (surface-treated pigment)", and then treating the particulate pigment with an alkaline compound according to the process described in the clause (Preparation of surface-treated pigment) of the foregoing article [Embodiment of the second ink of the invention].

The "amount of sulfonic acid group and/or sulfinic acid group to be introduced" into the surface-treated pigment thus prepared is preferably $10 \times 10^{-6}$ equivalent or more per g of particulate pigment as in the surface-treated pigment to be incorporated in the foregoing second ink. The reason is as mentioned above.

Subsequently, the foregoing "particulate pigment having a sulfonic acid anion group and/or sulfinic acid anion group chemically bonded to the surface thereof (surface-treated pigment)" is treated with an alkaline compound.

As such an alkaline compound there may be selected from alkaline compounds having as cations alkaline metal ions or monovalent ions represented by the chemical formula $(R_1R_2R_3R_4N)^+$ (in $R_1$, $R_2$, $R_3$, and $R_4$ maybe the same or different and each represent a hydrogen atom, alkyl group, hydroxylalkyl group or halogenated alkyl group). Preferred among these alkaline compounds is one wherein the cation is an alkanolamine cation such as lithium ion ($Li^+$), potassium ion ($K^+$), sodium ion ($Na^+$), ammonium ion ($NH_4^+$) and triethanolamine cation.

From the standpoint of print density of image and storage stability, the counter ion of sulfonic acid anion group and/or the counter ion of sulfinic acid anion group preferably comprises $Na^+$ and $NH_4^+$. Accordingly, a mixture of an alkaline compound wherein the cation is $Na^+$ and an alkaline compound wherein the cation is $NH_4^+$ is preferably used. The reason is as described above.

As the anion constituting the alkaline compound there is preferably used a hydroxide anion. Specific examples of such a hydroxide anion employable herein include ammonia, alkalnolamine (monoethanolamine, diethanolamine, N,N-butylethanolamine, triethanolamine, propanolamine, aminomethylpropanol, 2-aminoisopropanol, etc.), and hydroxide of monovalent alkaline metal (e.g., LiOH, NaOH, KOH).

As the mixture of an alkaline compound wherein the cation is sodium ion ($Na^+$) and an alkaline compound whereon the cation is ammonium ion ($NH_4^+$) there is preferably used a mixture of sodium hydroxide and ammonium hydroxide.

In this case, the processing maybe effected in two stages. For example, the alkaline compound may be treated with sodium hydroxide so that the counter ion of sulfonic acid anion group and/or the counter ion of sulfinic acid anion group is sodium ion. To the alkaline compound may then be added a predetermined amount of ammonia so that a part of sodium ion is converted to ammonium ion.

The amount of the foregoing alkaline compound to be added is preferably not lower than the neutralization equivalent of sulfonic acid group and/or sulfinic acid group in the particulate pigment. The amount of a volatile additive such as ammonia and alkanolamine to be added is preferably not lower than about 1.5 times the neutralization equivalent.

Thereafter, the alkaline compound may be washed with ion-exchanged water so that the pigment is isolated therefrom before proceeding to the process for the preparation of ink described later. However, even if the alkaline compound is left in excess at the equivalent point with respect to sulfonic acid group and/or sulfinic acid group, there occurs no problem [with the proviso that if the cation seed is an alkaline metal, the total amount of the cation in the liquid component (vehicle) is preferably 10,000 ppm or less]. Accordingly, the reaction solution which has been treated with the alkaline compound may be used as a solution for the preparation of the ink as it is. Alternatively, the alkaline compound may be added during the step of preparing the ink mentioned above so that the sulfonic acid group and/or sulfinic acid group is converted to sulfonic acid anion group and/or sulfinic acid anion group.

The foregoing procedure can be accomplished by putting the particulate pigment having a sulfonic acid group and/or sulfinic acid group chemically bonded to the surface thereof in the alkaline compound, and then shaking the mixture by a paint shaker or the like.

(Preparation of Third Ink)

The third ink can be prepared according to the process described in the clause (Preparation of the ink of the invention) of the foregoing article [Embodiment of the ink of the invention](At the step of preparing an ink, the particulate pigment having a sulfonic acid group and/or sulfinic acid group chemically bonded thereto may be reacted with the foregoing alkaline compound to produce a particulate pigment having a sulfonic acid anion group and/or sulfinic acid anion group chemically bonded to the surface thereof)

In the foregoing preparation process, the content of "particulate pigment having a sulfonic acid anion group and/or sulfinic acid anion group chemically bonded to the surface thereof (surface-treated pigment)" in the ink is preferably from 0.5 to 30% by weight, more preferably from 1.0 to 12% by weight as in the case of the foregoing first and second inks.

When the content of the foregoing pigment falls below 0.5% by weight, the resulting print density can be insufficient. On the contrary, when the content of the foregoing pigment exceeds 30% by weight, the amount of the moisture-retaining component to be incorporated in the ink is limited, causing the ink to clog the nozzle or giving a rise of the viscosity of the ink that makes it impossible for the ink to be ejected from the ink ejection nozzle securely.

The various physical properties of the third ink thus prepared can be properly controlled. In a preferred embodiment of the third ink, the total amount of alkaline metal ion in the liquid component (vehicle) is 10,000 ppm or less (preferably 2,000 ppm or less, more preferably 1,000 ppm or less) to secure the ink with a desired storage stability.

As in the foregoing second ink, the absolute value of zeta-potential of particulate pigment at 20° C. and pH value of from 8 to 9 in a diluted ink solution obtained by diluting the ink with ion-exchanged water such that the concentration of the foregoing particulate pigment is from 0.001 to 0.01% by weight is preferably 30 mV or more particularly from the standpoint of print density. The predetermination of the absolute value of zeta-potential of particulate pigment to this range can be accomplished by predetermining the amount of dispersibility providing group to be incorporated onto the surface of the particulate pigment to a specific value.

As in the foregoing first and second inks, the viscosity of the ink composition is preferably 10 mPa.sec or less, more preferably 5 mPa.sec or less (20° C.). The ink having a viscosity falling within this range can be ejected from the ink ejection head more securely.

The surface tension of the ink can be properly controlled by optimizing the added amount of the penetrating agent (acetylene glycol-based surface active agent and/or glycol ether). In practice, however, it is preferably from 25 to 50 mN/m (20° C.), more preferably from 30 to 40 mN/m (20° C.).

<Embodiments of Implication of Fourth Ink of the Invention>

Embodiments of the implication of the fourth ink of the invention (hereinafter simply referred to as "fourth ink") will be hereinafter described partly with reference to its action.

The fourth ink is an ink for ink jet recording comprising at least a surface-treated pigment (surface-treated pigment independently dispersible in an aqueous solvent having a sulfur-containing dispersibility providing group chemically bonded to the surface thereof with a treatment containing sulfur), a penetrating agent and water, characterized in that there are incorporated one or more selected from the group consisting of oxazolidine-based compound, alkylisothiazolone, chloroalkylisothiazolone, benzisothiazolone, bromonitroalcohol and chloroxylenol. In this arrangement, an ink can be provided having excellent preservability and mildew resistance in addition to the effects exerted by the foregoing first to third inks.

The technical problem with ink for ink jet recording method is as described in detail in the clause "Action" in the foregoing second ink. In addition to this technical problem, the inventors obtained the following knowledge particularly during the development of the fourth ink.

The inventors could prevent bleeding and improve dryability and print density by using as an ink penetrating agent an acetylene glycol-based surface active agent, acetylene alcohol-based surface active agent, 1,2-alkylene glycol and/or glycol ether and as a means for providing the colorant with dispersion stability a surface-treated pigment which doesn't undergo adsorption/desorption of dispersant on the surface thereof when added to the ink (surface-treated pigment having a dispersibility providing group chemically bonded to the surface thereof, including those used in the foregoing first to third inks).

On the other hand, the ink jet recording solution may normally comprise a preservative incorporated therein for the sake of mildewproofing and preservation. The fourth ink is an "ink for ink jet recording comprising at least a surface-treated pigment (surface-treated pigment independently dispersible in an aqueous solvent having a sulfur-containing dispersibility providing group chemically bonded to the surface thereof with a treatment containing sulfur), a penetrating agent and water and thus is a self-dispersion type pigment which relies only on electrostatic repulsion with respect to dispersion stability retention from the structural standpoint of view. Accordingly, special care should be given to the selection of "low molecular mildewproofing agent/preservative which destroys ion balance to have an adverse effect on the establishment of the storage stability of the ink".

Then, the inventors found that "oxazolidine-based compound, alkylisothiazolone, chloroalkylisothiazolone, benzisothiazolone, bromonitroalcohol and chloroxylenol" can be used as a mildewproofing agent/preservative in combination with a sulfonated self-dispersion type pigment. Thus, the present invention (fourth ink) has been worked out.

The reason why the foregoing mildewproofing agent/preservative is effective specifically for the establishment of dispersion stability is not yet made clear. However, it is presumed that the foregoing oxazolidine-based compound is not structured so as to destroy the electrical dissociation of sulfonic acid group and thus reduce the electrostatic repulsion.

In a preferred embodiment of the fourth ink, the surface-treated pigment as used in the foregoing first to third inks is used, but the present invention is not limited thereto. As the oxazolidine-based compound to be incorporated in the fourth ink there is preferably used 4,4-dimethyloxazolidine. As the alkylisothiazolone there is preferably used octylisothiazolone and/or methylisothiazolone. As the chloroalkylisothiazolone there is preferably used chloromethylisothiazolone. These compounds can be blended to provide an ink having excellent preservability and mildew resistance.

The amount of these compounds to be incorporated is preferably from 0.01 to 0.5% by weight. When the added amount of these compounds falls below 0.01% by weight, the desired preservability and mildew resistance can be difficultly obtained. On the contrary, when the added amount of these compounds exceeds 0.5% by weight, the resulting ink tends to undergo change in physical properties during storage.

<Embodiment of Implication of the Fifth Ink of the Invention>

Embodiments of the implication of the fifth ink of the invention (hereinafter simply referred to as "fifth ink") will be hereinafter described partly with reference to its action.

The fifth ink gives, as a technical constitution for accomplishing the foregoing [object (problem) of ink for ink jet recording (fifth ink of the invention)], an ink for ink jet recording comprising a surface-treated pigment (particulate pigment having a sulfur-containing dispersibility providing group chemically bonded to the surface thereof with a treatment containing sulfur), a penetrating agent and water, characterized in that the penetrating agent is a material having a structure represented by the following general formula (2), an acetylene glycol-based surface active agent, an acetylene alcohol-based surface active agent, 1,2-alkylene glycol and/or glycol ether.

$$R\text{—}EOn_2\text{—}POm_2\text{—}X \qquad (2)$$

wherein R represents a $C_{4-10}$ alkanol group which is an n-group and/or other isomers; EO represents an ethylene oxy group; PO represents a propylene oxy group, with the proviso that EO and PO are present in the molecule and their order of arrangement are arbitrary; X represents a hydrogen atom or —$SO_3M$ (in which M represents a hydrogen ion, alkaline metal, inorganic base or organic amine); and $n_2$ and $m_2$ each represent the number of repetition of EO and PO, respectively, which are each a value averaged over the entire system.

(Action)

The surface-treated pigment to be incorporated in the fifth ink is fast to the material having a structure represented by the foregoing general formula (2), acetylene glycol-based surface active agent, acetylene alcohol-based surface active agent, 1,2-alkylene glycol or glycol ether which is used as a penetrating agent and thus can withstand severer conditions than the dispersion of pigment with a dispersant and is fast to low to high temperatures. Thus, this surface-treated pigment can be used over a wide temperature range. Further, since this surface-treated pigment can act as a pigment, an ink for ink jet recording excellent in water resistance and light-resistance can be realized for the first time.

(Preparation of Surface-treated Pigment)

The surface-treated pigment to be incorporated in the fifth ink can be obtained by the process described in the clause (Preparation of surface-treated pigment) of the foregoing article [Embodiment of the first ink of the invention], but the present invention should not be construed as being limited thereto.

(Penetrating Agent)

The penetrating agent to be incorporated in the fifth ink is a material having a structure represented by the foregoing general formula (2), acetylene glycol-based surface active agent, acetylene alcohol-based surface active agent, 1,2-alkylene glycol and/or glycol ether.

Among these penetrating agents, as the acetylene glycol-based surface active agent and glycol ether there may be used those exemplified in the clause (Penetrating agent) of the foregoing article [Embodiment of implication of the ink of the invention]. As the acetylene alcohol-based surface active agent and 1,2-alkylene glycol there may be used those exemplified in the clause (Preparation of the first ink) of the foregoing article [Embodiment of implication of the ink of the invention].

As the material having a structure represented by the foregoing general formula (2), i. e., material having a structure represented by R—$EOn_2$—$POm_2$—X (2) there is preferably used one wherein R is a butyl group, pentyl group, hexyl group, heptyl group, octyl group, nonyl group and/or decyl group. More preferably, the butyl group is mainly composed of n-butyl group, isobutyl group and/or t-butyl group, the pentyl group is mainly composed of n-pentyl group and/or other isomers, the hexyl group is mainly composed of n-hexyl group and/or other isomers, the heptyl group is mainly composed of n-heptyl group and/or other isomers, the octyl group is mainly composed of n-octyl group and/or other isomers, the nonyl group is mainly composed of n-nonyl group and/or other isomers, and the decyl group is mainly composed of n-decyl group and/or other isomers.

In a preferred embodiment of the fifth ink, $n_2$ and $m_2$ in the foregoing general formula (2) are from 0 to 10 and from 1 to 5, respectively, and the average molecular weight of the material represented by the foregoing general formula (2) is 2,000 or less.

It was found that due to the incorporation of the foregoing penetrating agent, the fifth ink gives less print bleeding when printed on general paper called ordinary paper. It was also found that the use of a material having a structure represented by the foregoing general formula (2), too, has the same or more effect of eliminating print bleeding.

When R in the foregoing general formula (2) is methyl group, ethyl group or pentyl group, which is lower than butyl group, which has four carbon atoms, the resulting penetrating group can be difficultly provided with enhanced penetrating power and thus has a reduced effect of eliminating print bleeding In a preferred embodiment, R is a butyl group, pentyl group, heptyl group or octyl group. More preferably, R is a butyl group, pentyl group or hexyl group.

Referring further, when R in the foregoing general formula (2) is a pentyl group or higher group, the resulting penetrating agent becomes less water-soluble and thus requires the use of a dissolution aid. Further, there results in not too a great improvement of print quality.

Referring still further, when R in the foregoing general formula (2) is a pentyl group or higher group and X in the general formula (2) is a hydrogen atom, the resulting penetrating agent becomes less water-soluble and thus requires the use of a dissolution aid, making it difficult to provide an effect of enhancing print quality.

It is preferred that $n_2$ and $m_2$ in the foregoing general formula (2) be from 0 to 10 and from 1 to 5, respectively. When $n_2$ and $m_2$ fall outside this range, desired penetrating power can be difficultly obtained. When the number of carbon atoms in R is 4 or less, and the average value of $n_2$ and $m_2$ are 1 or less at the same time, the resulting penetrating agent has a raised vapor pressure to evaporate at ordinary temperature, causing the clogging of the nozzle in the head. On the contrary, when $n_2$ exceeds 10, more bubbles can occur to disturb print. When $m_2$ exceeds 5, the resulting penetrating agent exhibits an enhanced hydrophobicity and hence a lowered water-solubility even if $n_2$ is 10.

The suffixes $n_2$ and $m_2$ each indicate a value averaged over the ink system. Thus, each molecule is based on a system having a distribution of molecular weights. However, the system may be monodisperse.

The material of the foregoing general formula (2) is formed by adding ethylene oxide or propylene oxide to an alkyl alcohol as a starting material in an atmosphere of alkali or the like in a desired molar amount. Thus, the material of the general formula (2) is normally not monodisperse. However, the material of the general formula (2) may go through a process such as distillation to become monodisperse before use.

However, residual alcohol is preferably present in the ink system in an amount of 1% by weight or less. When the content of residual alcohol exceeds 1% by weight, wetting occurs on the surface of the nozzle in the head, causing deterioration of print quality or giving problems such as generation of alcoholic odor.

In another preferred embodiment of the fifth ink, the material represented by the foregoing general formula (2) comprises the foregoing 1,2-alkylene glycol incorporated therein in an amount of from 0 to 10% by weight. When the content of 1,2-alkylene glycol exceeds 10%, there can be exerted no more effect of improving the print quality and causes a viscosity rise. Thus, this range of the content of 1,2-alkylene glycol is not suitable for ink jet recording, particularly using a head comprising an electrostriction element.

More preferably, the foregoing 1,2-alkylene glycol is a 1,2-pentanediol and/or 1,2-hexanediol having 5 and/or 6 carbon atoms. Most preferably, the foregoing 1,2-alkylene glycol is 1,2-hexanediol.

In a further preferred embodiment of the fifth ink, the material represented by the foregoing general formula (2) comprises the foregoing acetylene glycol-based surface active agent incorporated therein in an amount of from 0 to 5% by weight. The further incorporation of the acetylene glycol-based surface active agent makes it possible to further improve the print quality. The amount of the acetylene glycol-based surface active agent to be incorporated is preferably from 0 to 5% by weight. Even when the acetylene glycol-based surface active agent is added in an amount of more than 5% by weight, improvement of print quality can be difficultly perceived more, and there may occur troubles such as viscosity rise. More preferably, the amount of the acetylene glycol-based surface active agent to be incorporated is from 0.1 to 2% by weight.

The fifth ink may comprise any of preservative, oxidation inhibitor, electrical conductivity adjustor, pH adjustor, viscosity modifier, surface tension adjustor, oxygen absorber, etc. incorporated therein as other components.

The fifth ink may further comprise various sucroses incorporated therein to prevent itself from being dried on the front face of the nozzle to clog the nozzle. There are monosaccharide and polysaccharide. Examples of these sucroses employable herein include glucose, mannose, fructose, ribose, xylose, arabinose, lactose, galactose, aldonic acid, glucitose, maltose, cellobiose, sucrose, trehalose, maltotriose, alginic acid, salt thereof, cyclodextrin, and cellulose. The amount of these sucroses to be incorporated is preferably from 0.05% to 30%. When the amount of these sucroses to be incorporated falls below 0.05%, there can be a reduced effect of recovering from clogging of the tip of the head caused by drying of the ink. On the contrary, when the amount of these sucroses to be incorporated exceeds 30%, the resulting ink exhibits a raised viscosity that makes it impossible to effect proper printing.

The amount of ordinary monosaccharide or polysaccharide such as glucose, mannose, fructose, ribose, xylose, arabinose, lactose, galactose, aldonic acid, glucitose, maltose, cellobiose, sucrose, trehalose and maltotriose to be incorporated is more preferably from 3 to 20%. Alginic acid, salt thereof, cyclodextrin or cellulose needs to be added in an amount such that the resulting ink doesn't have too high a viscosity.

<Embodiment of Implication of the Ink Set of the Invention>

Embodiments of the implication of the ink set for ink jet recording according to the invention (hereinafter simply referred to as "ink set of the invention") will be hereinafter described partly with reference to its action.

The ink set of the invention is an ink set for ink jet recording comprising at least a pigment, a penetrating agent, and water, characterized in that the pigment is a surface-treated pigment (surface-treated particulate pigment having a sulfur-containing dispersibility providing group chemically bonded to the surface thereof with a treatment containing sulfur) comprising in combination 4 color pigments, i.e., black, yellow, magenta and cyan or 6 color pigments, i.e., black, yellow, magenta, cyan, orange and green.

In a preferred embodiment of the ink set of the invention, the surface-treated pigment is a "surface-treated pigment having a dispersibility providing group present thereon in an amount of $10 \times 10^{-6}$ equivalent or more per g of particle pigment" as used in the foregoing second ink.

(Action)

The ink set of the invention comprises in combination four color pigments, i.e., black (surface-treated black particulate pigment), yellow (surface-treated yellow particulate pigment), magenta (surface-treated magenta particulate pigment) and cyan (surface-treated cyan particulate pigment) each comprising a particulate pigment having a dispersion providing group chemically bonded to the surface thereof with a treatment containing sulfur. In this arrangement, an ink set for ink jet recording can be provided which allows the optimization of pigment density, extremely easy design of pigment ink and development of desired half tone colors and can give a good color image.

Further, the ink set of the invention comprises orange (surface-treated orange particulate pigment) and green (surface-treated green particulate pigment) each comprising a surface-treated particulate pigment having a dispersibility providing group chemically bonded thereto in addition to the foregoing four colors, totaling six colors. In this arrangement, an ink set for ink jet recording can be provided which can provide a better color image, particularly good hue.

In a preferred embodiment of the ink set of the invention, the amount of the dispersibility providing group provided on the foregoing surface-treated particulate pigment can be predetermined to a specific value ($10 \times 10^{-6}$ equivalent or more per g of particulate pigment) to further improve the "dispersion stability of the ink".

Referring further to the effect of the ink set of the invention, the ink set of the invention gives, as a first aspect of the technical constitution, a combination of surface-treated particulate pigments. In this arrangement, there can be exerted the following effect.

The surface-treated pigment particles can merely undergo electrostatic repulsion in the ink to keep desired dispersion stability. This means that it is not necessary to optimize the kind and amount of various dispersants with respect to the pigment used for the purpose of adjusting the physical properties. (Even if the ink of the type comprising the conventional dispersant can be properly adjusted with respect to physical properties, it cannot be designed for various kinds of recording papers. This is presumably attributed to the fact that a pigment comprises various molecular skeletons and thus shows different affinities for ink solvent from one portion to another.)

In the present invention, by chemically bonding a sulfur-containing dispersibility providing group to a particulate pigment and uniformly acidifying the surface of the particulate pigment, the affinity of the particulate pigment for ink solvent can be uniformalized. In this arrangement, the optimization of the pigment concentration is made possible, making it extremely easy to design the pigment ink.

Further, by predetermining the amount of the foregoing dispersibility providing group to a specific value ($10 \times 10^{-5}$ equivalent or more per g of particulate pigment), the "agglomeration of pigment in the ink, change of ink viscosity, etc." can be further inhibited, making it possible to further improve the "dispersion stability and storage stability of the ink".

The ink set of the invention gives, as a second aspect of the technical constitution, a combination of specific surface-treated particulate pigments. In other words, four colors, i.e., surface-treated black particulate pigment, surface-treated yellow particulate pigment, surface-treated magenta particulate pigment, and surface-treated cyan particulate pigment, are combined. Alternatively, surface-treated orange particulate pigment and surface-treated green particulate pigment are combined in addition to the foregoing four colors to provide a six color ink set.

An ink set comprising three colors, i.e., yellow ink composition, magenta ink composition and cyan ink composition, is normally used in color ink jet recording process. By using this ink set in combination with black (surface-treated black pigment) and optionally orange (surface-treated orange pigment) and green (surface-treated green pigment), the following effect can be exerted.

The use of the ink set of the invention makes it possible to expand the range of color reproducibility of color image. In particular, the color reproducibility of red system and green system can be improved.

The red and green saturation of the image obtained by the conventional ordinary color ink jet recording method are about 60 and 70, respectively. The use of the ink set of the invention makes it possible to realize a saturation of 70 or more.

The use of the ink set of the invention makes it possible to express a close half tone color.

In accordance with the ink jet recording method, a color image is expressed on a two-value control basis in which a color ink composition is "printed/not printed". Accordingly, the number of colors which can be expressed is limited due to resolution. The ink set of the invention comprises orange (surface-treated orange pigment) and green (surface-treated green pigment) in addition to the foregoing four colors to exert a remarkable effect by which the number of colors which can be expressed can be drastically increased.

Further, the ink set of the invention comprises a colorant as a pigment to exert the following effect.

An ink comprising a colorant as a pigment exhibits a lower transparency than an ink comprising a dye as a colorant. Accordingly, when two or more color ink compositions are printed at the same time, the printed surface tends to have a lowered brightness as well as lowered saturation. This tendency becomes remarkable when red or green is printed in the case where the amount of ink attached per unit area increases.

In the ink set of the invention, the use of an orange pigment (surface-treated orange pigment) and a green pigment (surface-treated particulate green pigment) in particulate makes it possible to reduce the attached amount of ink during printing of red or green color and hence obtain a printed matter having a high brightness and saturation. This phenomenon can be observed with dye inks as well. However, this effect can be exerted more with pigments which can provide an ink composition with a lowered transparency.

Further, an effect which can be normally exerted with the case where a pigment is used as a colorant, i.e., high water resistance and weathering resistance can be attained at the same time.

The combination of four color pigments (combination of surface-treated particulate black pigment, surface-treated particulate yellow pigment, surface-treated particulate magenta pigment and surface-treated particulate cyan pigment) cannot have an expanded range of color reproducibility (half tone color in particular) as compared with the combination of six color pigments, which comprises two color pigments, i.e., surface-treated particulate orange pigment and surface-treated particulate green pigment in addition to the four color pigments but can attain sufficient range of color reproducibility and a low cost with respect to ordinary paper (printed matters required in office).

(Surface-treated Pigment)

The surface-treated pigment (surface-treated particulate pigment having a dispersibility providing group chemically bonded to the surface thereof with a treatment containing sulfur) to be incorporated in the ink set of the invention can be prepared by the method described in detail in the clause (Surface-treated pigment) of the foregoing article

[Embodiments of Implication of the Second Ink]

In other words, as described in the foregoing clause, the surface-treated pigment can be obtained by subjecting a pigment such as black pigment, yellow pigment, magenta pigment, cyan pigment, orange pigment and green pigment to direct oxidation reaction in a solvent with a treatment containing sulfur.

The amount of the dispersibility providing group to be introduced into the surface-treated pigment is not specifically limited in the invention. In practice, however, it is preferably $10\times10^{-6}$ equivalent or more per g of particulate pigment. When the introduced amount of dispersibility providing group falls below $10\times10^{-6}$ equivalent, the ink can easily give an agglomerate of pigment particles that can not only cause deterioration of storage stability such as viscosity change but also occasionally makes it impossible to obtain a high print density.

The upper limit of the introduced amount of dispersibility providing group is not specifically limited. In practice, however, it is preferably $60\times10^{-6}$ equivalent or less from the standpoint of cost because when it is $60\times10^{-6}$ equivalent or more, the enhancement of the effect of improving the ink storage stability accompanying the increase of the introduced amount of dispersibility providing group cannot be recognized.

The kind of the pigments to be incorporated in the ink set of the invention is not specifically limited. In practice, however, as a black pigment there is preferably used C.I. pigment black 7, as yellow pigments there are preferably used one or more of the foregoing surface-treated yellow pigments such as C.I. pigment yellow 55, 74, 97, 109, 110, 128, 138, 147, 151, 154, and 180, as magenta pigments there are preferably used one or more of C.I. pigment red 122, 202, and 209, and C.I. pigment violet 19, as cyan pigments there are preferably used one or more of C.I. pigment blue 15, 15:1, 15:2, 15:3, 15:4, 15:6, and 16, as orange pigments there are preferably used one or more of C.I. pigment orange 43 and 36, and as green pigments there are preferably used one or more of C.I. pigment green 7 and 36.

The reason for this arrangement is that the use of these pigments makes it possible to obtain a good printed matter having a higher saturation than by the use of other pigments. This is also because this arrangement can satisfy requirements for ink composition for use in ink jet recording such as storage stability and clogging resistance.

<Embodiments of Implication of the Ink Cartridge of the Invention>

Embodiments of implication of the ink cartridge of the invention will be described hereinafter.

The ink cartridge of the invention is an ink cartridge comprising an ink impregnating foam and an ink incorporated in the ink impregnating foam, characterized in that the ink comprises at least a surface-treated pigment (particulate pigment having a sulfur-containing dispersibility providing group provided on the surface thereof), a penetrating agent and water and the content of sulfur in the liquid component in the ink incorporated in the ink impregnating foam is 2,000 ppm or less as calculated in terms of $SO_4^{2-}$ ion.

In other words, the ink cartridge of the invention comprises the foregoing first ink incorporated therein as an ink to be incorporated in the ink impregnating foam.

Accordingly, in a preferred embodiment of the ink cartridge of the invention, the content of sulfur in the liquid component in the ink incorporated in the ink impregnating foam is 2,000 ppm or less (preferably 1,000 ppm or less) as calculated in terms of $SO_4^{2-}$ ion and the content of polyvalent metal ions in the liquid component is preferably 800 ppm or less (more preferably 600 ppm or less, most preferably 400 ppm or less) as in the first ink.

In another preferred embodiment of the ink cartridge of the invention, the foregoing pigment is a carbon black pigment and/or organic pigment. In a further embodiment of the ink cartridge of the invention, the foregoing penetrating agent is an acetylene glycol-based surface active agent, acetylene alcohol-based surface active agent, 1,2-alkylene glycol and/or glycol ether. All these embodiments are the same as that of the first ink of the invention.

In a still further preferred embodiment of the ink cartridge of the invention, the foregoing foam is a urethane foam. The foregoing urethane foam can be a foam prepared in the presence of an organic metal compound (e.g., organic tin compound) as a catalyst. The added amount of the foregoing organic metal compound can range from 0.01 to 0.2% by weight based on the total weight of the urethane foam.

In a still further preferred embodiment of the ink cartridge of the invention, the total amount of metal ions from the foregoing organic compound catalyst contained in the liquid component of the ink and other polyvalent metal ions is 800 ppm or less.

A still further preferred embodiment of the ink cartridge of the invention is an ink cartridge for ink jet recording apparatus.

In the ink cartridge of the invention, the term "liquid component" as used herein is meant to indicate a "liquid portion" holding a solid portion such as particulate pigment dispersed therein in the ink incorporated in the ink impregnating foam. Accordingly, the "liquid component" contains impurities eluted with the vehicle (liquid portion of ink itself) from the ink impregnating foam in addition to impurities which have entered into the vehicle during the preparation of the ink.

Further, by measuring by any known method the amount of $SO_4^{2-}$ ion or polyvalent metal ion (e.g., alkaline earth metal ion, polyvalent metal such as tin ion) contained in the supernatant liquid separated from the precipitated component by centrifugally processing the ink incorporated in the ink impregnating foam (optionally separated from the foam), the amount of $SO_4^{2-}$ ion or polyvalent metal ion contained in the "liquid component" can be determined.

The term "vehicle" as used herein is meant to indicate a "liquid portion" holding a solid portion such as particulate pigment dispersed therein in the ink to be incorporated in the ink impregnating foam of the ink cartridge of the invention.

(Preparation of Surface-treated Pigment and Ink)

The surface-treated pigment to be used in the ink cartridge of the invention and its preparation, and the preparation of the ink (aqueous pigment ink) to be incorporated in the ink impregnating foam are as described in the foregoing clause [Embodiments of Implication of the First Ink].

(Ink Impregnating Foam)

The ink cartridge of the invention comprises an ink impregnating foam impregnated with the foregoing aqueous pigment ink.

The ink impregnating foam to be used herein is not specifically limited so far as it is resistant to inks and thus doesn't undergo denaturation with inks. Any known conventional foams as disclosed in JP-A-11-20192, JP-A-5-38816, JP-A-7-32613 and JP-A-64-26452 may be used.

As the ink impregnating foam there is preferably used a urethane foam which can be obtained by reacting a polyether polyol with an isocyanate in the presence of at least a catalyst and a foaming agent.

As the polyether polyol there can be widely used a well known polyether polyol. A polyether polyol is a compound having a molecular weight of from about 1,000 to 10,000 which can be obtained by reacting a polyhydroxy compound such as propylene glycol, ethylene glycol, glycerin, triethanolamine and ethylene diamine with ethylene oxide or propylene oxide. Specific examples of such a polyether polyol include glycerin-based polypropylene glycol.

In general, as a polyol to be used in the preparation of urethane foam there may be used a polyester polyol or the like as well. However, since the ink cartridge of the invention is arranged such that the urethane foam comes in direct contact with the ink, the polyol is more preferably a polyether polyol, which undergoes less deterioration, regardless of which the ink is alkaline or acidic.

As the isocyanate there may be used an aromatic or aliphatic polyisocyanate or having two or more isocyanate groups per molecule or modification product thereof. Specific examples of such an isocyanate include tolylene diisocyanate, diphenylmethane diisocyanate, and xylylene diisocyanate.

As the foaming agent there may be used a commonly used foaming agent such as water, air, nitrogen, pentane, methylene chloride and nitroalkane.

In addition, additives which are commonly used in the preparation of urethane foam such as foam stabilizer (e.g., silicone oil) and cell opening agent (e.g., polyether siloxane) may be used as necessary.

As the ink impregnating foam there may be used the urethane foam thus prepared as it is. However, in order to enhance ink retention, the film-like material produced between cells may be fused using a mixture of oxygen and hydrogen before use.

The number of cells in the ink impregnating foam is preferably from 20 to 60 per inch from the standpoint of ink retention. When the number of cells is too great, the retainable amount of ink decreases, and the cells act strongly as capillary, reducing the effective amount of ink to disadvantage. On the contrary, when the number of cells is too small, the cells cannot act as capillary as they are. Even when the ink retaining body is compressed, the size of cells in the ink retaining body can be hardly uniform, making it difficult to retain the ink in the foam uniformly to disadvantage.

The ink cartridge of the invention is filled with an ink impregnating foam. When packed in the cartridge, the foam may be arbitrarily compressed to control the density thereof as necessary. The percent compression of ink impregnating foam has some relationship particularly with the number of cells in urethane foam. Thus, when the number of cells is small, the urethane foam is used under high compression. On the contrary, when the number of cells is great, the urethane foam is used under low compression. The percent compression of ink impregnating foam can be determined depending on various parameters such as shape or ink cartridge, characteristics of ink, structure of passage in the printing head, position of nozzle portion and position of junction of ink cartridge. Thus, the ink impregnating foam is preferably compressed to 1/1 to 1/10, more preferably about 1/2 to 1/5 of the volume of the ink cartridge.

The preparation of the polyether urethane is normally carried out in the presence of an organic metal compound (e.g., dibutyltin laurate, tin octylate, lead naphthenate, cobalt naphthenate) or tertiary amine (e.g., N-ethylmorpholine, triethylenediamine (DABBCO)).

Among these catalysts, the organic metal compound, when the polyether urethane comes in contact with the ink, is eluted with the ink in which it then forms a crystal that causes the impairment of the ejection properties. Thus, the amount of the organic metal compound to be added during the preparation of polyether urethane is preferably small. When the amount of the catalyst to be used is merely small, the foam has a large amount of unreacted components left therein which are then eluted with the ink to have an adverse effect on the properties of the ink. Accordingly, the added amount of the foregoing organic metal compound is preferably from 0.01 to 0.2% by weight based on the total weight of the urethane foam.

The polyether urethane is preferably subjected to pretreatment such as cleaning and aging before being impregnated with the ink. However, such a pretreatment doesn't necessarily need to be effected.

The cartridge of the invention may comprise as a chamber a case filled with a kind of ink. Alternatively, the case may be arbitrarily partitioned into a plurality of ink chambers filled with different inks, respectively.

Industrial Applicability

In accordance with the ink for ink jet recording (first ink) of the invention, desired storage stability and ejection stability (inhibition of dot drop and clogging) can be secured. At the same time, requirements for little irregular bleeding on printed image, fast drying of printed image and high print density of printed image can be satisfied. Further, when an image printed on ordinary paper is thoroughly observed, the ink thus printed penetrates little into the other side of paper. Thus, the ink for ink jet recording of the invention can be printed on both sides of paper.

In accordance with the ink for ink jet recording (second ink) of the invention, a fast-drying image having a high print density can be provided free from print bleeding. Further, an ink for ink jet recording which exhibits a high storage stability and can be easily prepared can be provided. Moreover, by arranging the ink for ink jet recording such that the absolute value of zeta-potential of particulate pigment at 20° C. and pH value of from 8 to 9 in a diluted ink solution obtained by diluting the ink with ion-exchanged water such that the concentration of the foregoing particulate pigment is from 0.001 to 0.01% by weight is 30 mV or more, an image having a higher print density can be provided, and an ink for ink jet recording having a higher storage stability can be provided.

Further, by providing an comprising at least a particulate pigment having a sulfur-containing dispersibility providing group chemically bonded to the surface thereof with a treatment containing sulfur, a penetrating agent, and water, characterized in that the amount of the dispersibility providing group is $10 \times 10^{-6}$ equivalent per g of particulate pigment and the absolute value of zeta-potential of particulate pigment at 20° C. and pH value of from 8 to 9 in a diluted ink solution obtained by diluting the ink with ion-exchanged water such that the concentration of the foregoing particulate pigment is from 0.001 to 0.01% by weight is 30 mV or more, an image having an extremely high print density can be provided, and an ink for ink jet recording having an extremely high storage stability and a process for the preparation thereof can be provided.

In accordance with the process for the preparation of the ink for ink jet recording of the invention (second ink), there is provided a step of subjecting sulfonic acid group and/or sulfinic acid group to ionic dissociation in the ink before the addition of the ink solvent, where by the dispersibility of the particulate pigment can be further enhanced, making it possible to provide an easier process for the preparation of an ink for ink jet recording.

In accordance with the ink for ink jet recording of the invention (third ink), a fast-drying image having a high print density can be provided free from print bleeding. Further, an ink for ink jet recording which exhibits a high storage stability and can be easily prepared can be provided. Further, by arranging the ink for ink jet recording such that the counter cation of the sulfonic acid anion group and/or the counter cation of the sulfinic acid anion group comprises at least $Na^+$ and $NH_4^+$, a fast-drying image having a high print density can be provided free from print bleeding, and an ink for ink jet recording which exhibits a higher storage stability can be provided.

Furthermore, by arranging the ink for ink jet recording such that the total amount of alkaline metal ion in the liquid component (vehicle) is 2,000 ppm or less, more assured storage stability can be provided.

In accordance with the ink for ink jet recording of the invention (fourth ink), a pigment ink having an excellent fastness can be provided. The printed image thus obtained has little irregular bleeding and no color bleeding in color border region. The printed image thus obtained can rapidly dry and has a high print density. Further, the printed image thus obtained has an excellent storage stability. Moreover, it goes without saying that this ink comprises a pigment as a colorant and thus exhibits an excellent light-resistance and water resistance as compared with the conventional dye-based inks for ink jet recording.

In accordance with the ink for ink jet recording of the invention (fifth ink), printing can be made on ordinary paper, which has heretofore never allowed sufficient printing, particularly regenerated paper, with little bleeding, and an ink for ink jet recording having an excellent water resistance and light-resistance can be provided.

In accordance with the ink set for ink jet recording of the invention, four color pigments, i.e., surface-treated black pigment, surface-treated yellow pigment, surface-treated magenta pigment and surface-treated cyan pigment are combined. In this arrangement, an ink set for ink jet recording can be provided which allows the optimization of pigment density, extremely easy design of pigment ink and development of desired half tone colors and can give a good color image.

Further, the ink set for ink jet recording of the invention can comprise surface-treated orange pigment and surface-treated green pigment in addition to the foregoing four colors, totaling six colors. In this arrangement, an ink set for ink jet recording can be provided which can provide a better color image, particularly good hue.

In accordance with the ink cartridge of the invention, an ink cartridge comprising in combination a cartridge receiving a polyurethane foam as an ink impregnating foam and an ink containing a surface-treated pigment can be provided which gives desired storage stability and ejection stability (prevention of clogging) and maintains the print properties of the foregoing ink securely.

EXAMPLES

The inks of the invention (first to fifth inks), the ink set of the invention, and the ink cartridge of the invention will be further described in connection with Examples 1 to 7 below, but the scope of the present invention should not be construed as being limited thereto. In the following description of Examples 1 to 7 and Comparative Examples 1 to 7, the particulate pigment having a sulfur-containing dispersibility providing group provided on the surface thereof will be referred also to as "surface-treated pigment". The term "parts" and "%" as used hereinafter are meant to indicate "parts by weight" and "% by weight", respectively, unless otherwise specified.

Examples and Comparative Examples of First Ink of the Invention

Examples 1 (Examples 1-1 to 1-11) below are examples of the first ink of the invention, and Comparative Examples 1 (Comparative Examples 1-1 to 1-3) below are examples for comparison with the first ink of the invention.

The "amount of sulfuric acid ion ($SO_4^{2-}$) and polyvalent metal ion contained in the liquid component of the ink" defined in Examples 1-1 to 1-11 and Comparative Examples 1-1 to 1-3 below were determined by the following methods.

[Determination of sulfuric acid ion and polyvalent metal ion]
(1) Separation of Liquid Component The inks prepared in Examples 1 and Comparative Examples 1 were each subjected to centrifuging by a centrifugal ultrafiltrating apparatus (C-15, produced by Millipore Inc.). As a filter there was used a Type NMWL10000 filter. The centrifuging was effected at 2,500 G for 60 minutes. The resulting filtrate was then determined for amount of sulfuric acid ion and polyvalent metal ion by the following methods.
(2) Determination of Sulfuric Acid Ion 10 mg of the filtrate was subjected to combustion by oxygen flask method. The resulting gas was absorbed by a 0.3% aqueous solution of $H_2O_2$ which was then subjected to ion chromatography (column:ionPacAS12A; DX-500, produced by Nippon Dionex Corp.).
(3) Determination of Polyvalent Metal Ion 10 mg of the filtrate was subjected to oxygen flask combustion method, and then absorbed by a 0.2% aqueous solution of nitric acid which was then determined for amount of polyvalent metal ion by ion chromatography as in the foregoing clause (2).

The "amount of dispersibility providing group introduced onto surface-treated pigment" defined in Examples 1 (Examples 1-1 to 1-11) and Comparative Examples (Comparative Examples 1-1 to 1-3) below was determined by the following method.

[Determination of introduced amount of dispersibility providing group]

The surface-treated pigments obtained in Examples 1 and Comparative Examples 1 were each subjected to oxygen flask combustion method, and then absorbed by a 0.3% aqueous solution of hydrogen peroxide which was then determined for amount of sulfuric acid ion (divalent) by ion chromatography (2000i, produced by Nippon Dionex Corp.). The results were then converted into amount of sulfonic acid group [sulfonic acid group (monovalent) and/or sulfinic acid group (monovalent)] as calculated in terms of equivalent per g of pigment.

The physical properties (zeta-potential, viscosity, surface tension) of the inks obtained in Examples 1 (Examples 1-1 to 1-11) and Comparative Examples (Comparative Examples 1-1 to 1-3) below were determined by the following methods.

"Measurement of Physical Properties of Ink"
Measurement of Zeta-potential

The inks obtained in Examples 1 and Comparative Examples 1 were each diluted with ion-exchanged water 1,000 times (such that the concentration of particulate pigment reached 0.008% by weight). The solution thus obtained was adjusted to pH of 8 to 9 at 20° C. with a 0.1 N hydrochloric acid and a 0.1 N caustic soda, and then measured for zeta-potential of particulate pigment by a laser Doppler type electrophoresis analyzer (ELS-800, produced by OTSUKA ELECTRONICS CO., LTD.). The results were represented in terms of absolute value.

Measurement of Viscosity

The inks obtained in Examples 1 and Comparative Example 1 were each measured for viscosity at 20° C. at a shearing rate of 200/sec by a Type RFS2 rotational viscometer (produced by Rheometric Scientific F.E.Ltd).

Measurement of Surface Tension

The inks obtained in Examples 1 and Comparative Examples 1 were each measured by a Type CBVP-A3 surface tension balance (produced by Kyowa Interface Science Co., Ltd.).

The inks of Examples 1 (Examples 1-1 to 1-11) and Comparative Examples (Comparative Examples 1-1 to.1-3) below were each subjected to the following "printing test" and "ink storage stability test".

"Printing Test"

As an ink jet recording process printer there was used a Type MJ-5000C printer (produced by SEIKO EPSON CORPORATION) which was then loaded with the inks obtained in Examples 1 and Comparative Examples 1. As an ordinary neutral paper there was used Xerox P (produced by Fuji Xerox Co., Ltd.). As an ordinary acidic paper there was used EPP (produced by SEIKO EPSON CORPORATION). As a regenerated paper there was used Xerox R (produced by Fuji Xerox Co., Ltd.). Printing was then made on these papers. (The results of this test will be hereinafter referred to as "initial test results".) The printer was then switched off. After a week, printing test was made under the same conditions as mentioned above. (The results of this test will be hereinafter referred to as "results of test after one week".)

"Ink Storage Stability Test"

The inks prepared in Examples 1 and Comparative Examples 1 were each sealed in a glass sample bottle. The samples were each then allowed to stand at 60° C. for 1 week or at −20° C. for 1 week. The samples were each examined for occurrence of foreign matters in the ink and change of ink viscosity and surface tension before and after storage. The confirmation of occurrence of foreign matters was accomplished by filtering the ink which had just been prepared and which had been stored under the various conditions through a twill-woven metallic filter having a pore size of 25 μm, and then examining the residue for increase or decrease of amount of foreign matters under a microscope.

Example 1-1

(1) Preparation of Surface-treated Pigment: Carbon Black 15 parts of carbon black ("MA-7", produced by Mitsubishi Chemical Corporation) were mixed with 200 parts of sulfolane. The mixture was then subjected to dispersion by a Type M250 Eiger motor mill (produced by Eiger Japan K.K.) at a percent bead packing of 70% and a rotary speed of 5,000 rpm for 1 hour. The mixture of a pigment paste and a solvent thus dispersed was transferred into an evaporator where it was then heated to a temperature of 120° C. at a pressure of 30 mmHg or less so that the water content in the system was distilled off as much as possible. The reaction system was then controlled to a temperature of 150° C. Subsequently, to the reaction solution was added 25 parts of sulfur trioxide. The reaction mixture was then allowed to undergo reaction for 6 hours. After the termination of reaction, the reaction product was washed with excessive sulfolane several times, poured into water, and then filtered to obtain a surface-treated particulate carbon black pigment.

The amount of the dispersibility providing group introduced into the surface-treated carbon black pigment thus obtained was $50 \times 10^{-6}$ equivalent per g of pigment.

(2) Preparation of Ink for Ink Jet Recording

The carbon black pigment obtained in the foregoing Example 1-1(1) was used. As penetrating agents there were used Surfynol 465 (produced by Air Products Inc.), which is an acetylene glycol-based surface active agent, and triethylene glycol-mono-n-butyl ether, which is a glycol ether. The specific composition will be given below.

| | |
|---|---|
| Surface-treated carbon black pigment of Example 1-1 (1) | 8.0% (in terms of solid content) |
| Surfynol 465 | 1.0% |
| Triethylene glycol mono-n-butyl ether | 10.0% |
| Glycerin | 15.0% |
| 1,5-Pentanediol | 2.5% |
| Triethanolamine | 0.8% |
| Ion-exchanged water | Balance |

The preparation procedure was as follows.

To the surface-treated carbon black pigment obtained in the foregoing Example 1-1 (1) were then added ion-exchanged water and triethanolamine so that the dispersibility providing group was subjected to ionic dissociation. Thereafter, to the surface-treated carbon black pigment solution prepared previously was added gradually a mixture of Surfynol 465, triethylene glycol mono-n-butyl ether, glycerin and 1,5-pentanediol which had been prepared in a separate vessel with stirring to obtain the ink of Example 1-1 according to the invention.

The ink thus obtained exhibited a zeta-potential of 43 mV (absolute value), a viscosity of 4.7 mPa.s, and a surface tension of 32 mN/m. The amount of $SO_4^{2-}$ and polyvalent metal ion were 1,480 ppm and 780 ppm, respectively, as determined mentioned above.

(3) Printing Test, Ink Storage Stability Test

The ink of Example 1-1 was subjected to "printing test" and "ink storage stability test" as mentioned above.

The results of printing test (initial test results) show that all the printed images thus obtained had little or no irregular bleeding and thus are good image having a high print density. The drying time required until the ink when solid-printed penetrates into the paper to disappear was less than 2 seconds regardless of the kind of the paper used. Thus, the ink exhibited a good dryability. Throughout the printing test, the ink showed no dot drop, demonstrating that printing is effected very securely. (→Evaluation "A")

The printer was then switched off. After one week, the printing test was made under the same conditions as mentioned above. As a result, printing began simultaneously with the input of print signal to the printer. There was confirmed no defectives such as clogging of the ink ejection nozzle. (→Evaluation "A")

The results of ink storage stability test show that there were confirmed little or no occurrence of foreign matters and viscosity change under any conditions, demonstrating that the ink has a good storage stability. (→Evaluation "A")

Example 1-2

(1) Preparation of Surface-treated Carbon Black Pigment

The procedure of the foregoing Example 1-1 (1) was followed except that the carbon black to be processed was changed to Printex 150T (produced by DEGUSSA CORP.) to obtain a surface-treated carbon black pigment.

The amount of the dispersibility providing group introduced into the surface-treated carbon black pigment was $41 \times 10^{-6}$ equivalent per g of pigment.

(2) Preparation of Ink for Ink Jet Recording

The preparation procedure of the foregoing Example 1-1 (2) was followed except that "8.0% (in terms of solid content) of the surface-treated carbon black pigment of Example 1-1 (1)" in the "specific composition of ink" of the foregoing Example 1-1 was replaced by "6.0% (in terms of solid content) of the carbon black pigment obtained in Example 1-2 (1)" to obtain an ink of Example 1-2.

The ink thus obtained exhibited a zeta-potential of 39 mV (absolute value), a viscosity of 4.2 mPa.s, and a surface tension of 33 mN/m. The amount of $SO_4^{2-}$ and polyvalent metal ion were 1,920 ppm and 870 ppm, respectively, as determined mentioned above.

(3) Printing Test, Ink Storage Stability Test

The ink of Example 1-2 was subjected to "printing test" and "ink storage stability test" as mentioned above.

The initial test results were the same as that of the foregoing Example 1-1. (→Evaluation "A")

The printer was switched off. After one week, the printing test was effected under the same conditions as mentioned above. When a print signal was inputted to the printer to start printing, some clogging occurred in the nozzle. Therefore, printing was suspended for cleaning. In Example 1-2, printing was returned to normal state after two operations of cleaning. Thus, this ink has no practical problem. (→Evaluation "B")

The results of ink storage stability show that there were confirmed little or no viscosity change. However, there were confirmed on the bottom of the bottle foreign matters (agglomerate of pigment particles) which can be trapped by a commercially available foreign matter trapping filter for ink cartridge. (→Evaluation "B")

Comparative Example 1-1

(1) Preparation of Surface-treated Pigment: Carbon Black

The procedure of the foregoing Example 1-1 (1) was followed except that 15 parts of carbon black were used, 300 parts of pyrrolidone were used as a solvent, the treatment was replaced by 3 parts of amidesulfuric acid, and the reaction in the evaporator was effected at a temperature of 120° C. for 1 hour to obtain a surface-treated carbon black pigment.

The amount of the dispersibility providing group introduced into the surface-treated carbon black pigment was $8.5 \times 10^{-6}$ equivalent per g of pigment.

(2) Preparation of Ink for Ink Jet Recording

The procedure of the foregoing Example 1-1 (2) was followed except that "8.0% (in terms of solid content) of the surface-treated carbon black pigment of Example 1-1 (1)" was replaced by "6.0% (in terms of solid content) of the carbon black pigment obtained in Comparative Example 1-1 (1)" to obtain an ink Comparative Example 1-1.

The ink thus obtained exhibited a zeta-potential of 28 mV (absolute value), a viscosity of 4.0 mPa.s, and a surface tension of 33 mN/m. The amount of $SO_4^{2-}$ and polyvalent metal ion were 2,320 ppm and 610 ppm, respectively, as determined mentioned above.

(3) Printing Test, Ink Storage Stability Test

The ink of Comparative Example 1-1 was subjected to "printing test" and "ink storage stability test" as mentioned above.

The results of printing test (initial test results) show that all the printed images thus obtained had some bleeding and a lower print density than in Example 1-2. However, the drying time required until the ink when solid-printed penetrates into the paper to disappear was less than 2 seconds regardless of the kind of the paper used. Thus, the ink exhibited a good dryability. Dot drop occurred during printing on a sheet of the recording paper. The resulting printed matter was rough. (→Evaluation "C")

The printer was switched off. After one week, the printing test was effected under the same conditions as mentioned above. As a result, when a print signal was inputted to the printer, clogging occurred in many ink ejection nozzles. Cleaning was then effected five times. However, the ink was not properly ejected from all the ink ejection nozzles. (→Evaluation "C")

The results of ink storage stability test show that foreign matters occurred and the viscosity of the ink increased under any conditions, making it impossible to obtain a good storage stability. (→Evaluation "C")

Example 1-3

(1) Preparation of Surface-treated Pigment: C.I. Pigment 15:3

20 parts of a phthalocyanine pigment (C.I. pigment 15:3) were mixed with 500 parts of quinoline. The mixture was then subjected to dispersion by a Type M250 Eiger motor mill (produced by Eiger Japan K.K.) at a percent bead packing of 70% and a rotary speed of 5,000 rpm for 2 hours. The mixture of a pigment paste and a solvent thus dispersed was transferred into an evaporator where it was then heated to a temperature of 120° C. at a pressure of 30 mmHg or less so that the water content in the system was distilled off as much as possible. The reaction system was then controlled to a temperature of 160° C. Subsequently, to the reaction solution was added 20 parts of sulfonated pyridine complex. The reaction mixture was then allowed to undergo reaction for 8 hours. After the termination of reaction, the reaction product was washed with excessive quinoline several times, poured into water, and then filtered to obtain a surface-treated particulate phthalocyanine blue pigment.

The amount of the dispersibility providing group introduced into the surface-treated phthalocyanine pigment thus obtained was $58 \times 10^{-6}$ equivalent per g of pigment.

(2) Preparation of Ink for Ink Jet Recording

The surface-treated phthalocyanine blue pigment prepared in the foregoing Example 1-3 (1) was used. As penetrating agents there were used Surfynol 465 (produced by Air Products Inc.), which is an acetylene glycol-based surface active agent, and triethylene glycol-mono-n-butyl ether, which is a glycol ether, as in the foregoing Example 1-1, and 1,2-hexanediol, which is a 1,2-alkylene glycol. The specific composition will be given below.

| | |
|---|---|
| Surface-treated phthalocyanine blue pigment of Example 1-3 (1) | 6.0% (in terms of solid content) |
| Surfynol 465 | 0.8% |
| Triethylene glycol mono-n-butyl ether | 7.5% |
| Glycerin | 10.0% |
| Triethylene glycol | 3.0% |
| 1,2-Hexanediol | 5.0% |
| Triethanolamine | 3.0% |
| Ion-exchanged water | Balance |

The preparation procedure was as follows.

To the surface-treated phthalocyanine blue pigment prepared in the foregoing Example 1-3 (1) were then added ion-exchanged water and triethanolamine so that the dispersibility providing group was subjected to ionic dissociation. Thereafter, to the surface-treated phthalocyanine blue pigment solution prepared previously was added gradually a mixture of Surfynol 465, triethylene glycol mono-n-butyl ether, glycerin, triethylene glycol, and 1,2-hexanediol which had been prepared in a separate vessel with stirring to obtain the ink of Example 1-3 according to the invention.

The ink thus obtained exhibited a zeta-potential of 56 mV (absolute value), a viscosity of 3.9 mPa.s, and a surface tension of 29 mN/m. The amount of $SO_4^{2-}$ and polyvalent metal ion were 310 ppm and 280 ppm, respectively, as determined mentioned above.

(3) Printing Test, Ink Storage Stability Test

The ink of Example 1-3 was subjected to "printing test" and "ink storage stability test" as mentioned above.

The initial test results were the same as that of the foregoing Example 1-1 (Evaluation "A"). The test results after one week, too, were the same as that of the foregoing Example 1-1 (Evaluation "A"). Further, the results of storage stability test, too, were the same as that of the foregoing Example 1-1 (Evaluation "A").

Example 1-4

(1) Preparation of Surface-treated Pigment

In Example 1-4, the surface-treated phthalocyanine particulate pigment (C.I. pigment blue 15:3) prepared in the foregoing Example 1-3 (1) was used. Accordingly, the introduced amount of the dispersibility providing group was $58 \times 10^{-6}$ equivalent per g of pigment as calculated in terms of sulfonic acid group per g of pigment.

(2) Preparation of Ink for Ink Jet Recording

In Example 1-4, the surface-treated phthalocyanine pigment prepared in the foregoing Example 1-3 (1) was used. As penetrating agents there were used Surfynol 440 (produced by Air Products Inc.), which is an acetylene glycol-based surface active agent, and triethylene glycol-mono-n-butyl ether, which is a glycol ether, as in the foregoing Example 1-1, and 1,2-hexanediol, which is a 1,2-alkylene glycol. The specific composition will be given below.

| | |
|---|---|
| Surface-treated phthalocyanine blue pigment of Example 1-3 (1) | 6.0% (in terms of solid content) |
| Surfynol 440 | 0.8% |
| Triethylene glycol mono-n-butyl ether | 7.5% |
| Glycerin | 10.0% |
| 1,2-Hexanediol | 5.0% |
| Monoethanolamine | 1.0% |
| Trishydroxymethylaminomethane | 0.2% |
| Hexachlorophene | 0.03% |
| Ion-exchanged water | Balance |

The preparation procedure was as follows.

To the surface-treated phthalocyanine blue pigment prepared in the foregoing Example 1-3 (1) were then added ion-exchanged water and monoethanolamine so that the dispersibility providing group was subjected to ionic dissociation. Thereafter, to the surface-treated phthalocyanine blue pigment solution prepared previously was added gradually a mixture of Surfynol 440, triethylene glycol mono-n-butyl ether, glycerin, 1,2-hexanediol, trishydroxymethylaminomethane and hexachlorophene which had been prepared in a separate vessel with stirring to obtain the ink of Example 1-4 according to the invention.

The ink thus obtained exhibited a zeta-potential of 56 mV (absolute value), a viscosity of 3.8 mPa.s, and a surface tension of 30 mN/m. The amount of $SO_4^{2-}$ and polyvalent metal ion were 1,320 ppm and 880 ppm, respectively, as determined mentioned above.

(3) Printing Test, Ink Storage Stability Test

The ink of Example 1-4 was subjected to "printing test" and "ink storage stability test" as mentioned above.

The initial test results were the same as that of the foregoing Example 1-1 (Evaluation "A"). The test results after one week were the same as that of the foregoing Example 1-2 (Evaluation "B"). Further, the results of storage stability test, too, were the same as that of the foregoing Example 1-2 (Evaluation "B").

Example 1-5

(1) Preparation of Surface-treated Pigment: C.I. Pigment 15:3

The processing procedure described in the clause "Preparation process of the foregoing Example 1-3 (1)" of the foregoing Example 1-4 (1) was followed except that the reaction time "8 hours" in the preparation process "preparation process of the foregoing Example 1-3 (1)" of the foregoing Example 1-4 (1) was reduced to "6 hours" to obtain a surface-treated phthalocyanine blue particulate pigment of Example 1-5.

The amount of the dispersibility providing group introduced into the surface-treated phthalocyanine blue pigment thus obtained was $46 \times 10^{-6}$ equivalent per g of pigment.

(2) Preparation of Ink For Ink Jet Recording

The surface-treated phthalocyanine blue pigment prepared in the foregoing Example 1-5 (1) was used. As penetrating agents there were used Surfynol 61 (produced by Air Products Inc.), which is an acetylene glycol-based surface active agent, and diethylene glycol-mono-n-butyl ether, which is a glycol ether, and a material having a structure represented by the general formula (1)-A wherein R is t-butyl group, $n_1$ is 3.0, $m_1$ is 1.0, and X is a hydrogen atom. The specific composition will be given below.

| | |
|---|---|
| Surface-treated phthalocyanine blue pigment of Example 1-5 (1) | 8.0% (in terms of solid content) |
| Surfynol 61 | 0.8% |
| Diethylene glycol mono-n-butyl ether | 5.0% |
| Material of the general formula (1)-A | 2.0% |
| Glycerin | 15.0% |
| Propanolamine | 0.8% |
| Ion-exchanged water | Balance |

To the surface-treated phthalocyanine pigment obtained in the foregoing Example 1-5 (1) were then added ion-exchanged water and propanolamine so that the dispersibility providing group was subjected to ionic dissociation. Thereafter, to the surface-treated phthalocyanine blue pigment solution prepared previously was added gradually a mixture of Surfynol 61, diethylene glycol mono-n-butyl ether, a material of the general formula (1)-A, and glycerin which had been prepared in a separate vessel with stirring to obtain the ink of Example 1-5 according to the invention.

The ink thus obtained exhibited a zeta-potential of 41 mV (absolute value), a viscosity of 3.9 mPa.s, and a surface tension of 30 mN/m. The amount of $SO_4^{2-}$ and polyvalent metal ion were 1,760 ppm and 790 ppm, respectively, as determined mentioned above.

(3) Printing Test, Ink Storage Stability Test

The ink of Example 1-5 was subjected to "printing test" and "ink storage stability test" as mentioned above.

The initial test results were the same as that of the foregoing Example 1-1 (Evaluation "A"). The test results after one week, too, were the same as that of the foregoing Example 1-1 (Evaluation "A"). Further, the results of storage stability test, too, were the same as that of the foregoing Example 1-1 (Evaluation "A").

Comparative Example 1-2

(1) Preparation of Surface-treated Pigment: C.I. Pigment 15:3

The procedure of the foregoing Example 1-3 (1) was followed except that 15 parts of a phthalocyanine blue (C.I. pigment blue 15:3) were used, 300 parts of pyrrolidone were used as a solvent, the treatment was replaced by 3 parts of amidesulfuric acid, and the reaction in the evaporator was effected at a temperature of 120° C. for 1 hour to obtain a surface-treated phthalocyanine pigment.

The amount of the dispersibility providing group introduced into the surface-treated phthalocyanine blue pigment was $6 \times 10^{-6}$ equivalent per g of pigment.

(2) Preparation of Ink for Ink Jet Recording

The preparation procedure of the foregoing Example 1-4 (2) was followed except that the "surface-treated phthalocyanine blue pigment of Example 1-3 (1)" in the "specific composition of ink" in the foregoing Example 1-4 was replaced by the "surface-treated phthalocyanine blue pigment of Comparative Example 1-2 (1)" to obtain the ink of Comparative Example 1-2.

The ink thus obtained exhibited a zeta-potential of 24 mV (absolute value), a viscosity of 4.1 mPa.s, and a surface tension of 31 mN/m. The amount of $SO_4^{2-}$ and polyvalent metal ion were 2,710 ppm and 550 ppm, respectively, as determined mentioned above.

(3) Printing Test, Ink Storage Stability Test

The ink of Example 1-2 was subjected to "printing test" and "ink storage stability test" as mentioned above.

The initial test results were the same as that of the foregoing Comparative Example 1-1 (Evaluation "C"). The test results after one week, too, were the same as that of the foregoing Comparative Example 1-1 (Evaluation "C"). Further, the results of storage stability test, too, were the same as that of the foregoing Comparative Example 1-1 (Evaluation "C").

Example 1-6

(1) Preparation of Surface-treated Pigment: C.I. Pigment Yellow 110

20 parts of an isoindolinone pigment (C.I. pigment yellow 110) were mixed with 500 parts of quinoline. The mixture was then subjected to dispersion by a Type M250 Eiger motor mill (produced by Eiger Japan K.K.) at a percent bead packing of 70% and a rotary speed of 5,000 rpm for 2 hours. The mixture of a pigment paste and a solvent thus dispersed was transferred into an evaporator where it was then heated to a temperature of 120° C. at a pressure of 30 mmHg or less so that the water content in the system was distilled off as much as possible. The reaction system was then controlled to a temperature of 160° C. Subsequently, to the reaction solution was added 20 parts of sulfonated pyridine complex. The reaction mixture was then allowed to undergo reaction for 4 hours. After the termination of reaction, the reaction product was washed with excessive quinoline several times, poured into water, and then filtered to obtain a surface-treated particulate isoindolinone pigment.

The amount of the dispersibility providing group introduced into the surface-treated phthalocyanine pigment thus obtained was $49 \times 10^{-6}$ equivalent per g of pigment.

(2) Preparation of Ink for Ink Jet Recording

In Example 1-6, as a penetrating agent there was used Surfynol 465 (produced by Air Products Inc.). The specific composition will be given below.

| Surface-treated isoindolinone pigment of Example 1-6 (1) | 7.0% (in terms of solid content) |
| --- | --- |
| Surfynol 465 | 2.0% |
| Glycerin | 12.0% |

-continued

| Polyoxyethylene (PO = 8) nonyl phenyl ether | 0.2% |
| --- | --- |
| 1,5-Pentanediol | 5.0% |
| Propanol | 3.0% |
| Ammonia (28% aqueous solution) | 0.2% |
| 2-Pyrrolidone | 3.0% |
| Ion-exchanged water | Balance |

The preparation procedure was as follows.

To the surface-treated isoindolinone pigment prepared in the foregoing Example 1-6 (1) were then added ion-exchanged water and ammonia so that the dispersibility providing group was subjected to ionic dissociation. Thereafter, to the surface-treated isoindolinone pigment solution prepared previously was added gradually a mixture of Surfynol 465, glycerin, polyoxyethylene (PO=8) nonyl phenyl ether, 1,5-pentanediol, propanol, and 2-pyrrolidone which had been prepared in a separate vessel with stirring to obtain the ink of Example 1-6 according to the invention.

The ink thus obtained exhibited a zeta-potential of 53 mV (absolute value), a viscosity of 4.4 mPa.s, and a surface tension of 29 mN/m. The amount of $SO_4^{2-}$ and polyvalent metal ion were 1,170 ppm and 820 ppm, respectively, as determined mentioned above.

(3) Printing Test, Ink Storage Stability Test

The ink of Example 1-6 was subjected to "printing test" and "ink storage stability test" as mentioned above.

The initial test results were the same as that of the foregoing Example 1-1 except that the drying time was less than 4 seconds (Evaluation "A"). The test results after one week were the same as that of the foregoing Example 1-2 (Evaluation "B"). Further, the results of storage stability test, too, were the same as that of the foregoing Example 1-2 (Evaluation "B").

Example 1-7

(1) Preparation of Surface-treated Pigment: C.I. Pigment Red 122

In Example 1-7, a dimethyl quinacridone pigment (C.I. pigment red 122) was used. The preparation procedure of the foregoing Example 1-6 (1) was followed except that "20 parts of isoindolinone pigment (C.I. pigment yellow 110)" was replaced by "20 parts of dimethyl quinacridone pigment (C.I. pigment red 122)" to obtain a surface-treated particulate pigment of Example 1-7.

The amount of the dispersibility providing group introduced into the surface-treated dimethyl quinacridone pigment was $35 \times 10^{-6}$ equivalent per g of pigment.

(2) Preparation of Ink for Ink Jet Recording

The preparation procedure of the foregoing Example 1-6 (2) was followed except that "7.0% (in terms of solid content) of surface-treated isoindoline pigment of Example 1-6 (1)" in the "specific composition of ink" in the foregoing Example 1-6 was replaced by "6.0% (in terms of solid content) of surface-treated dimethyl quinacridone pigment of Example 1-7 (1)" to obtain the ink of Comparative Example 1-7.

The ink thus obtained exhibited a zeta-potential of 38 mV (absolute value), a viscosity of 4.7 mPa.s, and a surface tension of 30 mN/m. The amount of $SO_4^{2-}$ and polyvalent metal ion were 730 ppm and 850 ppm, respectively, as determined mentioned above.

(3) Printing Test, Ink Storage Stability Test

The ink of Example 1-7 was subjected to "printing test" and "ink storage stability test" as mentioned above.

The initial test results were the same as that of the foregoing Example 1-1 except that the drying time was less than 4 seconds (Evaluation "A"). The test results after one week were the same as that of the foregoing Example 1-2 (Evaluation "B"). Further, the results of storage stability test, too, were the same as that of the foregoing Example 1-2 (Evaluation "B").

Comparative Example 1-3

(1) Preparation of Surface-treated Pigment: Carbon Black

As the surface-treated carbon black pigment of Comparative Example 1-3 there was used the surface-treated carbon black pigment prepared in the foregoing Comparative Example 1-1 (1). Accordingly, the introduced amount of the dispersibility providing group was $8.5 \times 10^{-6}$ equivalent per g of pigment as calculated in terms of sulfonic acid group per g of pigment.

(2) Preparation of Ink For Ink Jet Recording

The formulation of ink was free of penetrating agent (acetylene glycol-based surface-treated pigment and/or glycol ether) as an essential component of the invention. The specific composition will be given below.

| | |
|---|---|
| Surface-treated carbon black pigment of Example 1-1 (1) | 7.0% (in terms of solid content) |
| Glycerin | 15.0% |
| 1,5-Pentanediol | 3.0% |
| Propanol | 3.0% |
| Ammonia (28% aqueous solution) | 0.3% |
| Trishydroxymethylaminomethane | 0.2% |
| Hexachlorophene | 0.03% |
| Maltitol | 5.0% |
| Ion-exchanged water | Balance |

The preparation procedure was as follows.

To the surface-treated carbon black pigment prepared in the foregoing Example 1-1 (1) were then added ion-exchanged water and ammonia (28% aqueous solution) so that the dispersibility providing group was subjected to ionic dissociation. Thereafter, to the surface-treated carbon black pigment solution prepared previously was added gradually a mixture of glycerin, 1,5-pentanediol, propanol, ammonia (28% aqueous solution), trishydroxymethylaminomethane, hexachlorophene, and maltitol which had been prepared in a separate vessel with stirring to obtain the ink of Comparative Example 1-3 according to the invention.

The ink thus obtained exhibited a zeta-potential of 42 mV (absolute value), a viscosity of 4.2 mPa.s, and a surface tension of 63 mN/m. The amount of $So_4^{2-}$ and polyvalent metal ion were 2,110 ppm and 420 ppm, respectively, as determined mentioned above.

(3) Printing Test, Ink Storage Stability Test

The ink of Comparative Example 1-3 was subjected to "printing test" and "ink storage stability test" as mentioned above.

The results of printing test show that the ink of Comparative Example 1-3 (pigment content: 7%) exhibits about the same printed image as the ink of the foregoing Example 1-1 (pigment content: 8%) but exhibits much irregular print bleeding and thus cannot give a sharp image except on ordinary neutral paper as compared with the ink of the foregoing Example 1-1. The drying time required until the ink penetrates into the paper to disappear was 60 seconds or more on any paper. Further, rubbing marks were left on the paper feed roller. Thus, unsatisfactory results were obtained. Throughout the printing test, the ink showed dot drop during printing on a sheet of the recording paper. The resulting printed matter was rough (Evaluation "D").

The printer was switched off. After one week, the printing test was effected under the same conditions as mentioned above. As a result, when a print signal was inputted to the printer, clogging occurred in many ink ejection nozzles. Cleaning was then effected five times. However, the ink was not properly ejected from all the ink ejection nozzles. (→Evaluation "D")

The results of ink storage stability test show that foreign matters occurred and the viscosity of the ink increased under any conditions, making it impossible to obtain a good storage stability, as in the foregoing Comparative Example 1-1. (→Evaluation "C")

Examples 1-8 to 1-11

Examples 1-8 to 1-11 are examples of the first ink of the invention comprising a particulate polymer incorporated therein. The particulate polymer is preferably incorporated in the form of water-soluble emulsion. The amount of the particulate polymer to be incorporated is preferably from 1% by weight to 10% by weight. When the amount of the particulate polymer to be incorporated falls below 1% by weight, a sufficient effect of improving abrasion resistance and gloss cannot be occasionally obtained. On the contrary, when the amount of the particulate polymer to be incorporated exceeds 10% by weight, the concentration of solid content in the ink rises, deteriorating the ejection stability.

A process for the preparation of the emulsion used in Examples 1-8 to 1-11 will be described below.

(Preparation of Emulsion)

Emulsion A

Into a reaction vessel equipped with a dropping device, a thermometer, a water-cooled reflux condenser and a stirrer were charged 100 parts of ion-exchanged water. To the ion-exchanged water were then added 0.2 parts of potassium peroxide as a polymerization initiator with stirring at a temperature of 70° C. in a nitrogen atmosphere. To the ion-exchanged water in the reaction vessel was then added dropwise a monomer solution obtained by dissolving 0.05 parts of sodium laurylsulfate, 4 parts of glycidoxy acrylate, 5 parts of styrene, 6 parts of tetrahydrofurfuryl acrylate, 5 parts of butyl methacrylate and 0.02 parts of t-dodecyl mercaptan in 7 parts of ion-exchanged water at a temperature of 70° C. to cause reaction by which a primary material was prepared. Subsequently, to the primary material in the reaction vessel was added 2 parts of a 10% solution of ammonium persulfate. The reaction mixture was then stirred. Finally, into the reaction vessel was put a reaction solution comprising 30 parts of ion-exchanged water, 0.2 parts of potassium laurylsulfate, 30 parts of styrene, 25 parts of butyl methacrylate, 6 parts of butyl acrylate, 2 parts of acrylic acid, 1 part of 1,6-hexanediol dimethacrylate and 0.5 parts of t-dodecyl mercaptan with stirring at a temperature of 70° C. to cause polymerization reaction. The reaction solution was neutralized to a pH value of from 8 to 8.5 with sodium hydroxide, and then filtered through a filter having a pore diameter of 0.3 μm to prepare an aqueous solution of particulate polymer as "Emulsion A".

Emulsion B

Into a reaction vessel equipped with a dropping device, a thermometer, a water-cooled reflux condenser and a stirrer were charged 100 parts of ion-exchanged water. To the ion-exchanged water were then added 0.2 parts of potassium peroxide as a polymerization initiator with stirring at a temperature of 70° C. in a nitrogen atmosphere. To the ion-exchanged water in the reaction vessel was then added dropwise a monomer solution obtained by dissolving 0.05 parts of sodium laurylsulfate, 10 parts of styrene, 5 parts of glycidoxy methacrylate, 5parts of butyl methacrylate and 0.02 parts of t-dodecyl mercaptan in 7 parts of ion-exchanged water at a temperature of 70° C. to cause reaction by which a primary material was prepared. Subsequently, to the primary material in the reaction vessel was added 2 parts of a 10% solution of ammonium persulfate. The reaction mixture was then stirred. Finally, into the reaction vessel was put a reaction solution comprising 30 parts of ion-exchanged water, 0.2 parts of potassium laurylsulfate, 35 parts of styrene, 25 parts of butyl methacrylate, 10 parts of acrylic acid, 1 part of acrylamide, and 0.5 parts of t-dodecyl mercaptan with stirring at a temperature of 70° C. to cause polymerization reaction. The reaction solution was neutralized to a pH value of from 8 to 8.5 with triethanolamine, and then filtered through a filter having a pore diameter of 0.3 µm to prepare an aqueous solution of particulate polymer as "Emulsion B".

Emulsion C

Into a reaction vessel equipped with a dropping device, a thermometer, a water-cooled reflux condenser and a stirrer were charged 100 parts of ion-exchanged water. To the ion-exchanged water were then added 0.2 parts of potassium peroxide as a polymerization initiator with stirring at a temperature of 70° C. in a nitrogen atmosphere. To the ion-exchanged water in the reaction vessel was then added dropwise a monomer solution obtained by dissolving 0.05 parts of sodium laurylsulfate, 15 parts of styrene, 2 parts of glycidoxy methacrylate, 16 parts of benzyl methacrylate, 15 parts of butyl methacrylate, and 0.02 parts of t-dodecyl mercaptan in 7 parts of ion-exchanged water at a temperature of 70° C. to cause reaction by which a primary material was prepared. Subsequently, to the primary material in the reaction vessel was added 2 parts of a 10% solution of ammonium persulfate. The reaction mixture was then stirred. Finally, into the reaction vessel was put a reaction solution comprising 30 parts of ion-exchanged water, 0.2 parts of potassium laurylsulfate, 30 parts of styrene, 15 parts of butyl methacrylate, 10 parts of acrylic acid, 1 part of triethanol propane trimethacrylate, 1 part of 1,6-hexanediol dimethacrylate, and 0.5 parts of t-dodecyl mercaptan with stirring at a temperature of 70° C. to cause polymerization reaction. The reaction solution was neutralized to a pH value of from 8 to 8.5 with potassium hydroxide, and then filtered through a filter having a pore diameter of 0.3 µm to prepare an aqueous solution of particulate polymer as "Emulsion C".

Example 1-8

(1) Preparation of Surface-treated Pigment: Carbon Black

In Example 1-8, the surface-treated carbon black pigment prepared in the foregoing Example 1-1 (1) was used. Accordingly, the introduced amount of the dispersibility providing group was 50×10$^{-6}$ equivalent per g of surface-treated carbon black pigment as calculated in terms of sulfonic acid group per g of pigment.

(2) Preparation of Ink for Ink Jet Recording

The carbon black pigment obtained in the foregoing Example 1-1 (1) was used. As penetrating agents there were used Surfynol 420 (produced by Air Products Co., Ltd.), which is an acetylene glycol-based surface-treated pigment, triethylene glycol mono-n-butyl ether, which is a glycol ether, and a material having a structure represented by the general formula (1) wherein R is t-hexyl group, $n_1$ is 1.0, $m_1$ is 4.0, and X is SO$_3$M in which M is sodium. As a particulate polymer there was used "Emulsion A".

The specific composition will be given below.

| | |
|---|---|
| Surface-treated carbon black pigment of Example 1-1 (1) | 8.0% (in terms of solid content) |
| Surfynol 420 | 0.5% |
| Triethylene glycol mono-n-butyl ether | 5.0% |
| Glycerin | 15.0% |
| Material of the general formula (1)-B | 2.5% |
| Triethanolamine | 0.8% |
| Emulsion A | 10.0% (in terms of solid content) |
| Ion-exchanged water | Balance |

The preparation procedure was as follows.

To the surface-treated carbon black pigment obtained in the foregoing Example 1-1 (1) were then added ion-exchanged water and triethanolamine so that the dispersibility providing group was subjected to ionic dissociation. Thereafter, to the surface-treated carbon black pigment solution prepared previously was added gradually a mixture of Surfynol 420, triethylene glycol mono-n-butyl ether, glycerin, a material of the general formula (1)-B and Emulsion A which had been prepared in a separate vessel with stirring to obtain the ink of Example 1-8 according to the invention.

The ink thus obtained exhibited a zeta-potential of 43 mV (absolute value), a viscosity of 4.9 mPa.s, and a surface tension of 32 mN/m. The amount of SO$_4^{2-}$ and polyvalent metal ion were 1,480 ppm and 780 ppm, respectively, as determined mentioned above.

(3) Printing Test, Ink Storage Stability Test

The ink of Example 1-8 was subjected to "printing test" and "ink storage stability test" as mentioned above.

The initial test results were the same as that of the foregoing Example 1-1 (Evaluation "A"). The test results after one week, too, were the same as that of the foregoing Example 1-1 (Evaluation "A"). Further, the results of storage stability test, too, were the same as that of the foregoing Example 1-1 (Evaluation "A").

(4) Printing Test on Glossy Medium

The ink of Example 1-8 was subjected to printing test particularly on glossy recording media. The glossy media used were three kinds, i.e., glossy media X, Y and Z. The glossy medium X is a Pictorico type medium having a polyester sheet with a silica sol coated thereon. The glossy medium Y is an ink swelling type medium having a polyester sheet with a resin coated thereon. The glossy medium Z comprises a paper comprising a colloidal silica having an average particle diameter of 500 nm coated thereon with a latex as a binder.

The ink of Example 1-8 exhibited a high scratching resistance and a high water resistance when printed on any of these glossy media. The gloss of the printed image was good with any of these glossy media (→Evaluation "A")

Example 1-9

(1) Preparation of Surface-treated Pigment: Carbon Black

In Example 1-9, the surface-treated carbon black pigment prepared in the foregoing Example 1-1 (1) was used. Accordingly, the introduced amount of the dispersibility providing group was 50×10$^{-6}$ equivalent per g of surface-treated carbon black pigment as calculated in terms of sulfonic acid group per g of pigment.

(2) Preparation of Ink for Ink Jet Recording

The preparation procedure of the foregoing Example 1-8 (2) was followed except that the "amount of Emulsion A incorporated in the specific composition of the ink" in the foregoing Example 1-8 was 15% (as calculated in terms of solid content)" to obtain an ink of Example 1-9.

The ink thus obtained exhibited a zeta-potential of 43 mV (absolute value), a viscosity of 5.9 mPa.s, and a surface tension of 32 mN/m. The amount of $SO_4^{2-}$ and polyvalent metal ion were 1,480 ppm and 780 ppm, respectively, as determined mentioned above.

(3) Printing Test, Ink Storage Stability Test

The ink of Example 1-9 was subjected to "printing test" and "ink storage stability test" as mentioned above.

The initial test results were the same as that of the foregoing Example 1-1 (Evaluation "A"). The test results after one week were the same as that of the foregoing Example 1-2 (Evaluation "B"). Further, the results of storage stability test, too, were the same as that of the foregoing Example 1-2 (Evaluation "B").

(4) Printing Test on Glossy Medium

The ink of Example 1-9, too, was subjected to printing test on glossy recording media X, Y and Z as in Example 1-8. The ink of Example 1-9 exhibited a high scratching resistance and a high water resistance when printed on any of these glossy media. The gloss of the printed image was good with any of these glossy media (→Evaluation "A")

Example 1-10

(1) Preparation of Surface-treated Pigment: C.I. Pigment 15:3

In Example 1-10, the surface-treated phthalocyanine pigment prepared in the foregoing Example 1-3 (1) was used. Accordingly, the introduced amount of the dispersibility providing group was $58 \times 10^{-6}$ equivalent per g of surface-treated phthalocyanine pigment as calculated in terms of sulfonic acid group per g of pigment.

(2) Preparation of Ink for Ink Jet Recording

The phthalocyanine pigment obtained in the foregoing Example 1-1 (1) was used. As penetrating agents there were used Surfynol 465 (produced by Air Products Co., Ltd.), which is an acetylene glycol-based surface-treated pigment, and triethylene glycol mono-n-butyl ether, which is a glycol ether. As a particulate polymer there was used "Emulsion B".

The specific composition will be given below.

| | |
|---|---|
| Surface-treated phthalocyanine pigment of Example 1-3 (1) | 6.0% (in terms of solid content) |
| Surfynol 465 | 0.8% |
| Triethylene glycol mono-n-butyl ether | 7.5% |
| Glycerin | 15.0% |
| 1,2-Hexanediol | 5.0% |
| Triethanolamine | 3.0% |
| Emulsion B | 1.0% (in terms of solid content) |
| Ion-exchanged water | Balance |

The preparation procedure was as follows.

To the surface-treated phthalocyanine pigment obtained in the foregoing Example 1-3 (1) were then added ion-exchanged water and triethanolamine so that the dispersibility providing group was subjected to ionic dissociation. Thereafter, to the surface-treated phthalocyanine pigment solution prepared previously was added gradually a mixture of Surfynol 465, triethylene glycol mono-n-butyl ether, glycerin, 1,2-hexanediol, and Emulsion B which had been prepared in a separate vessel with stirring to obtain the ink of Example 1-10 according to the invention.

The ink thus obtained exhibited a zeta-potential of 56 mV (absolute value), a viscosity of 4.1 mPa.s, and a surface tension of 32 mN/m. The amount of $SO_4^{2-}$ and polyvalent metal ion were 330 ppm and 450 ppm, respectively, as determined mentioned above.

(3) Printing Test, Ink Storage Stability Test

The ink of Example 1-10 was subjected to "printing test" and "ink storage stability test" as mentioned above.

The initial test results were the same as that of the foregoing Example 1-1 (Evaluation "A"). The test results after one week, too, were the same as that of the foregoing Example 1-1 (Evaluation "A"). Further, the results of storage stability test, too, were the same as that of the foregoing Example 1-1 (Evaluation "A").

(4) Printing Test on Glossy Medium

The ink of Example 1-10, too, was subjected to printing test on glossy recording media X, Y and Z as in Example 1-8. The ink of Example 1-10 exhibited a high scratching resistance and a high water resistance when printed on any of these glossy media. The gloss of the printed image was good with any of these glossy media (→Evaluation "A")

Example 1-11

(1) Preparation of Surface-treated Pigment: C.I. Pigment 15:3

In Example 1-11, the surface-treated phthalocyanine pigment prepared in the foregoing Example 1-3 (1) was used. Accordingly, the introduced amount of the dispersibility providing group was $58 \times 10^{-6}$ equivalent per g of surface-treated phthalocyanine pigment as calculated in terms of sulfonic acid group per g of pigment.

(2) Preparation of Ink for Ink Jet Recording

The phthalocyanine pigment obtained in the foregoing Example 1-3 (1) was used. As penetrating agents there were used Surfynol 465 (produced by Air Products Co., Ltd.), which is an acetylene glycol-based surface-treated pigment, and triethylene glycol mono-n-butyl ether, which is a glycol ether. As a particulate polymer there was used "Emulsion C".

The specific composition will be given below.

| | |
|---|---|
| Surface-treated phthalocyanine pigment of Example 1-3 (1) | 6.0% (in terms of solid content) |
| Surfynol 465 | 0.8% |
| Triethylene glycol mono-n-butyl ether | 7.5% |
| Glycerin | 15.0% |
| 1,2-Hexanediol | 5.0% |
| Triethanolamine | 3.0% |
| Emulsion C | 0.5% (in terms of solid content) |
| Ion-exchanged water | Balance |

The preparation procedure was as follows.

To the surface-treated phthalocyanine pigment obtained in the foregoing Example 1-3 (1) were then added ion-exchanged water and triethanolamine so that the dispersibility providing group was subjected to ionic dissociation. Thereafter, to the surface-treated phthalocyanine pigment solution prepared previously was added gradually a mixture of Surfynol 465, triethylene glycol mono-n-butyl ether, glycerin, 1,2-hexanediol, and Emulsion C which had been prepared in a separate vessel with stirring to obtain the ink of Example 1-11 according to the invention.

The ink thus obtained exhibited a zeta-potential of 56 mV (absolute value), a viscosity of 4.0 mPa.s, and a surface tension of 32 mN/m. The amount of $SO_4^{2-}$ and polyvalent metal ion were 320 ppm and 350 ppm, respectively, as determined mentioned above.

(3) Printing Test, Ink Storage Stability Test

The ink of Example 1-11 was subjected to "printing test" and "ink storage stability test" as mentioned above.

The initial test results were the same as that of the foregoing Example 1-1 (Evaluation "A"). The test results after one week, too, were the same as that of the foregoing Example 1-1 (Evaluation "A"). Further, the results of storage stability test, too, were the same as that of the foregoing Example 1-1 (Evaluation "A").

(4) Printing Test on Glossy Medium

The ink of Example 1-11, too, was subjected to printing test on glossy recording media X, Y and Z as in Example 1-8. The ink of Example 1-11 exhibited a high water resistance when printed on any of these glossy media. (→Evaluation "A") The ink of Example 1-11 exhibited a high scratching resistance with respect to the glossy media Y and Z. However, on the glossy medium X, the ink of Example 1-11 was found to show stain on the printed image when vigorously rubbed (→Evaluation "B"). Referring to gloss, some drop of gloss was found on some area of high duty portion of the various glossy media (→Evaluation "B"). From these results, it can be thought that the amount of the emulsion incorporated in the ink of Example 1-11 is not sufficient.

Table 1 shows collectively the results of the tests, including "printing test" and "ink storage stability test", on the inks of Examples 1-1 to 1-11 and Comparative Examples 1-1 to 1-3.

Examples and Comparative Examples of Second Ink of the Invention

Examples 2 (Examples 2-1 to 2-5) below are examples of the second ink of the invention, and Comparative Examples 2 (Comparative Examples 2-1 to 2-2) below are examples for comparison with the second ink of the invention.

The "amount of dispersibility providing group introduced into surface-treated pigment" and "ink physical properties (zeta-potential, viscosity, surface tension)" defined in the following Examples 2 (Examples 2-1 to 2-5) and Comparative Examples 2 (Comparative Examples 2-1 to 2-2) were determined according to the process described in the foregoing Example 1.

The "printing test" and "storage stability test" made on the inks obtained in Examples (Examples 2-1 to 2-5) and Comparative Examples 2 (Comparative Examples 2-1 to 2-2), too, were according to the process described in the foregoing Example 1.

Example 2-1

(1) Preparation of Surface-treated Pigment: Carbon Black 15 parts of carbon black ("MA-7", produced by Mitsubishi Chemical corporation) were mixed with 25 parts of sulfur trioxide in 200 parts of sulfolane. The mixture was then subjected to dispersion by a Type M250 Eiger motor mill (produced by Eiger Japan K.K.) at a percent bead packing of 70% and a rotary speed of 5,000 rpm for 1 hour. The mixture of a pigment paste and a solvent thus dispersed was transferred into an evaporator where it was then heated to a temperature of 120° C. at a pressure of 30 mmHg or less so that the water content in the system was distilled off as much as possible. The reaction system was then controlled to a temperature of 150° C. Subsequently, to the reaction solution was added 25 parts of sulfur trioxide. The reaction mixture was then allowed to undergo reaction for 6 hours. After the termination of reaction, the reaction product was washed with excessive sulfolane several times, poured into

TABLE 1

| Example No. | Introduced amount of dispersibility providing group (equivalent) | Physical properties of ink | | | Content in liquid component of ink | | Printing test | | Storage stability test | Printing test on glossy paper | | |
|---|---|---|---|---|---|---|---|---|---|---|---|---|
| | | Zeta-potential (mV) | Viscosity (mPa.s) | Surface tension (mN/m) | $SO_4^{2-}$ (ppm) | Polyvalent metal ion (ppm) | Initial test | Test after 1 week | | Scratching resistance | Gloss | Water resistance |
| Example 1-1 | $50 \times 10^{-6}$ | 43 | 4.7 | 32 | 1480 | 780 | A | A | A | | | |
| Example 1-2 | $41 \times 10^{-6}$ | 39 | 4.2 | 33 | 1920 | 870 | A | B | B | | | |
| Comparative Example 1-1 | $8.5 \times 10^{-6}$ | 28 | 4.0 | 32 | 2320 | 610 | C | C | C | | | |
| Example 1-3 | $58 \times 10^{-6}$ | 56 | 3.9 | 29 | 310 | 280 | A | A | A | | | |
| Example 1-4 | $58 \times 10^{-6}$ | 56 | 3.8 | 30 | 1320 | 880 | A | B | B | | | |
| Example 1-5 | $46 \times 10^{-6}$ | 41 | 3.9 | 30 | 1760 | 790 | A | A | A | | | |
| Comparative Example 1-2 | $6 \times 10^{-6}$ | 24 | 4.1 | 31 | 2710 | 550 | C | C | C | | | |
| Example 1-6 | $49 \times 10^{-6}$ | 53 | 4.4 | 29 | 1170 | 820 | A | B | B | | | |
| Example 1-7 | $35 \times 10^{-6}$ | 38 | 4.7 | 30 | 730 | 850 | A | B | B | | | |
| Comparative Example 1-3 | $8.5 \times 10^{-6}$ | 42 | 4.2 | 63 | 2110 | 420 | D | D | C | | | |
| Example 1-8 | $50 \times 10^{-6}$ | 43 | 4.9 | 32 | 1480 | 780 | A | A | A | A | A | A |
| Example 1-9 | $50 \times 10^{-6}$ | 43 | 5.9 | 32 | 1480 | 780 | A | B | B | A | A | A |
| Example 1-10 | $58 \times 10^{-6}$ | 56 | 4.1 | 32 | 330 | 450 | A | A | A | A | A | A |
| Example 1-11 | $58 \times 10^{-6}$ | 56 | 4.0 | 32 | 320 | 350 | A | A | A | B | B | A | water, and then filtered to obtain a surface-treated particulate carbon black pigment.

The amount of the dispersibility providing group introduced into the surface-treated carbon black pigment thus obtained was $50 \times 10^{-6}$ equivalent per g of pigment.

(2) Preparation of Ink for Ink Jet Recording

The carbon black pigment obtained in the foregoing Example 2-1 (1) was used as a colorant. As penetrating agents there were used diethylene glycol mono-n-butyl ether and 1,2-pentanediol. The specific composition will be given below.

| Surface-treated carbon black pigment | 8 parts (in terms of solid content) |
|---|---|
| Diethylene glycol mono-n-butyl ether | 6 parts |
| Glycerin | 10 parts |
| 1,5-Pentanediol | 5 parts |
| Aqueous ammonia solution (28%) | 0.2 part |
| Ion-exchanged water | Balance |

To the surface-treated carbon black pigment thus obtained were then added ion-exchanged water and ammonia (28% aqueous solution) so that the dispersibility providing group was subjected to ionic dissociation. Thereafter, to the surface-treated carbon black pigment solution was added gradually a mixture of diethylene glycol, glycerin and 1,2-pentanediol which had been prepared in a separate vessel with stirring to obtain the ink to be used in Example 2-1 according to the invention.

The ink thus obtained exhibited a zeta-potential of 45 mV (absolute value), a viscosity of 4.6 mPa.s, and a surface tension of 32 mN/m.

(3) Printing Test, Ink Storage Stability Test

The ink of Example 2-1 was subjected to "printing test" and "ink storage stability test" as mentioned above.

The results of printing test show that all the printed images thus obtained had little or no irregular bleeding and thus are good image having a high print density. The drying time required until the ink when solid-printed penetrates into the paper to disappear was less than 2 seconds regardless of the kind of the paper used. Thus, the ink exhibited a good dryability. (→Evaluation "A") The results of the ink storage stability test show that there occurred little or no production of foreign matters and change of physical properties (viscosity, surface tension) between before and after storage under any conditions, demonstrating that the ink has a good storage stability. (→Evaluation "A")

Comparative Example 2-1

(1) Preparation of Surface-treated Carbon Black

The procedure of the foregoing Example 2-1 was followed except that 15 parts of carbon black were used, 300 parts of pyrrolidone were used as a solvent, the treatment containing sulfur was replaced by 3 parts of amidesulfuric acid, and the reaction in the evaporator was effected at a temperature of 120° C. for 1 hour to obtain a surface-treated carbon black pigment.

The amount of the dispersibility providing group introduced into the surface-treated carbon black pigment thus obtained was $8.5 \times 10^{-6}$ equivalent per g of pigment.

(2) Preparation of Ink for Ink Jet Recording

The procedure of the foregoing Example 2-1 was followed except that the surface-treated carbon black pigment of Example 2-1 was replaced by the surface-treated carbon black pigment of Comparative Example 2-1. The ink thus obtained exhibited a zeta-potential of 28 mV (absolute value), a viscosity of 4.1 mPa.s, and a surface tension of 32 mN/m.

(3) Printing Test, Ink Storage Stability Test

The ink of Comparative Example 2-1 was subjected to "printing test" and "ink storage stability test" as mentioned above.

The results of printing test show that all the printed images thus obtained had some bleeding and a lower print density than in Example 1-2 (→Evaluation "C"). The drying time required until the ink when solid-printed penetrates into the paper to disappear was less than 2 seconds regardless of the kind of the paper used. Thus, the ink had no problem with dryability. The results of ink storage stability test show that foreign matters occurred and the physical properties (viscosity, surface tension) changed after storage under any conditions, making it impossible to obtain a good storage stability (→Evaluation "C").

Example 2-2

(1) Preparation of Surface-treated Phthalocyanine Pigment 20 parts of a phthalocyanine pigment (C.I. pigment 15:3) were mixed with 500 parts of quinoline. The mixture was then subjected to dispersion by a Type M250 Eiger motor mill (produced by Eiger Japan K.K.) at a percent bead packing of 70% and a rotary speed of 5,000 rpm for 2 hours. The mixture of a pigment paste and a solvent thus dispersed was transferred into an evaporator where it was then heated to a temperature of 120° C. at a pressure of 30 mmHg or less so that the water content in the system was distilled off as much as possible. The reaction system was then controlled to a temperature of 160° C. Subsequently, to the reaction solution was added 20 parts of sulfonated pyridine complex. The reaction mixture was then allowed to undergo reaction for 8 hours. After the termination of reaction, the reaction product was washed with excessive quinoline several times, poured into water, and then filtered to obtain a surface-treated particulate phthalocyanine blue pigment.

The amount of the dispersibility providing group introduced into the surface-treated phthalocyanine pigment thus obtained was $58 \times 10^{-6}$ equivalent per g of pigment.

(2) Preparation of Ink for Ink Jet Recording

In Example 2-2, the phthalocyanine pigment thus surface-treated was used as a colorant. As penetrating agents there were used Surfynol 485 and Surfynol TG (produced by Air Products Inc.), which are acetylene glycol-based surface active agents, propylene glycol-mono-n-butyl ether, which is a glycol ether, and 1,2-hexanediol, which is a 1,2-alkylene glycol. The specific composition will be given below.

| Surface-treated phthalocyanine pigment | 8 parts (in terms of solid content) |
|---|---|
| Surfynol 485 | 0.8 part |
| Surfynol TG | 0.7 part |
| Propylene glycol mono-n-butyl ether | 5.0 parts |
| Glycerin | 12 parts |
| 1,2-Hexanediol | 5.0 parts |
| 2-Pyrrolidone | 5.0 parts |
| Triethanolamine | 3.0 parts |
| EDTA (ethylenediaminetetraacetic acid) | 0.03 part |
| Ion-exchanged water | Balance |

To the surface-treated phthalocyanine pigment thus obtained were then added ion-exchanged water (80% of the desired added amount) and triethanolamine so that the dispersibility providing group was subjected to ionic dissociation. Thereafter, to the surface-treated phthalocyanine pigment solution prepared previously was added gradually a mixture of Surfynol 485, Surfynol TG, propylene glycol mono-n-butyl ether, glycerin, 1,2-hexanediol, 2-pyrrolidone, and ion-exchanged water (20% of the desired added amount) which had been prepared in a separate vessel with stirring to obtain the ink of Example 2-2 according to the invention.

The ink thus obtained exhibited a zeta-potential of 56 mV (absolute value), a viscosity of 4.3 mPa.s, and a surface tension of 29 mN/m.

(3) Printing Test, Ink Storage Stability Test

The ink of Example 2-2 was subjected to "printing test" and "ink storage stability test" as mentioned above.

The results of printing test were the same as that of the foregoing Example 2-1 except that the drying time was less than 1 second (Evaluation "A"). The results of storage stability, too, were the same as that of the foregoing Example 2-1 (Evaluation "A").

Comparative Example 2-2

(1) Preparation of Surface-treated Phthalocyanine Pigment

The procedure of the foregoing Example 2-2 (preparation of surface-treated phthalocyanine pigment) was followed except that 15 parts of phthalocyanine were used, 300 parts of pyrrolidone were used as a solvent, the treatment containing sulfur was replaced by 3 parts of amidesulfuric acid, and the reaction in the evaporator was effected at a temperature of 120° C. for 1 hour.

The amount of the dispersibility providing group introduced into the surface-treated phthalocyanine pigment thus obtained was $6 \times 10^{-6}$ equivalent per g of pigment.

(2) Preparation of Ink for Ink Jet Recording

The procedure of the foregoing Example 2-2 was followed except that the surface-treated phthalocyanine pigment of Example 2-2 was replaced by the surface-treated phthalocyanine pigment of Comparative Example 2-2 (1). The ink thus obtained exhibited a zeta-potential of 22 mV (absolute value), a viscosity of 4.5 mPa.s, and a surface tension of 30 mN/m.

(3) Printing Test, Ink Storage Stability Test

The ink of Comparative Example 2-2 was subjected to "printing test" and "ink storage stability test" as mentioned above.

The results of printing test show that all the printed images thus obtained had some bleeding and a lower print density than in Example 2-2 (→Evaluation "C"). The drying time required until the ink when solid-printed penetrates into the paper to disappear was less than 1 second regardless of the kind of the paper used. Thus, the ink had no problem with dryability. The results of ink storage stability test were the same as that of the foregoing Comparative Example 2-1 (→Evaluation "C").

Example 2-3

(1) Preparation of Surface-treated Quinophthalone Yellow Pigment 20 parts of a quinophthalone pigment (C.I. pigment yellow 138) were mixed with 500 parts of quinoline. The mixture was then subjected to dispersion by a Type M250 Eiger motor mill (produced by Eiger Japan K.K.) at a percent bead packing of 70% and a rotary speed of 5,000 rpm for 2 hours. The mixture of a pigment paste and a solvent thus dispersed was transferred into an evaporator where it was then heated to a temperature of 120° C. at a pressure of 30 mmHg or less so that the water content in the system was distilled off as much as possible. The reaction system was then controlled to a temperature of 160° C. Subsequently, to the reaction solution was added 20 parts of sulfonated pyridine complex. The reaction mixture was then allowed to undergo reaction for 8 hours. After the termination of reaction, the reaction product was washed with excessive quinoline several times, poured into water, and then filtered to obtain a surface-treated particulate quinophthalone yellow pigment.

The amount of the dispersibility providing group introduced into the surface-treated quinophthalone yellow pigment thus obtained was $48 \times 10^{-6}$ equivalent per g of pigment.

(2) Preparation Ink for Ink Jet Recording

In Example 2-3, the quinophthalone yellow pigment thus surface-treated was used as a colorant. As penetrating agents there were used the same compounds as used in Example 2-2. The ink composition and the preparation process were quite the same as used in Example 2-2. The ink thus obtained exhibited a zeta-potential of 54 mV (absolute value), a viscosity of 4.6 mPa.s, and a surface tension of 31 mN/m.

(3) Printing Test, Ink Storage Stability Test

The ink of Example 2-3 was subjected to "printing test" and "ink storage stability test" as mentioned above.

The results of printing test were the same as that of the foregoing Example 2-2 (Evaluation "A"). The results of storage stability, too, were the same as that of the foregoing Example 2-2 (Evaluation "A").

Example 2-4

(1) Preparation of Surface-treated Quinacridone Red Pigment

The preparation procedure of Example 2-3, including dispersion solvent, treatment containing sulfur and reaction conditions, was followed except that the quinophthalone yellow pigment of the foregoing Example 2-3 was replaced by a quinacridone pigment (C.I. pigment violet 19).

The amount of the dispersibility providing group introduced into the surface-treated quinacridone pigment thus obtained was $35 \times 10^{-6}$ equivalent per g of pigment.

(2) Preparation Ink for Ink Jet Recording

In Example 2-4, the quinacridone red pigment thus surface-treated was used as a colorant. As penetrating agents there were used the same compounds as used in Example 2-2. The ink composition and the preparation process were quite the same as used in Example 2-2. The ink thus obtained exhibited a zeta-potential of 38 mV (absolute value), a viscosity of 4.3 mPa.s, and a surface tension of 30 mN/m.

(3) Printing Test, Ink Storage Stability Test

The ink of Example 2-4 was subjected to "printing test" and "ink storage stability test" as mentioned above.

The results of printing test were the same as that of the foregoing Example 2-2 (Evaluation "A"). The results of storage stability, too, were the same as that of the foregoing Example 2-2 (Evaluation "A").

Example 2-5

(1) Preparation of Surface-treated Aniline Black Pigment 15 parts of an aniline black pigment (C.I. pigment 1) were mixed with 800 parts of pyrrolidone. The mixture was then subjected to dispersion by a Type M250 Eiger motor mill (produced by Eiger Japan K.K.) at a percent bead packing of 70% and a rotary speed of 5,000 rpm for 1 hour. The mixture of a pigment paste and a solvent thus dispersed was transferred into an evaporator where it was then heated to a temperature of 120° C. at a pressure of 30 mmHg or less so that the water content in the system was distilled off as much as possible. The reaction system was then controlled to a temperature of 140° C. Subsequently, to the reaction solution was added 20 parts of sulfamic acid. The reaction mixture was then allowed to undergo reaction for 6 hours. In Example 2-7, the dispersion was withdrawn in the course of the reaction, repeatedly washed with a solvent, and then allowed to undergo reaction until the introduced amount of dispersibility providing group reached $15 \times 10^{-6}$ equivalent as determined by the "method for the determination of the introduced amount of dispersibility providing group" as previously mentioned. The reaction time in Example 2-5 was about 3 hours.

Accordingly, the amount of the dispersibility providing group introduced into the surface-treated aniline black pigment thus obtained was $15 \times 10^{-6}$ equivalent per g of pigment.

(2) Preparation Ink for Ink Jet Recording

In Example 2-5, the aniline black pigment thus surface-treated was used as a colorant. As penetrating agents there were used the same compounds as used in Example 2-2. The ink composition and the ink composition ratio were quite the same as used in Example 2-2 except that the phthalocyanine pigment of Example 2-2 was replaced by the foregoing surface-treated aniline black pigment.

In some detail, to the surface-treated aniline black pigment dispersion thus obtained was added a mixture of Surfynol 465, propylene ethylene glycol monobutyl ether, 1,2-hexanediol, glycerin, triethanolamine, ion-exchanged water, EDTA (previously dissolved in ion-exchanged water), etc. to obtain the ink for ink jet recording of Example 2-7.

The ink thus obtained exhibited a zeta-potential of 42 mV (absolute value), a viscosity of 4.4 mPa.s, and a surface tension of 29 mN/m.

In Example 2-5, when the dispersion medium was added the surface-treated aniline black pigment, the pigment underwent slight agglomeration. Thus, the dispersion needed to be stirred for a period of time as long as about three times that of Examples 2-1 to 2-4. The ink of Example 2-5 is satisfactory as compared with the conventional inks but leaves something to be desired in simplicity in the preparation of ink, which is one of the objects of the invention, as compared with Examples 2-1 to 2-4.

(3) Printing Test, Ink Storage Stability Test

The ink of Example 2-5, which had been obtained by prolonging the stirring time to attain complete uniform dispersion, was subjected to "printing test" and "ink storage stability test" as mentioned above.

The results of printing test were the same as that of the foregoing Example 2-2 (Evaluation "A"). The results of storage stability, too, were the same as that of the foregoing Example 2-2 (Evaluation "A").

Table 2 shows the data, including test results, of the inks of Examples 2-1 to 2-5 and Comparative Examples 2-1 to 2-2

TABLE 2

| Example No. | Amount of dispersibility providing group introduced into surface-treated pigment | Physical properties of ink | | | Results of tests on ink | |
|---|---|---|---|---|---|---|
| | | Zeta-potential | Viscosity | Surface tension | Printing test | Storage stability test |
| Example 2-1 | $50 \times 10^{-6}$ equivalent | 45 mV | 4.6 mPa.s | 32 mN/m | A | A |
| Comparative Example 2-1 | $8.5 \times 10^{-6}$ equivalent | 28 mV | 4.1 mPa.s | 32 mN/m | C | C |
| Example 2-2 | $58 \times 10^{-6}$ equivalent | 56 mV | 4.3 mPa.s | 29 mN/m | A | A |
| Comparative Example 2-2 | $6 \times 10^{-6}$ equivalent | 22 mV | 4.5 mPa.s | 30 mN/m | C | C |
| Example 2-3 | $48 \times 10^{-6}$ equivalent | 54 mV | 4.6 mPa.s | 31 mN/m | A | A |
| Example 2-4 | $35 \times 10^{-6}$ equivalent | 38 mV | 4.3 mPa.s | 30 mN/m | A | A |
| Example 2-5 | $15 \times 10^{-6}$ equivalent | 42 mV | 4.4 mPa.s | 29 mN/m | A | A |

Examples and Comparative Examples of Third Ink of the Invention

Examples 3 (Examples 3-1 to 3-8) below are examples of the third ink of the invention, and Comparative Examples 3 (Comparative Examples 3-1 to 3-8) below are examples for comparison with the third ink of the invention. The "amount of sulfonic acid group and/or sulfinic acid group (dispersibility providing group introduced into surface-treated pigment)" and "ink physical properties (zeta-potential, viscosity, surface tension)" defined in the following Examples 3 (Examples 3-1 to 3-8) and Comparative Examples 3 were determined according to the process described in the foregoing Example 1.

The "amount of alkaline metal ion in the liquid component (vehicle) of the ink" defined in Examples 3 (Examples 3-1 to 3-8) was determined by the "method for the measurement of amount of sulfuric acid ion and polyvalent metal ion" described in the foregoing Example 1.

The inks prepared in Examples 3 were each subjected to centrifuging by a centrifugal ultrafiltrating apparatus (C-15, produced by Millipore Inc.). As a filter there was used a Type NMWL10000 filter. The centrifuging was effected at 2,500 G for 60 minutes. 10 mg of the resulting filtrate was subjected to combustion by oxygen flask method, absorbed by a 0.2% aqueous solution of nitric acid which was then subjected to ion chromatography (column: ionPac AS12A; DX-500, produced by Nippon Dionex Corp.) to determine the amount of alkaline metal ion in the liquid component (vehicle).

The inks obtained in the following Examples 3 (Examples 3-1 to 3-8) and Comparative Examples 3 were each subjected to "printing test" in the same manner as described in the foregoing Example 1. For "ink storage stability test", the inks prepared in Examples 3 and Comparative Examples 3 were each sealed in a glass sample bottle as in the foregoing Example 1. The samples were each then allowed to stand at 60° C. for 1 week or at −20° C. for 1 week. The samples were each examined for occurrence of foreign matters in the ink and change of physical properties (viscosity, surface tension before and after storage. The confirmation of occurrence of foreign matters was accomplished by filtering the ink through a twill-woven metallic filter having a pore size of 25 µm, and then observing the amount of foreign matters left on the filter under a microscope.

Example 3-1

(1) Preparation of Surface-treated Carbon Black

A carbon black dispersion having a sulfonic acid group and/or sulfinic acid group chemically bonded to the surface thereof was obtained in the same manner as in the foregoing Example 2-1. The amount of the sulfonic acid group and/or sulfinic acid group introduced into the surface-treated pigment was $50 \times 10^{-6}$ equivalent per g of particulate pigment.

(2) Preparation Ink for Ink Jet Recording

An ink having the same composition as that of the foregoing Example 2-1 was prepared. The ink thus obtained exhibited a zeta-potential of 45 mV (absolute value), a viscosity of 4.6 mPa.s, and a surface tension of 32 mN/m. The concentration of alkaline metal ion in the liquid component (vehicle) was 960 ppm as determined by the foregoing method.

(3) Printing Test, Ink Storage Stability Test

The ink of Example 3-1 was subjected to "printing test" and "ink storage stability test" as mentioned above.

The results of printing test show that all the printed images thus obtained had little or no irregular bleeding and thus are good image having a high print density. The drying time required until the ink when solid-printed penetrates into the paper to disappear was less than 2 seconds regardless of the kind of the paper used. Thus, the ink exhibited a good dryability (→Evaluation "A"). The results of the ink storage stability test show that there occurred little or no production of foreign matters and change of physical properties (viscosity, surface tension) between before and after storage under any conditions, demonstrating that the ink has a good storage stability (→Evaluation "A").

Example 3-2

(1) Surface-treated Pigment

In Example 3-2, the same "carbon black pigment having sulfonic acid group and/or sulfinic acid group chemically bonded to the surface thereof" as used in the foregoing Example 3-1 was used. Accordingly, the amount of the sulfonic acid group and/or sulfinic acid group introduced in the surface-treated carbon black pigment was $50 \times 10^{-6}$ equivalent per g of particulate pigment.

(2) Preparation Ink for Ink Jet Recording

The preparation procedure of the foregoing Example 3-1 was followed except that as alkaline compounds there were used ammonia and sodium hydroxide as shown in the following formulations to prepare an ink for ink jet recording. The ink thus obtained exhibited a zeta-potential of 50 mV (absolute value), a viscosity of 4.7 mPa.s, and a surface tension of 33 mN/m. The concentration of alkaline metal ion in the liquid component (vehicle) was 1,620 ppm as determined by the foregoing method.

| * Specific composition of ink of Example 3-2 | |
|---|---|
| Carbon black pigment having sulfonic acid group and/or sulfinic acid group chemically bonded to the surface thereof | 8 parts |
| Diethylene glycol monobutyl ether | 6 parts |
| Glycerin | 10 parts |
| 1,2-Penanediol | 5 parts |
| Aqueous ammonia (28%) | 0.3 part |
| Aqueous solution of sodium hydroxide (28%) | 0.2 part |
| Ion-exchanged water | Balance |

(3) Printing Test, Ink Storage Stability Test

The ink of Example 3-2 was subjected to "printing test" and "ink storage stability test" as mentioned above.

The results of printing test were the same as that of the foregoing Example 3-1 (Evaluation "A"). The results of storage stability test, too, were the same as that of the foregoing Example 3-1 (Evaluation "A").

Example 3-3

(1) Surface-treated Pigment

In Example 3-3, the same "carbon black pigment having sulfonic acid group and/or sulfinic acid group chemically bonded to the surface thereof" as used in the foregoing Example 3-1 was used. Accordingly, the amount of the sulfonic acid group and/or sulfinic acid group introduced in the surface-treated carbon black pigment was $50 \times 10^{-6}$ equivalent per g of particulate pigment.

(2) Preparation Ink for Ink Jet Recording

The preparation procedure of the foregoing Example 3-1 was followed except that as an alkaline compound there was used sodium hydroxide as shown in the following formulations to prepare an ink for ink jet recording. The ink thus obtained exhibited a zeta-potential of 49 mV (absolute value), a viscosity of 4.8 mPa.s, and a surface tension of 32 mN/m. The concentration of alkaline metal ion in the liquid component (vehicle) was 2,060 ppm as determined by the foregoing method.

| * Specific composition of ink of Example 3-3 | |
|---|---|
| Carbon black pigment having sulfonic acid group and/or sulfinic acid group chemically bonded to the surface thereof | 8 parts (in terms of solid content) |
| Diethylene glycol monobutyl ether | 6 parts |
| Glycerin | 10 parts |
| 1,2-Penanediol | 5 parts |
| Aqueous solution of sodium hydroxide (28%) | 2 parts |
| Ion-exchanged water | Balance |

(3) Printing Test, Ink Storage Stability Test

The ink of Example 3-3 was subjected to "printing test" and "ink storage stability test" as mentioned above.

The results of printing test were the same as that of the foregoing Example 3-1 (Evaluation "A"). Under any conditions, the ink of Example 3-3 underwent occurrence of foreign matters and some change of physical properties (viscosity, surface tension) and left something to be desired in storage stability (Evaluation "B").

Example 3-4

(1) Surface-treated Pigment

In Example 3-4, the surface-treated phthalocyanine pigment (C.I. pigment blue 15:3) prepared in the foregoing Example 1-3 (1) was used. In some detail, a phthalocyanine pigment having a sulfonic acid group and/or sulfinic acid group chemically bonded to the surface thereof was obtained in the same manner as in the foregoing Example 1-3 (1). The amount of the sulfonic acid group and/or sulfinic acid group introduced into the surface-treated pigment thus obtained was $58 \times 10^{-6}$ equivalent per g of particulate pigment.

(2) Preparation Ink for Ink Jet Recording

To the phthalocyanine pigment having a sulfonic acid group and/or sulfinic acid group chemically bonded to the surface thereof were added ion-exchanged water (80% of the desired added amount) and triethanolamine so that the sulfonic acid group/sulfinic acid group was converted to sulfonic acid anion group and/or sulfinic acid anion group.

Thereafter, to the surface-treated phthalocyanine pigment solution was added gradually a mixture of Surfynol 465, Surfynol 61, triethylene glycol mono-n-butyl ether, 1,2-hexanediol, glycerin, ion-exchanged water (20% of the desired added amount) and EDTA (previously dissolved in ion-exchanged water) which had been prepared in a separate vessel with stirring to obtain the ink of Example 3-4 according to the invention.

The specific ink composition will be given below. As penetrating agents there were used in combination Surfynol 465 (produced by Air Products Inc.), which is an acetylene glycol-based surface active agent, Surfynol 61 (produced by Air Products Inc.), which is an acetylene alcohol-based surface active agent, triethylene glycol-mono-n-butyl ether, which is a glycol ether, and 1,2-hexanediol, which is a 1,2-alkylene glycol. The ink thus obtained exhibited a zeta-potential of 53 mV (absolute value), a viscosity of 4.6 mPa.s, and a surface tension of 31 mN/m. The concentration of alkaline metal ion in the liquid component (vehicle) was 560 ppm as determined by the foregoing method.

| * Specific composition of ink of Example 3-4 | |
|---|---|
| Phthalocyanine pigment having sulfonic acid group and/or sulfinic acid group chemically bonded to the surface thereof | 8 parts (in terms of solid content) |
| Surfynol 465 | 0.8 part |
| Surfynol 61 | 0.5 part |
| Triethylene glycol monobutyl ether | 5 parts |
| 1,2-hexanediol | 6 parts |
| Glycerin | 10 parts |
| Triethanolamine | 0.9 part |
| EDTA (ethylenediaminetetraacetic acid) | 0.03 part |
| Ion-exchanged water | Balance |

(3) Printing Test, Ink Storage Stability Test

The ink of Example 3-4 was subjected to "printing test" and "ink storage stability test" as mentioned above.

The results of printing test were the same as that of the foregoing Example 3-1 except that the drying time was less than 1 second (Evaluation "A"). The results of storage stability, too, were the same as that of the foregoing Example 3-1 (Evaluation "A").

Example 3-5

(1) Surface-treated Pigment

In Example 3-4, the same carbon black pigment having sulfonic acid group and/or sulfinic acid group chemically bonded to the surface thereof as used in the foregoing Example 3-4 was used. Accordingly, the amount of the sulfonic acid group and/or sulfinic acid group introduced in the surface-treated carbon black pigment was $58 \times 10^{-6}$ equivalent per g of particulate pigment.

(2) Preparation Ink for Ink Jet Recording

The preparation procedure of the foregoing Example 3-4 was followed except that as alkaline compounds there were used ammonia and sodium hydroxide as shown in the following formulations to prepare an ink for ink jet recording. The specific ink composition will be given below.

The ink thus obtained exhibited a zeta-potential of 47 mV (absolute value), a viscosity of 4.7 mPa.s, and a surface tension of 33 mN/m. The concentration of alkaline metal ion in the liquid component (vehicle) was 1,760 ppm as determined by the foregoing method.

| * Specific composition of ink of Example 3-5 | |
|---|---|
| Phthalocyanine pigment having sulfonic acid group and/or sulfinic acid group chemically bonded to the surface thereof | 8 parts (in terms of solid content) |
| Surfynol 465 | 0.8 part |
| Surfynol 61 | 0.5 part |
| Triethylene glycol monobutyl ether | 5 parts |
| 1,2-Hexanediol | 6 parts |
| Glycerin | 10 parts |
| Aqueous ammonia (28%) | 0.2 part |
| Aqueous solution of sodium hydroxide (28%) | 0.2 part |
| EDTA (ethylenediaminetetraacetic acid) | 0.03 part |
| Ion-exchanged water | Balance |

(3) Printing Test, Ink Storage Stability Test

The ink of Example 3-5 was subjected to "printing test" and "ink storage stability test" as mentioned above.

The results of printing test were the same as that of the foregoing Example 3-1 (Evaluation "A"). The results of storage stability test, too, were the same as that of the foregoing Example 3-1 (Evaluation "A").

Example 3-6

(1) Surface-treated Pigment

The same phthalocyanine pigment having sulfonic acid group and/or sulfinic acid group chemically bonded to the surface thereof as used in the foregoing Example 3-4 was used. Accordingly, the amount of the sulfonic acid group and/or sulfinic acid group introduced in the surface-treated pigment was $58 \times 10^{-6}$ equivalent per g of particulate pigment.

(2) Preparation Ink for Ink Jet Recording

The preparation procedure of the foregoing Example 3-4 was followed except that as alkaline compounds there were used ammonia and sodium hydroxide and as penetrating agents there were used diethylene glycol mono-n-butyl ether and 1,2-pentanediol as shown in the following formulations to prepare an ink for ink jet recording. The specific ink composition will be given below.

The ink thus obtained exhibited a zeta-potential of 45 mV (absolute value), a viscosity of 4.8 mPa.s, and a surface tension of 32 mN/m. The concentration of alkaline metal ion in the liquid component (vehicle) was 2,100 ppm as determined by the foregoing method.

| * Specific composition of ink of Example 3-6 | |
|---|---|
| Phthalocyanine pigment having sulfonic acid group and/or sulfinic acid group chemically bonded to the surface thereof | 8 parts (in terms of solid content) |
| Diethylene glycol monobutyl ether | 6 parts |
| Glycerin | 10 parts |
| 1,2-Pentanediol | 5 parts |
| Aqueous ammonia (28%) | 1.0 part |
| Aqueous solution of sodium hydroxide (20%) | 1.0 part |
| Ion-exchanged water | Balance |

(3) Printing Test, Ink Storage Stability Test

The ink of Example 3-6 was subjected to "printing test" and "ink storage stability test" as mentioned above.

The results of printing test were the same as that of the foregoing Example 3-1 (Evaluation "A"). The results of ink storage stability test, too, were the same as that of the foregoing Example 3-1 ((Evaluation "A"). As a result of the ink storage stability test, under any conditions, the ink of Example 3-6 underwent occurrence of foreign matters and some change of physical properties (viscosity, surface tension) and left something to be desired in storage stability (Evaluation "B").

Example 3-7

(1) Surface-treated Pigment

In Example 3-7, the same isoindolinone pigment (C.I. pigment yellow 110) having sulfonic acid group and/or sulfinic acid group chemically bonded to the surface thereof as used in the foregoing Example 1-6 was used. Accordingly, the amount of the sulfonic acid group and/or sulfinic acid group introduced in the surface-treated pigment was $49 \times 10^{-6}$ equivalent per g of particulate pigment.

(2) Preparation Ink for Ink Jet Recording

The preparation procedure of the foregoing Example 3-4 was followed except that as an alkaline compound there was used monoethanolamine and as penetrating agents there were used diethylene glycol Mon-n-butyl ether and 1,2-pentanediol as shown in the following formulations to prepare an ink for ink jet recording.

The ink thus obtained exhibited a zeta-potential of 49 mV (absolute value), a viscosity of 4.7 mPa.s, and a surface tension of 32 mN/m. The concentration of alkaline metal ion in the liquid component (vehicle) was 1,330 ppm as determined by the foregoing method.

| * Specific composition of ink of Example 3-7 | |
|---|---|
| Isoindolinone pigment having sulfonic acid group and/or sulfinic acid group chemically bonded to the surface thereof | 8 parts (in terms of solid content) |
| Diethylene glycol monobutyl ether | 6 parts |
| Glycerin | 10 parts |
| 1,2-Pentanediol | 5 parts |
| Triethanolamine | 0.5 part |
| Monoethanolamine | 0.4 part |
| Ion-exchanged water | Balance |

(3) Printing Test, Ink Storage Stability Test

The ink of Example 3-7 was subjected to "printing test" and "ink storage stability test" as mentioned above.

The results of printing test were the same as that of the foregoing Example 3-1 (Evaluation "A"). The results of ink storage stability test, too, were the same as that of the foregoing Example 3-1 (Evaluation "A").

Example 3-8

(1) Preparation of Surface-treated Pigment

In Example 3-8, the same dimethyl quinacridone pigment (C.I. pigment red 122) having sulfonic acid group and/or sulfinic acid group chemically bonded to the surface thereof as used in the foregoing Example 1-7 (1) was used. The amount of the sulfonic acid group and/or sulfinic acid group introduced into the surface-treated pigment was $35 \times 10^{-6}$ equivalent per g of pigment.

(2) Preparation Ink for Ink Jet Recording

The preparation procedure of the foregoing Example 3-7 was followed except that as alkaline compounds there were used N,N-diethylethanolamine and lithium hydroxide. The ink thus obtained exhibited a zeta-potential of 48 mV (absolute value), a viscosity of 4.6 mPa.s, and a surface tension of 32 mN/m. The concentration of alkaline metal ion in the liquid component (vehicle) was 1,510 ppm as determined by the foregoing method.

| * Specific composition of ink of Example 3-8 | |
|---|---|
| Quinacridone pigment having sulfonic acid group and/or sulfinic acid group chemically bonded to the surface thereof | 8 parts (in terms of solid content) |
| Diethylene glycol monobutyl ether | 6 parts |
| Glycerin | 10 parts |
| 1,2-Pentanediol | 5 parts |
| N,N-diethylethanolamine | 0.3 part |
| Aqueous solution of lithium hydroxide (10%) | 0.2 part |
| Ion-exchanged water | Balance |

(3) Printing Test, Ink Storage Stability Test

The ink of Example 3-8 was subjected to "printing test" and "ink storage stability test" as mentioned above.

The results of printing test were the same as that of the foregoing Example 3-1 (Evaluation "A"). The results of storage stability test, too, were the same as that of the foregoing Example 3-1 (Evaluation "A").

Comparative Example 3

(1) Preparation of Surface-treated Carbon Black

A particulate carbon black pigment having a sulfonic acid group and/or sulfinic acid group chemically bonded to the surface thereof was obtained in the same manner as in the foregoing Example 3-1. The amount of the sulfonic acid group and/or sulfinic acid group introduced into the surface-treated carbon black pigment was $50 \times 10^{-6}$ equivalent per g of particulate pigment.

(2) Preparation Ink for Ink Jet Recording

The ink of Comparative Example 3 comprised an aqueous solution of potassium hydroxide (20%) incorporated therein as an alkaline compound. In Comparative Example 3, potassium hydroxide was excessively added to enhance the concentration of alkaline metal ion in the liquid component of ink. The procedure of the foregoing Example 3-1 was followed except for these conditions.

The ink thus obtained exhibited a zeta-potential of 29 mV (absolute value), a viscosity of 5.6 mPa.s, and a surface tension of 34 mN/m. The concentration of alkaline metal ion in the liquid component (vehicle) was 14,800 ppm as determined by the foregoing method.

(3) Printing Test, Ink Storage Stability Test

The ink of Comparative Example 3 was subjected to "printing test" and "ink storage stability test" as mentioned above.

As a result of printing test, the printed image thus obtained showed much irregular bleeding. Thus, no sharp image was obtained. In particular, throughout the printing test, there occurred drop of dot and bent flying while printing was being made on a sheet of the recording paper. The resulting printed matter was rough and was not worth evaluating (Evaluation "C": print density not evaluated). The results of ink storage stability test show that foreign matters occurred and the physical properties (viscosity, surface tension) changed after storage under any conditions, making it impossible to obtain a good storage stability (→Evaluation "C").

Table 3 shows the data, including test results, of the inks of Examples 3-1 to 3-8 and Comparative Example 3.

TABLE 3

| Example No. | Amount of dispersibility providing group introduced into surface-treated pigment | Physical properties of ink | | | Concentration of alkaline metal ion in liquid component of ink | Results of tests on ink | |
|---|---|---|---|---|---|---|---|
| | | Zeta-potential | Viscosity | Surface tension | | Printing test | Storage stability test |
| Example 3-1 | $50 \times 10^{-6}$ equivalent | 45 mV | 4.6 mPa.s | 32 mN/m | 960 ppm | A | A |
| Example 3-2 | $50 \times 10^{-6}$ equivalent | 50 mV | 4.7 mPa.s | 33 mN/m | 1,620 ppm | A | A |
| Example 3-3 | $50 \times 10^{-6}$ equivalent | 49 mV | 4.8 mPa.s | 32 mN/m | 2,060 ppm | A | B |
| Example 3-4 | $58 \times 10^{-6}$ equivalent | 53 mV | 4.6 mPa.s | 31 mN/m | 560 ppm | A | A |
| Example 3-5 | $58 \times 10^{-6}$ equivalent | 47 mV | 4.7 mPa.s | 33 mN/m | 1,760 ppm | A | A |
| Example 3-6 | $58 \times 10^{-6}$ equivalent | 45 mV | 4.8 mPa.s | 32 mN/m | 2,100 ppm | A | B |
| Example 3-7 | $49 \times 10^{-6}$ equivalent | 49 mV | 4.7 mPa.s | 32 mN/m | 1,330 ppm | A | A |
| Example 3-8 | $35 \times 10^{-6}$ equivalent | 48 mV | 4.6 mPa.s | 32 mN/m | 1,510 ppm | A | A |
| Comparative Example 3 | $50 \times 10^{-6}$ equivalent | 29 mV | 5.6 mPa.s | 34 mN/m | 14,800 ppm | C | C |

Table 4 shows the results of "printing test" and "storage stability test" on the inks of Examples 3-1 to 3-8 analyzed from other standpoints of view.

Evaluations (A, B) in Table 4 have the following meaning.
(Bleeding)
A: No bleeding
B: Little bleeding
(Print Density)
A: Very high density
B: High density
(Foreign Matters)
A: Little or no foreign matters produced
B: Some foreign matters produced
(Physical Properties)
A: Little or no change of physical properties
B: Some change of physical properties In Table 4, the figure in the column of kind of pigment, alkaline compound, penetrating agent and other additives indicates the amount of these components in terms of parts by weight in the ink, with the proviso that the balance is the amount of ion-exchanged water. TEA stands for triethanolamine, MEA stands for monoethanolamine, DEEA stands for N,N-diethylethanolamine, Surfy 465 stands for Surfynol, DEGmBe stands for diethylene glycol monobutyl ether, TEGmBE stands for triethylene glycol monobutyl ether, Gly stands for glycerin, 1,5-PD stands for 1,5-pentanediol, 1,2-HD stands for 1,2-hexanediol, and EDTA stands for ethylenediaminetetraacetic acid.

TABLE 4

| | | | Example 3-1 | Example 3-2 | Example 3-3 | Example 3-4 | Example 3-5 | Example 3-6 | Example 3-7 | Example 3-8 |
|---|---|---|---|---|---|---|---|---|---|---|
| Concentration of alkaline metal ion (ppm) | | | 960 | 1,620 | 2,060 | 560 | 1,760 | 2,100 | 1,330 | 1,510 |
| Composition | Kind of pigment | Carbon black | 8 | 8 | 8 | | | | | |
| | | Phthalocyanine | | | | 8 | 8 | 8 | | |
| | | Isoindolinone | | | | | | | 8 | |
| | | Quinacridone | | | | | | | | 8 |
| | Introduced amount (*) | | $50 \times 10^{-6}$ | $50 \times 10^{-6}$ | $50 \times 10^{-6}$ | $58 \times 10^{-6}$ | $58 \times 10^{-6}$ | $58 \times 10^{-6}$ | $49 \times 10^{-6}$ | $35 \times 10^{-6}$ |
| | Alkaline compound | $NH_3$ (28%) aq. | 0.2 | 0.3 | | | 0.2 | 1.0 | | |
| | | NaOH (20%) aq. | | 0.2 | 2 | | 0.2 | 1.0 | | |
| | | TEA | | | | 0.9 | | | 0.5 | |
| | | MEA | | | | | | | 0.4 | |
| | | DEEA | | | | | | | | 0.3 |
| | | LiOH (10%) aq. | | | | | | | | 0.2 |
| | Penetrating agent | Surfynol 465 | | | | 0.8 | 0.8 | | | |
| | | Surfynol 61 | | | | 0.5 | 0.5 | | | |
| | | DEGmBE | 6 | 6 | 6 | | | | 6 | 6 | 6 |
| | | TEGmBE | | | | 5 | 5 | | | |
| | | 1,2-PD | 5 | 5 | 5 | | | 5 | 5 | 5 |
| | | 1,2-HD | | | | 6 | 6 | | | |
| | Others | Gly | 10 | 10 | 10 | 10 | 10 | 10 | 10 | 10 |
| | | EDTA | | | | | 0.03 | 0.03 | | |

TABLE 4-continued

|  |  |  | Example 3-1 | Example 3-2 | Example 3-3 | Example 3-4 | Example 3-5 | Example 3-6 | Example 3-7 | Example 3-8 |
|---|---|---|---|---|---|---|---|---|---|---|
| Evaluation | Print | Bleeding | B | B | B | A | A | B | B | B |
|  |  | Print density | B | A | A | B | A | A | B | B |
|  |  | Fast-drying properties | Less than 2 sec. | Less than 2 sec. | Less than 2 sec. | Less than 1 sec. | Less than 1 sec. | Less than 2 sec. | Less than 2 sec. | Less than 2 sec. |
|  | Ink storage stability | Foreign matters | A | A | B | A | A | B | A | A |
|  |  | Physical properties | A | A | B | A | A | B | A | A |

(*): Introduced amount of sulfonic acid group and/or sulfinic acid group chemically bonded to the surface of particulate pigment (equivalent/g of particulate pigment)
$NH_3$: ammonia; NaOH: sodium hydroxide; TEA: triethanolamine; MEA: monoethanolamine; DEEA: N,N-diethylethanolamine; LiOH: lithium hydroxide; DEGmBe: diethylene glycol monobutyl ether; TEGmBE: triethylene glycol monobutyl ether; 1,2-PD: 1,2-pentanediol; 1,2-HD: 1,2-hexanediol; Gly: glycerin As can be seen in Table 4 above, when sodium hydroxide was used as an alkaline compound, i.e., the counter cation of sulfonic acid group and/or sulfinic acid group is sodium ion, an image having a high print density was obtained.

When ammonia was used, i.e., the foregoing counter cation was ammonium ion, a high ink storage stability was attained.

Further, when both ammonia and sodium hydroxide were used, i.e., both ammonium ion and sodium ion were present as the foregoing counter cations, as in Examples 3-2 and 3-5, both high image print density and high ink storage stability were attained. When the total amount of alkaline metal ions was 2,000 ppm or more based on vehicle as in Examples 3-3 and 3-6, the ink storage stability was somewhat deteriorated.

The inks of Examples 3-4 and 3-5 exhibited extremely excellent image print bleeding resistance and fast drying properties. This effect is presumably attributed to individual or synergistic effect of Surfynol 465, Surfynol 61, triethylene glycol mono-n-butyl ether, 1,2-hexanediol, etc.

EXAMPLES AND COMPARATIVE EXAMPLES OF FOURTH INK OF THE INVENTION

Examples 4 (Examples 4-1 to 4-6) below are examples of the fourth ink of the invention, and Comparative Examples 4 (Comparative Examples 4-1 to 4-2) below are examples for comparison with the fourth ink of the invention. The "physical properties (viscosity, surface tension) of ink" defined in the following Examples 4 and Comparative Examples 4 were determined by the method described in the foregoing Example 1.

The inks of Examples 4 (Examples 4-1 to 4-6) and Comparative Examples 4 (Comparative Examples 4-1 to 4-2) were then subjected to the following "ink storage stability test".

"Ink Storage Stability Test"

The inks of Examples 4 and Comparative Examples 4 were each sealed in a glass sample bottle. The sample was then allowed to stand at a temperature of 35° C. for 2 weeks for storage stability test. The sample was then examined for occurrence of foreign matters (mild, microorganism, pigment agglomerate, etc.) and physical properties (viscosity, surface tension).

Example 4-1

8 parts of a carbon black ("MA-100", produced by Mitsubishi Chemical Corporation) were dispersed in an aqueous solvent. To the dispersion thus obtained were then added 6 parts of sulfamic acid. The mixture was then heated to a temperature of from 120° C. to 135° C. with stirring for 8 hours. The reaction product was then repeatedly rinsed and filtered. The material was then adjusted to a pH value of 8.5 with dimethylaminoethanol to obtain a 16% sulfonated carbon black dispersion.

(2) Preparation of Ink

In Example 4-1, as a colorant there was used the foregoing sulfonated carbon black dispersion. As a penetrating agent there was used ethylene glycol mono-n-butyl ether, which is a glycol ether. As a preservative there was used 4,4-dimethyloxazolidine, which is an oxazolidine-based compound. The specific composition will be given below.

| Pigment dispersion | 39 parts |
|---|---|
| Ethylene glycol mono-n-butyl ether | 8 parts |
| Glycerin | 10 parts |
| 4,4-Dimethyloxazolidine | 0.5 part |
| Ion-exchanged water | 42.5 parts |

These components were mixed, and then filtered to obtain the ink to be used in Example 4-1. The ink thus obtained exhibited a viscosity of 4.5 mPa.s and a surface tension of 42 mN/m (both at 20° C.).

(3) Ink Storage Stability Test

The ink of Example 4-1 was then subjected to the foregoing "ink storage stability test". As a result of ink storage stability test, the ink underwent little of no occurrence of foreign matters and change of physical properties and thus exhibited a good storage stability (Evaluation "A").

Example 4-2

(1) Preparation of Pigment Dispersion

In Example 4-2, a carbon black ("MA-100", produced by Mitsubishi Chemical Corporation) was treated in the same manner as in the foregoing Example 4-1 to obtain a 16% sulfonated carbon black pigment dispersion.

(2) Preparation of Ink

In Example 4-2, as a colorant there was used the foregoing sulfonated carbon black dispersion. As penetrating agents there were used Surfynol 82, which is an acetylene glycol-based surface active agent, and dipropylene glycol mono-n-butyl ether, which is a glycol ether. As a preservative there was used 4-chloro-3,5-dimethyl-xylenol, which is a chloroxylenol. The specific composition will be given below.

| Pigment dispersion | 39 parts |
|---|---|
| Surfynol 82 | 1 part |
| Dipropylene glycol mono-n-butyl ether | 1 part |

-continued

| | | |
|---|---|---|
| Glycerin | 10 | parts |
| 4-Chloro-3,5-dimethyl-xylenol | 0.5 | part |
| Ion-exchanged water | 42.5 | parts |

These components were mixed, and then filtered to obtain the ink to be used in Example 4-2. The ink thus obtained exhibited a viscosity of 4.5 mPa.s and a surface tension of 42 mN/m (both at 20° C.).

(3) Ink Storage Stability Test

The ink of Example 4-2 was then subjected to the foregoing "ink storage stability test".

As a result of ink storage stability test, the ink underwent little or no change of physical properties between before and after storage and no production of mild and microorganism. There occurred a pigment agglomerate which can be trapped by a commercially available foreign matter trapping filter for ink cartridge. However, this phenomenon was practically acceptable (Evaluation "B").

Example 4-3

(1) Preparation of Pigment Dispersion

To 100 parts of fuming sulfuric acid ($SO_3$ concentration: 25%) having a temperature of from 5° C. to 10° C. were added 3 parts of a phthalocyanine pigment (C.I. pigment blue 15:3) with stirring in 15 minutes. The resulting mixture was stirred at a temperature of from 70° C. to 90° C. for several hours, and then poured into ice water.

The resulting suspension was washed while being filtered, and then adjusted to a pH value of 8.2 with triethanolamine to obtain a 18% sulfonated phthalocyanine pigment dispersion.

(2) Preparation of Ink

In Example 4-3, as a colorant there was used the foregoing sulfonatedphthalocyanine pigment dispersion. As penetrating agents there were used diethylene glycol mono-t-butyl ether and triethylene glycol monoethyl ether, which are glycol ethers. As a preservative there was used 2-n-octyl-4-isothiazoline-3-one, which is an alkylisothiazolone-based compound. The specific composition will be given below.

| | | |
|---|---|---|
| Pigment dispersion | 35 | parts |
| Diethylene glycol mono-t-butyl ether | 10 | parts |
| Triethylene glycol monoethyl ether | 5 | parts |
| Glycerin | 10 | parts |
| 2-n-octyl-4-isothiazoline-3-one | 0.01 | part |
| Ion-exchanged water | 39.99 | parts |

These components were mixed, and then filtered to obtain the ink to be used in Example 4-3. The ink thus obtained exhibited a viscosity of 4.1 mPa.s and a surface tension of 40 mN/m (both at 20° C.).

(3) Ink Storage Stability Test

The ink of Example 4-3 was then subjected to the foregoing "ink storage stability test". The results of ink storage stability test were the same as that of the foregoing Example 4-2 (Evaluation "B").

Example 4-4

(1) Preparation of Pigment Dispersion

In Example 4-4, a condensed azo pigment (C.I. pigment yellow 128) was treated in the same manner as in the foregoing Example 4-3 to obtain a 15% sulfonated isoindolinone pigment dispersion.

(2) Preparation of Ink

In Example 4-4, as a colorant there was used the foregoing sulfonated yellow condensed azo pigment dispersion. As penetrating agents there were used Surfynol TG, which is an acetylene glycol-based surface active agent, and triethylene glycol mono-t-butyl ether, which are a glycol ether. As preservatives there were used 2-methyl-4-isothiazoline-3-one, which is an alkylisothiazolone-based compound, 5-chloro-2-methyl-isothiazoline, which is a chloroalkylisothiazolone, and 2-bromo-2-nitropropane-1,3-diol, which is a bromonitroalcohol. The specific composition will be given below.

| | | |
|---|---|---|
| Pigment dispersion | 35 | parts |
| Surfynol TG | 0.2 | part |
| Triethylene glycol mono-t-butyl ether | 12 | parts |
| Glycerin | 10 | parts |
| 2-Methyl-4-isothiazoline-3-one | 0.02 | part |
| 5-Chloro-2-methyl-isothiazoline-3-one | 0.08 | part |
| 2-Bromo-2-nitropropane-1,3-diol | 0.32 | part |
| Ion-exchanged water | 42.3 | parts |

These components were mixed, thoroughly stirred, and then filtered to obtain the ink to be used in Example 4-4. The ink thus obtained exhibited a viscosity of 4.3 mPa.s and a surface tension of 29 mN/m (both at 20° C.).

(3) Ink Storage Stability Test

The ink of Example 4-3 was then subjected to the foregoing "ink storage stability test". The results of ink storage stability test were the same as that of the foregoing Example 4-2 (Evaluation "B").

Example 4-5

(1) Preparation of Pigment Dispersion

In Example 4-5, a quinacridone magenta pigment (C.I. pigment red 122) was treated in the same manner as in the foregoing Example 4-3 to obtain a 16% sulfonated quinacridone magenta pigment dispersion.

(2) Preparation of Ink

In Example 4-5, as a colorant there was used the foregoing sulfonated quinacridone magenta pigment dispersion. As a penetrating agent there was used Surfynol 465, which is an acetylene glycol-based surface active agent. As a preservative there was used 4,4-dimethyloxazolidine, which is an oxazolidine-based compound. The specific composition will be given below.

| | | |
|---|---|---|
| Pigment dispersion | 38 | parts |
| Surfynol 465 | 1 | part |
| Glycerin | 10 | parts |
| 4,4-Dimethyloxazolidine | 0.2 | part |
| Ion-exchanged water | 50.8 | parts |

These components were mixed, thoroughly stirred, and then filtered to obtain the ink to be used in Example 4-5. The ink thus obtained exhibited a viscosity of 3.9 mPa.s and a surface tension of 31 mN/m (both at 20° C.).

(3) Ink Storage Stability Test

The ink of Example 4-5 was then subjected to the foregoing "ink storage stability test". The results of ink storage stability test were the same as that of the foregoing Example 4-1 (Evaluation "A").

Example 4-6

(1) Preparation of Pigment Dispersion

In Example 4-6, a quinacridone magenta pigment (C.I. pigment red 122) was treated in the same manner as in the foregoing Example 4-3 to obtain a 16% sulfonated quinacridone magenta pigment dispersion.

(2) Preparation of Ink

In Example 4-6, as a colorant there was used the foregoing sulfonated quinacridone magenta pigment dispersion. As penetrating agents there were used Surfynol 61, which is an acetylene alcohol-based surface active agent, and 1,2-pentanediol, which is a 1,2-alkylene glycol. As a preservative there was used 1,2-benzisothiazoline-3-one, which is a benzisothiazolone. The specific composition will be given below.

| | |
|---|---|
| Pigment dispersion | 38 parts |
| Surfynol 61 | 0.5 part |
| 1,2-Pentanediol | 5 parts |
| Glycerin | 10 parts |
| 1,2-Benzisothiazoline-3-one | 0.2 part |
| Ion-exchanged water | 46.3 parts |

These components were mixed, thoroughly stirred, and then filtered to obtain the ink to be used in Example 4-6. The ink thus obtained exhibited a viscosity of 3.9 mPa.s and a surface tension of 31 mN/m (both at 20° C.).

(3) Ink Storage Stability Test

The ink of Example 4-6 was then subjected to the foregoing "ink storage stability test". The results of ink storage stability test were the same as that of the foregoing Example 4-2 (Evaluation "B").

Comparative Example 4-1

The preparation procedure of Example 4-1 was followed except that 4,4-dimethyloxazolidine was removed from the composition of the ink of Example 4-5 and the added amount of glycerin was 15%. The specific composition will be given below.

| | |
|---|---|
| Pigment dispersion | 38 parts |
| Surfynol 465 | 1 part |
| Glycerin | 15 parts |
| Ion-exchanged water | 41 parts |

These components were mixed, thoroughly stirred, and then filtered to obtain the ink to be used in Example 4-1. The ink thus obtained exhibited a viscosity of 4.8 mPa.s and a surface tension of 46 mN/m (both at 20° C.).

(Ink Storage Stability Test)

The ink of Example 4-1 was then subjected to the foregoing "ink storage stability test". As a result of ink storage stability test, there was observed the production of mild and microorganism as foreign matters after storage. Referring to physical properties, there was observed no change of surface tension. However, there was observed a viscosity rise of about 0.3 mPa.s (Evaluation "C").

Comparative Example 4-2

Using the pigment prepared on a trial basis in the foregoing Example 4-2, an ink of Comparative Example 4-2 was prepared by the following formulations (ink composition).
(Ink Composition)

| | |
|---|---|
| Pigment | 42 parts |
| Ethylene glycol mono-n-butyl ether | 10 parts |
| Glycerin | 10 parts |
| 1,2-Benzisothiazoline-3-one | 0.8 part |
| Ion-exchanged water | 37.2 parts |

These components were mixed, thoroughly stirred, and then filtered to obtain the ink to be used in Example 4-2. The ink thus obtained exhibited a viscosity of 4.8 mPa.s and a surface tension of 42 mN/m (both at 20° C.).

(Ink Storage Stability Test)

The ink of Example 4-2 was then subjected to the foregoing "ink storage stability test". As a result of ink storage stability test, there occurred little or no change of physical properties between before and after storage and no production of mild and microorganism. However, a foreign matter which seemed to be a pigment agglomeration was produced. Referring to physical properties, there was observed no change of surface tension. However, there was observed a viscosity rise of about 1.1 mPa.s (Evaluation "C").

Table 5 shows the results of "storage stability test" on the inks obtained in Examples 4-1 to 4-6 and Comparative Examples 4-1 to 4-2.

TABLE 5

| Example No. No. | Kind of preservative | Physical properties of ink | | Ink storage stability test |
|---|---|---|---|---|
| | | Viscosity | Surface tension | |
| Example 4-1 | 4,4-Dimethyloxazolidine | 4.5 mPa · s | 42 mN/m | A |
| Example 4-2 | 4-Chloro-3,5-dimethyl-xylenol | 4.5 mPa · s | 42 mN/m | B |
| Example 4-3 | 2-n-Octyl-4-isothiazoline-3-one | 4.1 mPa · s | 40 mN/m | B |
| Example 4-4 | 2-Methyl-4-isothiazoline-3-one 5-Chloro-2-methyl-isothiazoline-3-one 2-Bromo-2-nitropropane-1,3-diol | 4.3 mPa · s | 29 mN/m | B |
| Example 4-5 | 4,4-Dimethyloxazolidine | 3.9 mPa · s | 31 mN/m | A |
| Example 4-6 | 1,2-Benzisothiazoline-3-one | 3.9 mPa · s | 31 mN/m | B |
| Comparative Example 4-1 | None | 4.8 mPa · s | 46 mN/m | C |
| Comparative Example 4-2 | 1,2-Benzisothiazoline-3-one | 4.8 mPa · s | 42 mN/m | C |

(Printing Test)

The inks of Examples 4-1 to 4-6 were then subjected to printing test. In some detail, as an ink jet recording process printer there was used a Type SC-740C printer (produced by SEIKO EPSON CORPORATION). As an ordinary neutral paper there was used Xerox P (produced by Fuji Xerox Co., Ltd.). As an ordinary acidic paper there was used EPP (produced by SEIKO EPSON CORPORATION). As a regenerated paper there was used Xerox R (produced by Fuji Xerox Co., Ltd.). Printing was then made on these papers. All the printed images thus obtained had little or no irregular bleeding and thus are very good images having a high print density. The dryability during solid printing was good.

As can be seen in the foregoing results of "ink storage stability" and "printing test", the fourth ink of the invention was confirmed to have the following characteristics:

(1) To lessen printed image bleeding;
(2) The printed matter has good fast-drying properties;
(3) To be confirmed to satisfy a high print density; and
(4) The incorporation of the preservative according to the invention makes it possible to secure ink storage stability.

Examples and Comparative Examples of Fifth Ink of the Invention

Examples 5 (Examples 5-1 to 5-7) below are examples of the fifth ink of the invention, and Comparative Examples 5 (Comparative Examples 5-1 to 5-3) below are examples for comparison with the fifth ink of the invention.

The inks of Examples 5 (Examples 5-1 to 5-7) and Comparative Examples (Comparative Examples 5-1 to 5-3) were then subjected to the following "printing test". In the present examples, printing test was made on 10 or more kinds of ordinary paper commercially available in Europe, United Sates of America, and Japan to make further evaluation of print quality with respect to ordinary paper.
"Printing Test"

As an ink jet recording process printer there was used a Type MJ-930C printer (produced by SEIKO EPSON CORPORATION) which was then loaded with the inks obtained in Examples 5 and Comparative Examples 5. Using this printer, printing test was made on 10 or more kinds of ordinary paper commercially available in Europe, United Sates of America, and Japan (Conqueror paper, Favorit paper, Modo Copy paper, Rapid Copy paper, EPSON EPP paper, Xerox 4024 paper, Xerox 10 paper, Neenha Bond paper, Ricopy 6200 paper, Yamayuri paper, Xerox R paper).

Example 5-1

(1) Preparation of Surface-treated Carbon Black Pigment Dispersion 15 parts of carbon black ("RAVEN C", produced by Colombian Carbon Corp.) were mixed with 250 parts of sulfolane. The mixture was then subjected to dispersion by a Type M250 Eiger motor mill (produced by Eiger Japan K.K.) at a percent bead packing of 70% and a rotary speed of 5,000 rpm for 1 hour. The mixture of a pigment paste and a solvent thus dispersed was transferred into an evaporator where it was then heated to a temperature of 120° C. at a pressure of 30 mmHg or less so that the water content in the system was distilled off as much as possible. The reaction system was then controlled to a temperature of 150° C. Subsequently, to the reaction solution was added 25 parts of sulfur trioxide. The reaction mixture was then allowed to undergo reaction for 6 hours. After the termination of reaction, the reaction product was washed with excessive sulfolane several times, poured into water, and then filtered to obtain a surface-treated particulate carbon black pigment.

Subsequently, to 15 parts of the surface-treated carbon black thus obtained were added 2 parts of triethanolamine and 83 parts of ion-exchanged water. The mixture was then stirred to obtain a 15% surface-treated carbon black dispersion.

(2) Preparation Ink for Ink Jet Recording

To 40 parts of the surface-treated carbon black pigment dispersion thus obtained were added gradually 6parts of Material A of the general formula (2), 0.8 parts of Surfynol 465, 5 parts of propylene glycolmono-n-butyl ether, 5 parts of 1,2-hexanedil, 10 parts of glycerin, 3 parts of Emulsion A, and 35 parts of ion-exchanged water with stirring to obtain an ink of Example 5-1 according to the invention.

| | |
|---|---|
| Surface-treated pigment carbon black pigment | 6.0% (in terms of solid content) |
| Material A of the general formula (2) | 2.0% |
| Surfynol 465 | 0.8% |
| Propylene glycol mono-n-butyl ether | 5.0% |
| 2-Hexanediol | 5.0% |
| Emulsion A | 3.0% (in terms of solid content) |
| Glycerin | 10.0% |
| Triethanolamine | 0.8% |
| Ion-exchanged water | Balance |

(In Material A of the general formula (2), R is a neopentyl group, $n_2$ is 3, $m_2$ is 1.5, and X is a hydrogen atom. Emulsion A was the same as used in Example 1-8. The surface-treated pigment, triethanolamine and ion-exchanged water were partly incorporated in the ink composition in the form of surface-treated pigment dispersion.)

Example 5-2

(1) Preparation of Surface-treated Carbon Black Pigment Dispersion

In Example 5-2, the same carbon black dispersion as used in the foregoing Example 5-1 was used.

(2) Preparation Ink for Ink Jet Recording

To 40 parts of the surface-treated carbon black pigment dispersion thus obtained were added gradually 6 parts of Material B of the general formula (2), 0.8 part of Surfynol 465, 5 parts of propylene glycol monoethyl ether, 5 parts of 1,2-hexanedil, 10 parts of glycerin, 5 parts of Emulsion B, and 35 parts of ion-exchanged water with stirring to obtain an ink of Example 5-2 according to the invention.

| | |
|---|---|
| Surface-treated pigment carbon black pigment | 6.0% (in terms of solid content) |
| Material B of the general formula (2) | 2.0% |
| Surfynol 465 | 0.8% |
| Propylene glycol monoethyl ether | 5.0% |
| 2-Hexanediol | 5.0% |
| Emulsion B | 5.0% (in terms of solid content) |
| Glycerin | 10.0% |
| Triethanolamine | 0.8% |
| Ion-exchanged water | Balance |

(In Material B of the general formula (2), R is a t-butyl group, $n_2$ is 3, $m_2$ is 1.3, and X is a hydrogen atom. Emulsion B was the same as used in Example 1-10. The surface-treated pigment, triethanolamine and ion-exchanged water were partly incorporated in the ink composition in the form of surface-treated pigment dispersion.)

Example 5-3

(1) Preparation of Surface-treated Carbon Black Pigment Dispersion

In Example 5-3, the same carbon black dispersion as used in the foregoing Example 5-1 was used.

(2) Preparation Ink for Ink Jet Recording

To 40 parts of the surface-treated carbon black pigment dispersion thus obtained were added gradually 6 parts of Material C of the general formula (2), 0.8 part of Surfynol TG, 5 parts of triethylene glycol monoethyl ether, 5 parts of 1,2-pentanediol, 10 parts of glycerin, 5 parts of Emulsion C, and 35 parts of ion-exchanged water with stirring to obtain an ink of Example 5-3 according to the invention.

| Surface-treated carbon black pigment | 6.0% (in terms of solid content) |
|---|---|
| Material C of the general formula (2) | 2.0% |
| Surfynol TG | 0.8% |
| Triethylene glycol monoethyl ether | 5.0% |
| 2-Pentanediol | 5.0% |
| Emulsion C | 5.0% (in terms of solid content) |
| Glycerin | 10.0% |
| Triethanolamine | 0.8% |
| Ion-exchanged water | Balance |

(In Material C of the general formula (2), R is a 1,3-dimethylbutyl group, $n_2$ is 0, $m_2$ is 1.5, and X is $SO_3Na$. Emulsion C was the same as used in Example 1-11. The surface-treated pigment, triethanolamine and ion-exchanged water were partly incorporated in the ink composition in the form of surface-treated pigment dispersion.)

Example 5-4

(1) Preparation of Surface-treated Organic Pigment Dispersion 15 parts of a phthalocyanine pigment (C.I. pigment blue 15:3) were mixed with 450 parts of quinoline. The mixture was then subjected to dispersion by a Type M250 Eiger motor mill (produced by Eiger Japan K.K.) at a percent bead packing of 70% and a rotary speed of 5,000 rpm for 2 hours. The mixture of a pigment paste and a solvent thus dispersed was transferred into an evaporator where it was then heated to a temperature of 120° C. at a pressure of 30 mmHg or less so that the water content in the system was distilled off as much as possible. The reaction system was then controlled to a temperature of 160° C. Subsequently, to the reaction solution was added 20 parts of sulfonated pyridine complex. The reaction mixture was then allowed to undergo reaction for 8 hours. After the termination of reaction, the reaction product was washed with excessive quinoline several times, poured into water, and then filtered to obtain a surface-treated particulate phthalocyanine pigment.

Subsequently, to 15 parts of the surface-treated phthalocyanine pigment thus obtained were added 2 parts of triethanolamine and 83 parts of ion-exchanged water. The mixture was then stirred to obtain a 15% surface-treated phthalocyanine pigment dispersion.

(2) Preparation Ink for Ink Jet Recording

To 40 parts of the surface-treated phthalocyanine pigment dispersion thus obtained were then added gradually 8 parts of Material D of the general formula (2), 0.5 parts of Surfynol 61, 5 parts of diethylene glycol mono-n-propylether, 5 parts of 1,2-pentanediol, 10 parts of glycerin, 1 part of Emulsion D, and ion-exchanged water with stirring to obtain the ink of Example 5-4 according to the invention.

The ink composition will be given below.

| Surface-treated phthalocyanine pigment | 6.0% (in terms of solid content) |
|---|---|
| Material D of the general formula (2) | 8.0% |
| Surfynol 465 | 0.5% |
| Diethylene glycol mono-n-propylether | 5.0% |
| 2-Pentanediol | 5.0% |
| Emulsion D | 1.0% (in terms of solid content) |
| Glycerin | 10.0% |
| Triethanolamine | 0.8% |
| Ion-exchanged water | Balance |

(In Material D of the general formula (2), R is a mixture of 50% of n-hexyl group and 50% of 2-ethylhexyl group, both $n_2$'s are 0, both $m_2$'s are 2, and both X's are $SO_3Na$. The surface-treated pigment, triethanolamine and ion-exchanged water were partly incorporated in the ink composition in the form of surface-treated pigment dispersion. The process for the synthesis of Emulsion D will be given below.)

(Preparation of Emulsion D)

Into a reaction vessel equipped with a dropping device, a thermometer, a water-cooled reflux condenser and a stirrer were charged 100 parts of ion-exchanged water. To the ion-exchanged water were then added 0.2 parts of potassium peroxide as a polymerization initiator with stirring at a temperature of 70° C. in a nitrogen atmosphere. To the ion-exchanged water in the reaction vessel was then added dropwise a monomer solution obtained by dissolving 0.05 parts of sodium laurylsulfate, 15 parts of styrene, 1 part of a urethane prepolymer comprising tolylene diisocyanate and 1,5-pentanediol, 15 parts of butyl methacrylate and 0.02 parts of t-dodecyl mercaptan in 7 parts of ion-exchanged water at a temperature of 70° C. to cause reaction by which a primary material was prepared. Subsequently, to the primary material in the reaction vessel was added 2 parts of a 10% solution of ammonium persulfate. The reaction mixture was then stirred. Into the reaction vessel was put a reaction solution comprising 30 parts of ion-exchanged water, 0.2 parts of potassium laurylsulfate, 30 parts of styrene, 1 part of acrylamide, 15 parts of butyl methacrylate, 1 part of dipentaerythritol hexamethacrylate, 0.6 parts of 5-dodecyl mercaptan with stirring at a temperature of 70° C. to cause polymerization reaction. The reaction solution was neutralized to a pH value of from 8 to 8.5 with sodium hydroxide, and then filtered through a filter having a pore diameter of 0.3 μm to prepare an aqueous solution of particulate polymer as "Emulsion D".

Example 5-5

(1) Preparation of Surface-treated Organic Pigment

In Example 5-5, a benzimidazolone pigment (C.I. pigment yellow 180) was treated in the same manner as in the foregoing Example 5-4 to obtain a 15% surface-treated benzimidazolone pigment dispersion.

(2) Preparation Ink for Ink Jet Recording

To 40 parts of the surface-treated benzimidazolone pigment dispersion thus obtained were added gradually 4 parts of Material D of the general formula (2), 0.5 parts of Surfynol 61, 5 parts of ethylene glycol mono-iso-propylether, 5 parts of 1,2-pentanediol, 10 parts of glycerin, 1 part of Emulsion A, 1 part of Emulsion B, and ion-exchanged water with stirring to obtain an ink of Example 5-5 according to the invention.

| | |
|---|---|
| Surface-treated benzimidazolone pigment | 6.0% (in terms of solid content) |
| Material D of the general formula (2) | 4.0% |
| Surfynol 61 | 0.5% |
| Ethylene glycol mono-iso-propylether | 5.0% |
| 2-Pentanediol | 5.0% |
| Emulsion A | 1.0% (in terms of solid content) |
| Emulsion B | 1.0% (in terms of solid content) |
| Glycerin | 10.0% |
| Triethanolamine | 0.8% |
| Ion-exchanged water | Balance |

(In Material D of the general formula (2), R is a mixture of 50% of n-hexyl group and 50% of 2-ethylhexyl group, both $n_2$'s are 0, both $m_2$'s are 2, and both X's are $SO_3Na$. As Emulsions A and B there were used the same ones as used in Examples 5-1 and 5-2. The surface-treated pigment, triethanolamine and ion-exchanged water were partly incorporated in the ink composition in the form of surface-treated pigment dispersion.)

Example 5-6

(1) Preparation of Surface-treated Organic Pigment

In Example 5-6, an anthraquinone pigment (C.I. pigment yellow 147) was treated in the same manner as in the foregoing Example 5-4 to obtain a 15% surface-treated anthraquinone pigment dispersion.

(2) Preparation Ink for Ink Jet Recording

To 40 parts of the surface-treated anthraquinone pigment dispersion thus obtained were added gradually 4 parts of Material E of the general formula (2), 0.5 part of Surfynol 465, 5 parts of triethylene glycol mono-n-butyl ether, 5 parts of 1,2-hexanediol, 10 parts of glycerin, 1 part of Emulsion A, and ion-exchanged water with stirring to obtain an ink of Example 5-5 according to the invention.

| | |
|---|---|
| Surface-treated anthraquinone pigment | 6.0% (in terms of solid content) |
| Material E of the general formula (2) | 2.0% |
| Surfynol 465 | 0.5% |
| Triethylene glycol mono-n-butyl ether | 5.0% |
| 2-Hexanediol | 5.0% |
| Emulsion A | 3.0% (in terms of solid content) |
| Glycerin | 10.0% |
| Triethanolamine | 0.8% |
| Ion-exchanged water | Balance |

(In Material E of the general formula (2), R is an n-hexyl group, $n_2$ is 4, $m_2$ is 2, and X is a hydrogen atom. As Emulsion A there was used the same one as used in Examples 5-1. The surface-treated pigment, triethanolamine and ion-exchanged water were partly incorporated in the ink composition in the form of surface-treated pigment dispersion.)

Example 5-7

(1) Preparation of Surface-treated Organic Pigment

In Example 5-7, a quinacridone pigment (C.I. pigment red 122) was treated in the same manner as in the foregoing Example 5-4 to obtain a 15% surface-treated quinacridone pigment dispersion.

(2) Preparation Ink for Ink Jet Recording

The formulations of Example 5-6 were followed except that the surface-treated quinacridone pigment dispersion was used instead of the surface-treated condensed azo pigment dispersion to obtain an ink of Example 5-7 according to the invention.

The ink composition will be given below.

| | |
|---|---|
| Surface-treated quinacridone pigment | 6.0% (in terms of solid content) |
| Material E of the general formula (2) | 2.0% |
| Surfynol 465 | 0.5% |
| Triethylene glycol mono-n-butyl ether | 5.0% |
| 2-Hexanediol | 5.0% |
| Emulsion A | 3.0% (in terms of solid content) |
| Glycerin | 10.0% |
| Triethanolamine | 0.8% |
| Ion-exchanged water | Balance |

(In Material E of the general formula (2), R is an n-hexyl group, $n_2$ is 4, $m_2$ is 2, and X is a hydrogen atom. As Emulsion A there was used the same one as used in Examples 5-1. The surface-treated pigment, triethanolamine and ion-exchanged water were partly incorporated in the ink composition in the form of surface-treated pigment dispersion.)

Comparative Example 5-1

(1) Preparation of Resin-dispersed Carbon Black Pigment 8 parts of a styrene-acrylic acid copolymer resin (weight-average molecular weight: 7,000; acid value: 150), 3 parts of triethanolamine, and 0.5 parts of isopropyl alcohol were completely dissolved in 73.5 parts of ion-exchanged water at a temperature of 70° C. Subsequently, to the solution were added 15 parts of carbon black ("RAVEN C", produced by Colombian Carbon Corp.). The mixture was premixed, and then subjected to dispersion by an Eiger mill (produced by Eiger Japan Co., Ltd.) (percent packing of bead: 70%; diameter of media: 0.7 mm) to obtain a 15% resin-dispersed carbon black pigment dispersion.

(2) Preparation Ink for Ink Jet Recording

To 40 parts of the resin-dispersed carbon black pigment dispersion thus obtained were then added gradually 1 part of a nonionic surface active agent, 10 parts of glycerin, and ion-exchanged water with stirring to obtain an ink of Comparative Example 5-1 according to the invention.

The ink composition will be given below.

| | |
|---|---|
| Resin-dispersed carbon black pigment dispersion | 6.0% (in terms of solid content) |
| Glycerin | 10.0% |
| Triethanolamine | 1.2% |
| Isopropyl alcohol | 0.2% |

-continued

| | |
|---|---|
| Dispersant | 3.2% |
| Ion-exchanged water | Balance |

(The carbon black pigment, triethanolamine, isopropyl alcohol, dispersant, and ion-exchanged water were partly incorporated in the ink composition in the form of pigment dispersion.)

Comparative Example 5-2

(1) Preparation of Resin-dispersed Organic Pigment

In Comparative Example 5-2, aphthalocyanine pigment (C.I. pigment blue 15:3) was treated in the same manner as in the foregoing Comparative Example 5-1 to obtain a 15% resin-dispersed phthalocyanine pigment dispersion.

(2) Preparation Ink for Ink Jet Recording

To 40 parts of the resin-dispersed phthalocyanine pigment dispersion thus obtained were then added gradually 1 part of a nonionic surface active agent, 10 parts of glycerin, and ion-exchanged water with stirring to obtain an ink of Comparative Example 5-1 according to the invention.

The ink composition will be given below.

| | |
|---|---|
| Resin-dispersed carbon black pigment dispersion | 6.0% (in terms of solid content) |
| Glycerin | 10.0% |
| Triethanolamine | 1.2% |
| Isopropyl alcohol | 0.2% |
| Dispersant | 3.2% |
| Ion-exchanged water | Balance |

(The phthalocyanine pigment, triethanolamine, isopropyl alcohol, dispersant, and ion-exchanged water were partly incorporated in the ink composition in the form of pigment dispersion.)

Comparative Example 5-3

(1) Preparation of Resin-dispersed Organic Pigment

In Comparative Example 5-3, a water-soluble dye (Food Black 2) was used instead of the pigment.

(2) Preparation Ink for Ink Jet Recording

The foregoing water-soluble dye was made an ink according to the following formulations to obtain an ink of Comparative Example 5-3.

The ink composition will be given below.

| | |
|---|---|
| Water-soluble dye (Food Black 2) | 6.0% (in terms of solid content) |
| Glycerin | 10.0% |
| Triethanolamine | 1.2% |
| Isopropyl alcohol | 0.2% |
| Ion-exchanged water | Balance |

(Printing Test)

The inks of the foregoing Examples 5 (Examples 5-1 to 5-7) and Comparative Examples 5 (Comparative Examples 5-1 to 5-3) were then subjected to printing test. The results of printing test are set forth in Table 6. Table 6 shows the results of evaluation of bleeding developed when letters are printed as results of evaluation of printing. In Table 6, A indicates "extremely good", B indicates "good", C indicates "poor", and D indicates "extremely poor".

TABLE 6

| | Example 5 | | | | | | | Comparative Example 5 | | |
|---|---|---|---|---|---|---|---|---|---|---|
| | -1 | -2 | -3 | -4 | -5 | -6 | -7 | -1 | -2 | -3 |
| Conqueror | A | A | A | A | A | A | A | C | C | C |
| Favorit | A | A | A | A | A | A | A | D | D | D |
| Modo Copy | A | A | A | A | A | A | A | C | D | D |
| Rapid Copy | A | A | A | A | A | A | A | C | D | D |
| EPSON EPP | A | A | A | A | A | A | A | C | C | D |
| Xerox P | A | A | A | A | A | A | A | C | D | D |
| Xerox 4024 | A | A | A | A | A | A | A | C | D | D |
| Xerox 10 | A | A | A | A | A | A | A | B | D | D |
| Neenha Bond | A | A | A | A | A | A | A | C | D | D |
| Ricopy 6200 | A | A | A | A | A | A | A | B | C | D |
| Yamayuri | A | A | A | A | A | A | A | D | D | D |
| Xerox R | A | A | A | A | A | A | A | C | D | D |

As can be seen in the results of Table 6, the fifth ink provides a goodprint quality while the ink as used in Comparative Examples 5 (Comparative Examples 5-1 to 5-3) provide a poor print quality.

As mentioned above, the fifth ink can provide an ink for ink jet recording having a high quality and utility which causes lessened bleeding of printed image on a recording material such as paper.

The fifth ink of the invention should not be construed as being limited to the foregoing examples, but various changes and modifications can be made therein without departing from the spirit and scope thereof.

[Embodiments of Implication of Ink Set of the Invention]

Examples 6 (Examples 6-1 to 6-2) below are examples of the ink set of the invention, and Comparative Examples 6 (Comparative Examples 6-1 to 6-2) below are examples for comparison with the ink set of the invention.

The various surface-treated particulate pigments used in the following Examples 6-1 and 6-2 will be collectively described hereinafter.

Surface-treated Black Particulate Pigment

The same Surface-treated black particulate pigment as prepared in the foregoing Example 2-1 (1) was used. ("Surface-treated black particulate pigment" having a dispersibility providing group introduced thereinto in an amount of $50 \times 10^{-6}$ equivalent per g of particulate pigment)

Surface-treated Yellow Particulate Pigment

The same Surface-treated yellow particulate pigment as prepared in the foregoing Example 2-5 (1) was used. ("Surface-treated yellow particulate pigment" having a dispersibility providing group introduced thereinto in an amount of $49 \times 10^{-6}$ equivalent per g of particulate pigment)

Surface-treated Magenta Particulate Pigment

The same Surface-treated magenta particulate pigment as prepared in the foregoing Example 1-7 (1) was used. ("Surface-treated magenta particulate pigment" having a dispersibility providing group introduced thereinto in an amount of $35 \times 10^{-6}$ equivalent per g of particulate pigment)

Surface-treated Cyan Particulate Pigment

The same Surface-treated yellow particulate pigment as prepared in the foregoing Example 2-3 (1) was used. ("Surface-treated cyan particulate pigment" having a dispersibility providing group introduced thereinto in an amount of $58 \times 10^{-6}$ equivalent per g of particulate pigment)

Preparation of Surface-treated Particulate Orange Pigment

To 100 parts by weight of fuming sulfuric acid ($SO_3$ concentration: 25%) having a temperature of from 5° C. to 10° C. were added 10 parts by weight of C.I. pigment orange 43 (perynone pigment) with stirring in 15 minutes. The mixture thus obtained was stirred at a temperature of from 70° C. to 90° C. for several hours, and then poured into ice-water. The resulting suspension was filtered, and then washed. The product thus obtained was then dried to obtain a surface-treated particulate orange pigment. (The surface-treated particulate orange pigment thus obtained was then determined for introduced amount of dispersibility providing group according to the method described in the foregoing Example 1. The results were $23 \times 10^{-6}$ equivalent per g of particulate pigment.)

Preparation of Surface-treated Particulate Green Pigment

To 100 parts by weight of fuming sulfuric acid ($SO_3$ concentration: 25%) having a temperature of from 5° C. to 10° C. were added 10 parts by weight of C.I. pigment green 7 (phthalocyanine pigment) with stirring in 15 minutes. The mixture thus obtained was allowed to undergo reaction at a temperature of 120° C. with stirring for 6 hours, and then poured into ice-water. The resulting suspension was filtered, and then washed. The product thus obtained was then dried to obtain a surface-treated particulate green pigment. (The surface-treated particulate green pigment thus obtained was then determined for introduced amount of dispersibility providing group according to the method described in the foregoing Example 1. The results were $15 \times 10^{-6}$ equivalent per g of particulate pigment.)

Example 6-1

The following surface-treated particulate pigments were dispersed in the following liquid medium to obtain an ink set comprising four color ink compositions.

| Surface-treated particulate pigment | |
|---|---|
| Foregoing surface-treated particulate black pigment | 8% by weight |
| Foregoing surface-treated particulate yellow pigment | 6% by weight |
| Foregoing surface-treated particulate magenta pigment | 6% by weight |
| Foregoing surface-treated particulate cyan pigment | 6% by weight |
| Liquid medium | |
| Surfynol 465 (produced by Air Products Co., Ltd.) | 1.0% by weight |
| Diethylene glycol mono-n-butyl ether | 10% by weight |
| Glycerin | 15% by weight |
| 1,2-Hexanediol | 2.5% by weight |
| Triethanolamine | 1.0% by weight |
| Ion-exchanged water | Balance |

Example 6-2

The following surface-treated particulate pigments were dispersed in the following liquid medium to obtain an ink set comprising six color ink compositions.

| Surface-treated particulate pigment | |
|---|---|
| Foregoing surface-treated particulate black pigment | 8% by weight |
| Foregoing surface-treated particulate yellow pigment | 8% by weight |
| Foregoing surface-treated particulate magenta pigment | 8% by weight |
| Foregoing surface-treated particulate cyan pigment | 8% by weight |
| Foregoing surface-treated particulate orange pigment | 6% by weight |
| Foregoing surface-treated particulate green pigment | 6% by weight |
| Liquid medium | |
| Surfynol 465 (produced by Air Products Co., Ltd.) | 1.0% by weight |
| Triethylene glycol mono-n-butyl ether | 7.5% by weight |
| Glycerin | 15% by weight |
| 1,2-Pentanediol | 2.5% by weight |
| Triethanolamine | 0.9% by weight |
| Ion-exchanged water | Balance |

Comparative Example 6-1

An ink set was prepared in the same manner as in the foregoing Example 6-1 except that the surface-treated particulate pigment was replaced by a particulate pigment which had not been surface-treated.

Comparative Example 6-2

An ink set was prepared in the same manner as in the foregoing Example 6-2 except that the surface-treated particulate pigment was replaced by a particulate pigment which had not been surface-treated.

"Evaluation Test on Ink Set"

The inks of the foregoing Examples 6-1 and 6-2 and Comparative Examples 6-1 and 6-2 were then evaluated according to the methods described in the following Evaluations 1 to 3 and Evaluation 4.

Printing was made on the following recording papers using a Type MJ700V2C ink jet printer.

(1) Glossy film for ink jet recording (produced by SEIKO EPSON CORPORATION)

(2) Xerox P (produced by XEROX CO., LTD.)

<Evaluation 1: Developability of Red Color>

The magenta pigment ink and the yellow pigment ink of the ink set of the foregoing Examples 6-1 and 6-2 and Comparative Examples 5-1 and 5-2 were mixed at a ratio of 0.5:0.5 to realize red color. The printed matter thus obtained was then measured for saturation. The results were then evaluated according to the following criterion.

Saturation is 80 or more: A

Saturation is from 70 to less than 80: B

Saturation is from 60 to less than 70: C

Saturation is less than 60: NG

<Evaluation 2: Developability of green color>

The yellow pigment ink and the cyan pigment ink of the ink set of the foregoing Examples 6-1 and 6-2 and Comparative Examples 6-1 and 6-2 were mixed at a ratio of 0.6:0.4 to realize green color. The printed matter thus obtained was then measured for saturation. The results were then evaluated according to the following criterion.

Saturation is 80 or more: A

Saturation is from 70 to less than 80: B

Saturation is from 60 to less than 70: C

Saturation is less than 60: NG

<Evaluation 3: Developability of Orange Color>

The orange pigment ink and the magenta pigment ink of the ink set of the foregoing Examples 6-1 and 6-2 and Comparative Examples 6-1 and 6-2 were mixed at a ratio of 0.9:0.1 to realize orange color. The printed matter thus obtained was then measured for saturation. The results were then evaluated according to the following criterion.

Saturation is 80 or more: A

Saturation is from 70 to less than 80: B

Saturation is from 60 to less than 70: C

Saturation is less than 60: NG

<Evaluation 4: Ink Storage Stability>

The inks of the foregoing Examples 6-1 and 6-2 and Comparative Examples 6-1 and 6-2 were allowed to stand "at a temperature of 60 C. for 1 week and then at a temperature of −20° C. for 1 week", and then examined for viscosity change between before and after storage. The results were then evaluated according to the following criterion.

Change of Viscosity of Ink Sets: 0.5 mPa.s or less A

Change of Viscosity of Ink Sets: More than 0.5 mPa.s NG

The results of evaluation of the ink sets of Examples 6-1 and 6-2 and Comparative Examples 6-1 and 6-2 are set forth in Table 7.

TABLE 7

| Example No. | Evaluation 1 | | Evaluation 2 | | Evaluation 3 | | Evaluation 4 |
|---|---|---|---|---|---|---|---|
| | Glossy film | Xerox P paper | Glossy film | Xerox P paper | Glossy film | Xerox P paper | |
| Example 6-1 | B | B | B | B | B | B | A |
| Example 6-2 | A | A | A | A | A | A | A |
| Comparative Example 6-1 | C | NG | C | NG | C | NG | NG |
| Comparative Example 6-2 | C | C | C | C | C | C | NG |

As can be seen in Table 7 above, the ink set of Example 6-1 comprising a surface-treated particulate pigment according to the invention provides better color developability than that comprising a particulate pigment which is not surface-treated (Comparative Example 6-1). It was further made clear that the ink set of Example 6-2 according to the invention provides further improvement of color developability. The inks according to the invention exhibit a high storage stability.

[Embodiments of Implication of Ink Cartridge of the Invention]

Examples 7 (Examples 7-1 to 7-10) below are examples of the ink cartridge of the invention, and Comparative Examples 7 (Comparative Examples 7-1 to 7-2) below are examples for comparison with the ink cartridge of the invention.

<Examples of Preparation of Cartridge for Ink Jet Recording Ink>

(1) Preparation of Ink Impregnating Foam

The ink impregnating foams to be used in the following Examples 7 (Examples 7-1 to 7-10) and Comparative Examples 7 (Comparative Examples 7-1 to 7-2) were prepared according to the formulations set forth in Table 8.

TABLE 8

| Foam | F1 | F2 | F3 | F4 | F5 |
|---|---|---|---|---|---|
| Polyether polyol (Note 1) | 100 | 100 | 100 | 100 | 100 |
| Isocyanate | | | | | |
| Tolylene diisocyanate | 100 | 100 | — | 100 | — |
| Xylylene diisocyanate | — | — | 100 | — | 100 |

TABLE 8-continued

| Foam | F1 | F2 | F3 | F4 | F5 |
|---|---|---|---|---|---|
| Catalyst | | | | | |
| Stannous octylate | 0.08 | — | 0.2 | — | 0.24 |
| Dibutyltin dilaurate | — | 0.01 | — | 0.005 | — |
| N-ethyl morpholine | 0.6 | 0.5 | — | 0.5 | — |
| Foaming agent: water | 3.5 | 3 | 5 | 3 | 5 |
| Foam stabilizer (Note 2) | 1 | — | 1 | — | 1 |

(Note 1): Glycerin-based polypropylene glycol (MW: 3,000)
(Note 2): SF2961, produced by Toshiba Dow Corning Silicone Co., Ltd.

In some detail, all the components except the isocyanate component were mixed with stirring. To the mixture was then added the isocyanate component. The mixture was then stirred. The mixture was entirely put in a proper vessel which was then heated to a temperature of 140° C. for 10 minutes to cause foaming by which a urethane foam was obtained.

The urethane foam was then cut into a rectangular shape (30 mm×30 mm×20 mm). The urethane form thus cut was then sealed in a vessel. The air in the vessel was then replaced by a mixture of oxygen and hydrogen (ratio of oxygen to hydrogen=about 1:2; pressure: $9.8 \times 10^4$ Pa). The gas was then ignited to cause melting by which ink impregnating foams "F1 to F5".

(2) Preparation of Cartridge for Ink Jet Recording Ink

As shown in an exploded view of FIG. 1, the ink impregnating foams F1 to F5 (111) were each compressed and packed into a lower case made of polypropylene (101). An upper case made of polypropylene (102) was then heat-fused to the lower case to prepare a cartridge for ink jet recording ink. A filter (122) was provided inside a feed port (121) formed at the bottom of the lower case. 15 g of the ink described in Example 7 or Comparative Example 7 as described later was then injected into the case from a syringe through venting holes (103). The assembly was then allowed to stand at ordinary temperature for 1 day so that the ink was uniformly dispersed in the foam to obtain a cartridge for ink jet recording ink. The cartridges for ink jet recording ink filled with the ink impregnating foams F1 to F5 will be hereinafter referred to as "Cartridges C1 to C5", respectively.

<Method for the Measurement of Amount of Sulfuric Acid Ion, Polyvalent Metal Ion (=Metal Ion from Organic Metal Compound Catalyst+Other Polyvalent Metal Ion) and Metal Ion from Organic Metal Compound Catalyst)>

The amount of sulfuric acid ion, total amount of polyvalent metal ions (=amount of metal ion from organic metal ion compound+amount of other polyvalent metal ions) and amount of metal ion (tin ion) from organic metal compound catalyst defined in the following Example 7 and Comparative Example 7 were determined by the following methods.

(1) Separation of Liquid Component

A required amount of the ink was withdrawn from the ink cartridges prepared in Examples 7 or Comparative Examples 7 through the venting hole using a syringe, and then subjected to centrifuging by a centrifugal ultrafiltrating apparatus (C-15, produced by Millipore Inc.). As a filter there was used a Type NMWL10000 filter. The centrifuging was effected at 2,500 G for 60 minutes. The resulting filtrate was then determined for amount of sulfuric acid ion, polyvalent metal ion and metal ion (tin ion) by the following methods.

(2) Determination of Sulfuric Acid Ion 10 mg of the filtrate was subjected to combustion by oxygen flask method, and then absorbed by a 0.2% aqueous solution of nitric acid which was then subjected to ion chromatography (column: ionPacAS12A; DX-500, produced by Nippon Dionex Corp.).

(3) Determination of Total Amount of Polyvalent Metal Ions 10 mg of the filtrate was subjected to oxygen flask combustion method, and then absorbed by a 0.2% aqueous solution of nitric acid which was then determined for total amount of polyvalent metal ions by ion chromatography as in the foregoing clause (2).

(4) Determination of Amount of Metal Ion (Tin Ion) from Organic Metal Compound Catalyst 10 mg of the filtrate was subjected to oxygen flask combustion method, and then absorbed by a 0.2% aqueous solution of nitric acid which was then determined for amount of metal ion from organic metal compound (tin ion if as a catalyst there is used an organic tin compound: organic tin compound is used in the present examples (see Table 8)) by ion chromatography as in the foregoing clause (2).

Example 7-1

(1) Surface-treated Pigment: Carbon Black

The same surface-treated carbon black pigment as prepared in the foregoing Example 1-1 (1) was used. Accordingly, the introduced amount of dispersibility providing group was $50 \times 10^{-6}$ equivalent as calculated in terms of sulfonic acid group per g of pigment.

(2) Ink for Ink Jet Recording

The same ink pigment as prepared in the foregoing Example 1-1 (2) was used. Accordingly, referring to physical properties, the ink exhibited a zeta-potential of 43 mV (absolute value), a viscosity of 4.7 mPa.s, and surface tension of 32 mN/m.

(3) Preparation of Ink Jet Cartridge

The ink of the foregoing Example 7-1 (2) was injected into Cartridge C4 described in the foregoing clause "Examples of preparation of cartridge for ink jet recording ink" from a syringe through the venting hole to obtain an ink cartridge to be used in Example 7-1.

(4) Determination of Amount of $SO_4^{2-}$, Total Amount of Polyvalent Metal Ions and Amount of Tin Ion Measurement was made according to the determination method described in the foregoing clause "Method for the measurement of amount of sulfuric acid ion, polyvalent metal ion (=metal ion from organic metal compound catalyst+other polyvalent metal ion) and metal ion from organic metal compound catalyst)". The amount of $SO_4^{2-}$ was 1,480 ppm, the total amount of polyvalent metal ions was 800 ppm, and the amount of tin ion was 20 ppm.

(5) Printing Test

As an ink jet recording process printer there was used a Type MJ-5000C printer (produced by SEIKO EPSON CORPORATION) which was then loaded with the ink cartridge prepared in the foregoing Example 7-1 (3). As an ordinary neutral paper there was used Xerox P (produced by Fuji Xerox Co., Ltd.). As an ordinary acidic paper there was used EPP (produced by SEIKO EPSON CORPORATION). As a regenerated paper there was used Xerox R (produced by Fuji Xerox Co., Ltd.). Printing was then made on these papers. (The results of this test will be hereinafter referred to as "initial test results".) The printer was then switched off. After a week, printing test was made under the same conditions as mentioned above. (The results of this test will be hereinafter referred to as "results of test after one week".)

The results of printing test (initial test results) show that all the printed images thus obtained had little or no irregular bleeding and thus are good image having a high print density. The drying time required until the ink when solid-printed penetrates into the paper to disappear was less than 2 seconds regardless of the kind of the paper used. Thus, the ink exhibited a good dryability. Throughout the printing test, the ink showed no dot drop and bent frying, demonstrating that printing is effected very securely. (→Evaluation "A")

The printer was then switched off. After one week, the printing test was made under the same conditions as mentioned above. As a result, printing began simultaneously with the input of print signal to the printer. There was confirmed no defectives such as clogging of the ink ejection nozzle. (→Evaluation "A")

(6) Ink Storage Stability Test

The ink cartridge prepared in the foregoing Example 7-1 (3) was then allowed to stand at 60° C. for 1 week or at −20° C. for 1 week. The sample was examined for occurrence of foreign matters in the ink and change of physical properties (viscosity, surface tension between before and after storage. The evaluation of occurrence of foreign matters was accomplished by filtering the ink through a twill-woven metallic filter having a pore size of 25 $\mu$m, and then observing the amount of foreign matters left on the filter under a microscope.

The results of ink storage stability test show that there were confirmed little or no occurrence of foreign matters and change of physical properties (viscosity, surface tension) under any conditions, demonstrating that the ink has a good storage stability. (→Evaluation "A")

Example 7-2

(1) Surface-treated Pigment: Carbon Black

The same surface-treated carbon black pigment as prepared in the foregoing Example 1-2 (1) was used. Accordingly, the introduced amount of dispersibility providing group was $41 \times 10^{-6}$ equivalent as calculated in terms of sulfonic acid group per g of pigment.

(2) Ink for Ink Jet Recording

The same ink pigment as prepared in the foregoing Example 1-2 (2) was used. Accordingly, referring to physical properties, the ink exhibited a zeta-potential of 39 mV (absolute value), a viscosity of 4.2 mPa.s, and surface tension of 33 mN/m.

(3) Preparation of Ink Cartridge

The ink of the foregoing Example 7-2 (2) was injected into Cartridge C4 described in the foregoing clause "Examples of preparation of cartridge for ink jet recording ink" from a syringe through the venting hole to obtain an ink cartridge to be used in Example 7-2.

(4) Determination of Amount of $SO_4^{2-}$, Total Amount of Polyvalent Metal Ions and Amount of Tin Ion Measurement was made according to the determination method described in the foregoing clause "Method for the measurement of amount of sulfuric acid ion, polyvalent metal ion (=metal ion from organic metal compound catalyst+other polyvalent metal ion) and metal ion from organic metal compound catalyst)". The amount of $SO_4^{2-}$ was 1,920 ppm, the total amount of polyvalent metal ions was 880 ppm, and the amount of tin ion was 10 ppm.

(5) Printing Test

The ink cartridge of Example 7-2 was subjected to printing test in the same manner as in the foregoing Example 7-1 (5). The initial test results were the same as that of the foregoing Example 7-1 (Evaluation "A"). The printer was switched off, and then allowed to stand. After one week, the printing test was effected under the same conditions as mentioned above. When a print signal was inputted to the printer to start printing, clogging occurred in some nozzles. Therefore, printing was suspended for cleaning. In Example 7-2, printing was returned to normal state after two operations of cleaning. Thus, this ink cartridge has no practical problem. (Results of test after one week→Evaluation "B")

(6) Ink Storage Stability Test

The ink cartridge of Example 7-2 was subjected to storage stability test in the same manner as in the foregoing Example 7-1 (6). As a result, there were observed little or no change of viscosity between before and after storage under any conditions, but some foreign matters were observed left on the filter (Evaluation "B").

Example 7-3

(1) Surface-treated Pigment

In Example 7-3, the same surface-treated carbon black pigment as used in the foregoing Example 7-1 (1) was used. Accordingly, the amount of the sulfonic acid group introduced in the surface-treated carbon black pigment was $50 \times 10^{-6}$ equivalent per g of pigment.

(2) Preparation Ink for Ink Jet Recording

In Example 7-3, the same surface-treated carbon black pigment as obtained in the foregoing Example 7-1 (1) was used. As penetrating agents there were used Surfynol 465 (produced by Air Products Inc.), which is an acetylene glycol-based surface active agent, and propylene glycol mono-t-butyl ether, which is a glycol ether. The specific composition will be given below.

| | |
|---|---|
| Surface-treated carbon black pigment of Example 7-1 (1) | 6.0% (in terms of solid content) |
| Surfynol 465 | 1.0% |
| Propylene glycol mono-t-butyl ether | 5.0% |
| Glycerin | 15.0% |
| 1,5-Pentanediol | 2.5% |
| 2-Pyrrolidone | 5.0% |
| Monoethanolamine | 0.8% |
| Ion-exchanged water | Balance |

The preparation procedure was as follows.

To the surface-treated carbon black pigment obtained in the foregoing Example 7-1 (1) were then added ion-exchanged water and monoethanolamine so that the dispersibility providing group was subjected to ionic dissociation. Thereafter, to the surface-treated carbon black pigment solution prepared previously was added gradually a mixture of Surfynol 465, propylene glycol mono-t-butyl ether, glycerin, 2-pyrrolidone and 1,5-pentanediol which had been prepared in a separate vessel with stirring to obtain the ink of Example 7-3 according to the invention.

The ink thus obtained exhibited a zeta-potential of 42 mV (absolute value), a viscosity of 4.1 mPa.s, and a surface tension of 33 mN/m.

(3) Preparation of Ink Cartridge

The ink prepared in the foregoing Example 7-3 (2) was injected into Cartridge C3 described in the foregoing clause "Examples of preparation of cartridge for ink jet recording ink" from a syringe through the venting hole to obtain an ink cartridge to be used in Example 7-3.

(4) Determination of Amount of $SO_4^{2-}$, Total Amount of Polyvalent Metal Ions and Amount of Tin Ion Measurement was made according to the determination method described in the foregoing clause "Method for the measurement of amount of sulfuric acid ion, polyvalent metal ion (=metal ion from organic metal compound catalyst+other polyvalent metal ion) and metal ion from organic metal compound catalyst)". The amount of $SO_4^{2-}$ was 1,350 ppm, the total amount of polyvalent metal ions was 820 ppm, and the amount of tin ion was 150 ppm.

(5) Printing Test

The ink cartridge was subjected to printing test in the same manner as in the foregoing Example 7-1 (5). The results of printing test were the same as that of the foregoing Example 7-2. (Initial test results: Evaluation "A"; results of test after one week: Evaluation "B")

(6) Ink Storage Stability Test

The ink cartridge was subjected to storage stability test in the same manner as in the foregoing Example 7-1 (6). The results of ink storage stability test were the same as that of the foregoing Example 7-2 (Evaluation "B").

Example 7-4

(1) Surface-treated Pigment

In Example 7-4, the same surface-treated particulate carbon black pigment as used in the foregoing Example 7-1 was used. Accordingly, the amount of the sulfonic acid group introduced in the surface-treated pigment was $50 \times 10^{-6}$ equivalent per g of pigment.

(2) Preparation Ink for Ink Jet Recording

In Example 7-4, the ink prepared in the foregoing Example 7-3 (2) was used. Accordingly, the ink thus obtained exhibited a zeta-potential of 42 mV (absolute value), a viscosity of 4.2 mPa.s, and a surface tension of 32 mN/m.

(3) Preparation of Ink Cartridge

The ink prepared in the foregoing Example 7-4 (2) was injected into Cartridge C1 described in the foregoing clause "Examples of preparation of cartridge for ink jet recording ink" from a syringe through the venting hole to obtain an ink cartridge to be used in Example 7-4.

(4) Determination of Amount of $SO_4^{2-}$, Total Amount of Polyvalent Metal Ions and Amount of Tin Ion Determination was effected in the same manner as in the foregoing Example 7-1 (4). As a result, the amount of $SO_4^{2-}$ was 1,250 ppm, the total amount of polyvalent metal ions was 720 ppm, and the amount of tin ion was 90 ppm.

(5) Printing Test

Printing test was effected in the same manner as in the foregoing Example 7-1 (5). As a result, the printed image thus obtained underwent some bleeding but had a high print density. Thus, the printed image had no practical problems. The drying time required until the ink when solid-printed penetrates into the paper to disappear was less than 2 seconds regardless of the kind of the paper used. Thus, the ink exhibited a very good dryability. Throughout the printing test, the ink showed no dot drop but underwent some disturb due to bent frying. However, the degree of disturb was acceptable. (→Evaluation "B") The results of test after one week was the same as that of the foregoing Example 7-1 (Evaluation "A").

(6) Ink Storage Stability Test

Ink storage stability test was effected in the same manner as in the foregoing Example 7-1 (6). The results of ink storage stability test were the same as that of the foregoing Example 7-2 (Evaluation "B").

Comparative Example 7-1

(1) Surface-treated Pigment: Carbon Black

The same surface-treated carbon black pigment as prepared in the foregoing Comparative Example 1-1 was used. Accordingly, the amount of the dispersibility providing group introduced in the surface-treated pigment was 8.5×10$^{-6}$ equivalent per g of pigment as calculated in terms of sulfonic acid group.

(2) Ink for Ink Jet Recording

In Comparative Example 7-1, the ink prepared in the foregoing Comparative Example 1-1 (2) was used. Accordingly, the ink thus obtained exhibited a zeta-potential of 28 mV (absolute value), a viscosity of 4.0 mPa.s, and a surface tension of 32 mN/m.

(3) Preparation of Ink Cartridge

The ink prepared in the foregoing Comparative Example 7-1 (2) was injected into Cartridge C4 described in the foregoing clause "Examples of preparation of cartridge for ink jet recording ink" from a syringe through the venting hole to obtain an ink cartridge to be used in Example 7-1.

(4) Determination of Amount of $SO_4^{2-}$, Total Amount of Polyvalent Metal Ions and Amount of Tin Ion Determination was effected in the same manner as in the foregoing Example 7-1 (4). As a result, the amount of $SO_4^{2-}$ was 2,320 ppm, the total amount of polyvalent metal ions was 660 ppm, and the amount of tin ion was 50 ppm.

(5) Printing Test

Printing test was effected in the same manner as in the foregoing Example 7-1 (5). As a result, all the printed images thus obtained were observed to have bleeding and showed a lower print density than that of Example 7-2. The drying time required until the ink when solid-printed penetrates into the paper to disappear was less than 2 seconds regardless of the kind of the paper used. Thus, the ink exhibited a very good dryability. Dot drop occurred during printing on a sheet of the recording paper. The resulting printed matter was rough. (→Evaluation "C")

The printer was switched off. After one week, the printing test was effected under the same conditions as mentioned above. As a result, when a print signal was inputted to the printer, clogging occurred in many ink ejection nozzles. Cleaning was then effected five times. However, the ink was not properly ejected from all the ink ejection nozzles. (→Evaluation "C")

(6) Ink Storage Stability Test

Ink storage stability test was effected in the same manner as in the foregoing Example 7-1 (6). The results of ink storage stability test show that foreign matters occurred and the viscosity of the ink increased under any conditions, making it impossible to obtain a good storage stability. (→Evaluation "C")

Example 7-5

(1) Surface-treated Pigment: C.I. Pigment Blue 15:3

The same surface-treated phthalocyanine pigment as prepared in the foregoing Example 1-3(1) was used. Accordingly, the amount of the dispersibility providing group introduced in the surface-treated pigment was 58×10$^{-6}$ equivalent per g of pigment as calculated in terms of sulfonic acid group.

(2) Ink for Ink Jet Recording

In Example 7-5, the ink prepared in the foregoing Example 1-3 was used. Accordingly, the ink thus obtained exhibited a zeta-potential of 56 mV (absolute value), a viscosity of 3.9 mPa.s, and a surface tension of 29 mN/m.

(3) Preparation of Ink Cartridge

The ink prepared in the foregoing Example 7-5 (2) was injected into Cartridge C1 described in the foregoing clause "Examples of preparation of cartridge for ink jet recording ink" from a syringe through the venting hole to obtain an ink cartridge to be used in Example 7-5.

(4) Determination of Amount of $SO_4^{2-}$, Total Amount of Polyvalent Metal Ions and Amount of Tin Ion Determination was effected in the same manner as in the foregoing Example 7-1 (4). As a result, the amount of $SO_4^{2-}$ was 1,420 ppm, the total amount of polyvalent metal ions was 610 ppm, and the amount of tin ion was 100 ppm.

(5) Printing Test

Printing test was effected in the same manner as in the foregoing Example 7-1 (5). Both the initial test results and the results of test after one week were the same as that of the foregoing Example 7-1. (Initial test results: Evaluation "A"; results of test after one week: Evaluation "A")

(6) Ink Storage Stability Test

Ink storage stability test was effected in the same manner as in the foregoing Example 7-1 (6). The results of ink storage stability test were the same as that of the foregoing Example 7-1 (Evaluation "A").

Example 7-6

(1) Surface-treated Pigment

In Example 7-6, the same surface-treated particulate phthalocyanine pigment as prepared in the foregoing Example 7-5 (1) was used. Accordingly, the amount of the dispersibility providing group introduced in the surface-treated pigment was 58×10$^{-6}$ equivalent per g of pigment as calculated in terms of sulfonic acid group.

(2) Ink for Ink Jet Recording

In Example 7-6, the ink prepared in the foregoing Example 1-4 was used. Accordingly, the ink thus obtained exhibited a zeta-potential of 58 mV (absolute value), a viscosity of 4.0 mPa.s, and a surface tension of 29 mN/m.

(3) Preparation of Ink Cartridge

The ink prepared in the foregoing Example 7-6 (2) was injected into Cartridge C5 described in the foregoing clause "Examples of preparation of cartridge for ink jet recording ink" from a syringe through the venting hole to obtain an ink cartridge to be used in Example 7-6.

(4) Determination of Amount of $SO_4^{2-}$, Total Amount of Polyvalent Metal Ions and Amount of Tin Ion Determination was effected in the same manner as in the foregoing Example 7-1 (4). As a result, the amount of $SO_4^{2-}$ was 1,320 ppm, the total amount of polyvalent metal ions was 820 ppm, and the amount of tin ion was 260 ppm.

(5) Printing Test

Printing test was effected in the same manner as in the foregoing Example 7-1 (5). The results of printing test were the same as that of the foregoing Example 7-2. (Initial test results: Evaluation "A"; results of test after one week: Evaluation "B")

(6) Ink Storage Stability Test

Ink storage stability test was effected in the same manner as in the foregoing Example 7-1 (6). The results of ink storage stability test were the same as that of the foregoing Example 7-2 (Evaluation "B").

Comparative Example 7-2

(1) Surface-treated Pigment: C.I. Pigment Blue 15:3

The same surface-treated phthalocyanine pigment as prepared in the foregoing Comparative Example 1-2 (1) was used. Accordingly, the amount of the dispersibility providing group introduced in the surface-treated pigment was $6 \times 10^{-6}$ equivalent per g of pigment as calculated in terms of sulfonic acid group.

(2) Ink for Ink Jet Recording

In Comparative Example 7-2, the ink prepared in the foregoing Comparative Example 1-2 (2) was used. Accordingly, the ink thus obtained exhibited a zeta-potential of 24 mV (absolute value), a viscosity of 4.1 mPa.s, and a surface tension of 31 mN/m.

(3) Preparation of Ink Cartridge

The ink prepared in the foregoing Comparative Example 7-2 (2) was injected into Cartridge C5 described in the foregoing clause "Examples of preparation of cartridge for ink jet recording ink" from a syringe through the venting hole to obtain an ink cartridge to be used in Comparative Example 6-2.

(4) Determination of Amount of $SO_4^{2-}$, Total Amount of Polyvalent Metal Ions and Amount of Tin Ion Determination was effected in the same manner as in the foregoing Example 7-1 (6). As a result, the amount of $SO_4^{2-}$ was 2,710 ppm, the total amount of polyvalent metal ions was 830 ppm, and the amount of tin ion was 280 ppm.

(5) Printing Test

Printing test was effected in the same manner as in the foregoing Example 7-1 (5). The results of printing test were the same as that of the foregoing Comparative Example 7-1. (Initial test results: Evaluation "C"; results of test after one week: Evaluation "C")

(6) Ink Storage Stability Test

Ink storage stability test was effected in the same manner as in the foregoing Example 7-1 (6). The results of ink storage stability test were the same as that of the foregoing Comparative Example 7-1 (Evaluation "C").

Example 7-7

(1) Surface-treated Pigment: C.I. Pigment Yellow 110

The same surface-treated isoindolinone pigment as prepared in the foregoing Example 1-6 was used. Accordingly, the amount of the dispersibility providing group introduced in the surface-treated pigment was $49 \times 10^{-6}$ equivalent per g of pigment as calculated in terms of sulfonic acid group.

(2) Ink for Ink Jet Recording

In Example 7-7, the ink prepared in the foregoing Example 1-6 (2) was used. Accordingly, the ink thus obtained exhibited a zeta-potential of 53 mV (absolute value), a viscosity of 4.4 mPa.s, and a surface tension of 29 mN/m.

(3) Preparation of Ink Cartridge

The ink prepared in the foregoing Example 7-7 (2) was injected into Cartridge C4 described in the foregoing clause "Examples of preparation of cartridge for ink jet recording ink" from a syringe through the venting hole to obtain an ink cartridge to be used in Example 7-7.

(4) Determination of Amount of $SO_4^{2-}$, Total Amount of Polyvalent Metal Ions and Amount of Tin Ion Determination was effected in the same manner as in the foregoing Example 7-1 (4). As a result, the amount of $SO_4^{2-}$ was 1,170 ppm, the total amount of polyvalent metal ions was 850 ppm, and the amount of tin ion was 30 ppm.

(5) Printing Test

Printing test was effected in the same manner as in the foregoing Example 7-1 (5). The results of printing test were the same as that of the foregoing Example 7-2. (Initial test results: Evaluation "A"; results of test after one week: Evaluation "B")

(6) Ink Storage Stability Test

Ink storage stability test was effected in the same manner as in the foregoing Example 7-1 (6). The results of ink storage stability test were the same as that of the foregoing Example 7-2 (Evaluation "B").

Example 7-8

(1) Surface-treated Pigment

In Example 7-8, the same surface-treated isoindolinone pigment as prepared in the foregoing Example 7-7 (1) was used. Accordingly, the amount of the dispersibility providing group introduced in the surface-treated pigment was $49 \times 10^{-6}$ equivalent per g of pigment as calculated in terms of sulfonic acid group.

(2) Preparation Ink for Ink Jet Recording

In Example 7-8, to the surface-treated isoindolinone pigment prepared in the foregoing Example 7-7 (1) were then added ion-exchanged water and ammonia so that the dispersibility providing group was subjected to ionic dissociation. Thereafter, to the surface-treated isoindolinone pigment solution prepared previously was added gradually a mixture of Surfynol 465, glycerin, polyoxyethylene (PO=8) nonyl phenyl ether, 1,5-pentanediol, propanol, and urea which had been prepared in a separate vessel with stirring to obtain the ink of Example 7-8 according to the invention. The specific ink composition will be given below.

| | |
|---|---|
| Surface-treated isoindolinone pigment of Example 7-7 (1) | 7.0% (in terms of solid content) |
| Surfynol 465 | 2.0% |
| Glycerin | 12.0% |
| Polyoxyethylene (PO = 8) nonyl phenyl ether | 0.2% |
| 1,5-Pentanediol | 5.0% |
| Propanol | 3.0% |
| Ammonia (28% aqueous solution) | 0.2% |
| Urea | 3.0% |
| Ion-exchanged water | Balance |

The ink thus obtained exhibited a zeta-potential of 53 mV (absolute value), a viscosity of 4.5 mPa.s, and a surface tension of 29 mN/m.

(3) Preparation of Ink Cartridge

The ink prepared in the foregoing Example 7-8 (2) was injected into Cartridge C4 described in the foregoing clause "Examples of preparation of cartridge for ink jet recording ink" from a syringe through the venting hole to obtain an ink cartridge to be used in Example 7-8.

(4) Determination of Amount of $SO_4^{2-}$, Total Amount of Polyvalent Metal Ions and Amount of Tin Ion Determination was effected in the same manner as in the foregoing Example 7-1 (4). As a result, the amount of $SO_4^{2-}$ was 1,130 ppm, the total amount of polyvalent metal ions was 830 ppm, and the amount of tin ion was 20 ppm.

(5) Printing Test

Printing test was effected in the same manner as in the foregoing Example 7-1 (5). The initial test results were the same as that of the foregoing Example 7-1 (Evaluation "A"). The results of test after one week were the same as that of the foregoing Example 7-2 except that cleaning was effected four times (Evaluation "B").

(6) Ink Storage Stability Test

Ink storage stability test was effected in the same manner as in the foregoing Example 7-1 (6). The results of ink storage stability test were the same as that of the foregoing Example 7-2 (Evaluation "B").

Example 7-9

(1) Preparation of Surface-treated Pigment: C.I. Pigment Red 122

20 parts of a dimethyl quinacridone pigment (C.I. pigment red 122) were mixed with 500 parts of quinoline. The mixture was then subjected to dispersion by a Type M250 Eiger motor mill (produced by Eiger Japan K. K.) at a percent bead packing of 70% and a rotary speed of 5,000 rpm for 2 hours. The mixture of a pigment paste and a solvent thus dispersed was transferred into an evaporator where it was then heated to a temperature of 120° C. at a pressure of 30 mmHg or less so that the water content in the system was distilled off as much as possible. The reaction system was then controlled to a temperature of 160° C. Subsequently, to the reaction solution was added 20 parts of sulfonated pyridine complex as a reaction agent. The reaction mixture was then allowed to undergo reaction for 4 hours. After the termination of reaction, the reaction product was washed with excessive quinoline several times, poured into water, and then filtered to obtain a surface-treated particulate dimethyl quinacridone pigment.

The amount of the dispersibility providing group introduced in the surface-treated dimethyl quinacridone pigment was $35 \times 10^{-6}$ equivalent per g of pigment as calculated in terms of sulfonic acid group.

(2) Preparation Ink for Ink Jet Recording

In Example 7-9, as a penetrating agent there was used Surfynol 465 (produced by Air Products Co., Ltd.), which is an acetylene glycol-based surface active agent. The specific ink composition will be given below.

| Surface-treated dimethyl quinacridone pigment of Example 7-9 (1) | 7.0% (in terms of solid content) |
|---|---|
| Surfynol 465 | 2.0% |
| Glycerin | 12.0% |
| Polyoxyethylene (PO = 8) nonyl phenyl ether | 0.2% |
| 1,5-Pentanediol | 5.0% |
| Propanol | 3.0% |
| Ammonia (28% aqueous solution) | 0.2% |
| Urea | 3.0% |
| Ion-exchanged water | Balance |

The preparation procedure was as follows.

To the surface-treated dimethyl quinacridone pigment prepared in the foregoing Example 7-9 (1) were then added ion-exchanged water and ammonia so that the dispersibility providing group was subjected to ionic dissociation. Thereafter, to the surface-treated dimethyl quinacridone pigment solution prepared previously was added gradually a mixture of Surfynol 465, glycerin, polyoxyethylene (PO=8) nonyl phenyl ether, 1,5-pentanediol, propanol, and urea which had been prepared in a separate vessel with stirring to obtain the ink of Example 6-9 according to the invention.

The ink thus obtained exhibited a zeta-potential of 48 mV (absolute value), a viscosity of 4.6 mPa.s, and a surface tension of 30 mN/m.

(3) Preparation of Ink Cartridge

The ink prepared in the foregoing Example 7-9 (2) was injected into Cartridge C5 described in the foregoing clause "Examples of preparation of cartridge for ink jet recording ink" from a syringe through the venting hole to obtain an ink cartridge to be used in Example 7-9.

(4) Determination of Amount of $SO_4^{2-}$, Total Amount of Polyvalent Metal Ions and Amount of Tin Ion Determination was effected in the same manner as in the foregoing Example 7-1 (4). As a result, the amount of $SO_4^{2-}$ was 730 ppm, the total amount of polyvalent metal ions was 770 ppm, and the amount of tin ion was 210 ppm.

(5) Printing Test

Printing test was effected in the same manner as in the foregoing Example 7-1 (5). The results of printing test were the same as that of the foregoing Example 7-1. (Initial test results: Evaluation "A"; results of test after one week: Evaluation "A").

(6) Ink Storage Stability Test

Ink storage stability test was effected in the same manner as in the foregoing Example 7-1 (6). The results of ink storage stability test were the same as that of the foregoing Example 7-1 (Evaluation "A").

Example 7-10

(1) Surface-treated Pigment

In Example 7-10, the same surface-treated dimethyl quinacridone pigment as prepared in the foregoing Example 7-9 (1) was used. Accordingly, the amount of the dispersibility providing group introduced in the surface-treated pigment was $35 \times 10^{-6}$ equivalent per g of pigment as calculated in terms of sulfonic acid group.

(2) Preparation Ink for Ink Jet Recording

In Example 7-10, the same surface-treated dimethyl quinacridone pigment as prepared in the foregoing Example 7-9 (1) was used. As a penetrating agent there was used Surfynol 465 (produced by Air Products Co., Ltd.), which is an acetylene glycol-based surface active agent. The specific ink composition will be given below.

| Surface-treated dimethyl quinacridone pigment of Example 7-9 (1) | 7.0% (in terms of solid content) |
|---|---|
| Surfynol 465 | 2.0% |
| Glycerin | 12.0% |
| Polyoxyethylene (PO = 8) nonyl phenyl ether | 0.2% |
| 1,5-Pentanediol | 5.0% |
| Propanol | 3.0% |
| Ammonia (28% aqueous solution) | 0.2% |
| Urea | 3.0% |
| Ion-exchanged water | Balance |

The preparation procedure was as follows.

To the surface-treated dimethyl quinacridone pigment prepared in the foregoing Example 7-9 (1) were then added ion-exchanged water and ammonia so that the dispersibility providing group was subjected to ionic dissociation. Thereafter, to the surface-treated dimethyl quinacridone pigment solution prepared previously was added gradually a mixture of Surfynol 465, glycerin, polyoxyethylene (PO=8) nonyl phenyl ether, 1,5-pentanediol, propanol, and urea which had been prepared in a separate vessel with stirring to obtain the ink of Example 7-10 according to the invention.

The ink thus obtained exhibited a zeta-potential of 38 mV (absolute value), a viscosity of 4.6 mPa.s, and a surface tension of 29 mN/m.

(3) Preparation of Ink Cartridge

The ink prepared in the foregoing Example 7-10 (2) was injected into Cartridge C2 described in the foregoing clause "Examples of preparation of cartridge for ink jet recording ink" from a syringe through the venting hole to obtain an ink cartridge to be used in Example 7-10.

(4) Determination of Amount of $SO_4^{2-}$, Total Amount of Polyvalent Metal Ions and Amount of Tin Ion Determination was effected in the same manner as in the foregoing Example 7-1 (4). As a result, the amount of $SO_4^{2-}$ was 750 ppm, the total amount of polyvalent metal ions was 610 ppm, and the amount of tin ion was 60 ppm.

(5) Printing Test

Printing test was effected in the same manner as in the foregoing Example 7-1 (5). The results of printing test were the same as that of the foregoing Example 7-4. (Initial test results: Evaluation "B"; results of test after one week: Evaluation "A").

(6) Ink Storage Stability Test

Ink storage stability test was effected in the same manner as in the foregoing Example 7-1 (6). As a result, under any conditions, there were observed some viscosity change and foreign matters left on the filter. (→Evaluation "B")

Table 9 shows the data, including the results of test, of Examples 7-1 to 7-10 and Comparative Examples 7-1 to 7-2.

wherein R represents a $C_{4-10}$ alkanol group which is an n-group and/or other isomers; EO represents an ethylene oxy group; PO represents a propylene oxy group, with the proviso that EO and PO are present in the molecule and their order of arrangement are arbitrary; X represents a hydrogen atom or —$SO_3M$ (in which M represents a hydrogen ion, alkaline metal, inorganic base or organic amine); and $n_1$ and $m_1$ each represent the number of repetition of EO and PO, respectively, which are each a value averaged over the entire system, i.e., from 0 to 10 and from 1 to 5, respectively.

6. The ink for ink jet recording according to claim 1, further comprising a particulate polymer incorporated therein.

7. The ink for ink jet recording according to claim 6, wherein the amount of said particulate polymer to be incorporated is from 0.5 to 15% by weight.

TABLE 9

| | | Introduced amount of dispersibility providing group (equivalent) | Physical properties of ink | | | Content in liquid component of ink | | | Printing test | | Storage stability test |
|---|---|---|---|---|---|---|---|---|---|---|---|
| Example No. | Kind of Cartridge | | Zeta-potential (mV) | Viscosity (mPa.s) | Surface tension (mN/m) | $SO_4^{2-}$ (ppm) | Total amount of polyvalent metals (ppm) | Amount of tin ion (ppm) | Initial test | Test after 1 week | |
| Example 7-1 | C4 | $50 \times 10^{-6}$ | 43 | 4.7 | 32 | 1480 | 800 | 20 | A | A | A |
| Example 7-2 | C4 | $41 \times 10^{-6}$ | 39 | 4.2 | 33 | 1920 | 880 | 10 | A | B | B |
| Example 7-3 | C3 | $50 \times 10^{-6}$ | 42 | 4.1 | 33 | 1350 | 820 | 150 | A | B | B |
| Example 7-4 | C1 | $50 \times 10^{-6}$ | 42 | 4.2 | 32 | 1250 | 720 | 90 | B | A | B |
| Comparative Example 7-1 | C4 | $8.5 \times 10^{-6}$ | 28 | 4.0 | 32 | 2320 | 660 | 50 | C | C | C |
| Example 7-5 | C1 | $58 \times 10^{-6}$ | 56 | 3.9 | 29 | 1420 | 610 | 100 | A | A | A |
| Example 7-6 | C5 | $58 \times 10^{-6}$ | 58 | 4.0 | 29 | 1320 | 820 | 260 | A | B | B |
| Comparative Example 7-2 | C5 | $6 \times 10^{-6}$ | 24 | 4.1 | 31 | 2710 | 830 | 280 | C | C | C |
| Example 7-7 | C4 | $49 \times 10^{-6}$ | 53 | 4.4 | 29 | 1170 | 850 | 30 | A | B | B |
| Example 7-8 | C4 | $49 \times 10^{-6}$ | 53 | 4.5 | 29 | 1130 | 830 | 20 | A | B' | B |
| Example 7-9 | C5 | $35 \times 10^{-6}$ | 48 | 4.6 | 30 | 730 | 770 | 210 | A | A | A |
| Example 7-10 | C2 | $35 \times 10^{-6}$ | 38 | 5.6 | 29 | 750 | 610 | 60 | B | A | B' |

What is claimed is:

1. An ink for ink jet recording comprising at least a particulate pigment having a sulfur-containing dispersibility providing group chemically bonded to the surface thereof with a treatment containing sulfur, a penetrating agent, and a liquid component comprising water, said liquid component comprising polyvalent metal ions that, upon deposition of the ink onto a recording medium, interact with the sulfur-containing dispersibility providing group to enhance a print quality of an image formed on the recording medium as compared with an image formed by deposition of the ink without the sulfur-containing dispersibility providing group, said liquid component having a sulfur content that is 2,000 ppm or less as calculated in terms of $SO_4^{2-}$.

2. The ink for ink jet recording according to claim 1, wherein the amount of polyvalent metal ions contained in said liquid component is 800 ppm or less.

3. The ink for ink jet recording according to claim 1 wherein said pigment is a carbon black pigment and/or organic pigment.

4. The ink for ink jet recording according to claim 1, wherein said penetrating agent is an acetylene glycol-based surface active agent, acetylene alcohol-based surface active agent, 1,2-alkylene glycol and/or glycol ether.

5. The ink for ink jet recording according to claim 1, wherein there is further incorporated a material having a structure represented by the following general formula (1):

$$R—EOn_1—POm_1—X \quad (1)$$

8. An ink for ink jet recording comprising at least a particulate pigment having a sulfur-containing dispersibility providing group chemically bonded to the surface thereof with a treatment containing sulfur, a penetrating agent, and water, characterized in that the amount of said sulfur-containing dispersibility providing group is $10 \times 10^{-6}$ equivalent or more per g of particulate pigment.

9. The ink for ink jet recording according to claim 8, wherein said sulfur-containing dispersibility providing group is a sulfonic acid group (—$SO_2OH$) and/or sulfinic acid group (—$RSO_2H$ in which R is a $C_{1-12}$ alkyl or phenyl group or modification product thereof).

10. The ink for ink jet recording according to claim 9, wherein the absolute value of zeta-potential of particulate pigment at 20° C. and pH value of from 8 to 9 in a diluted ink solution obtained by diluting the ink with ion-exchanged water such that the concentration of the foregoing particulate pigment is from 0.001 to 0.01% by weight is 30 mV or more.

11. An ink for ink jet recording comprising at least a particulate pigment having a sulfur-containing dispersibility providing group chemically bonded to the surface thereof with a treatment containing sulfur, a penetrating agent, and water, characterized in that the amount of the sulfur-containing dispersibility providing group is $10 \times 10^{-6}$ equivalent or more per g of particulate pigment, the sulfur-containing dispersibility providing group is a sulfonic acid group (—$SO_2OH$) and/or sulfinic acid group (—$RSO_2H$ in which R is a $C_{1-12}$ alkyl or phenyl group or modification product thereof), and the absolute value of zeta-potential of particulate pigment at 20° C. and pH value of from 8 to 9 in a diluted ink solution obtained by diluting the ink with ion-exchanged water such that the concentration of the foregoing particulate pigment is from 0.001 to 0.01% by weight is 30 mV or more.

12. An ink for ink jet recording comprising at least a particlate pigment, a penetrating agent and water wherein said particulate pigment has, chemically bonded to a surface thereof, a sulfonic acid anion group —$SO_3^-$ and/or a sulfinic acid anion group —$RSO_2$, wherein R is a $C_{1-12}$ alkyl or phenyl group or modification product thereof, the sulfonic acid anion group and/or the sulfinic acid anion group being bonded to the particulate pigment in an amount of $10 \times 10^{-6}$ equivalent or more per g of particlate pigment, said ink having a counter ion selected from the group consisting of alkaline metal ions and monovalent ions represented by the chemical formula $(R_1R_2R_3R_4N)^+$, wherein $R_1$, $R_2$, $R_3$, and $R_4$ may be the same or different and each represents a hydrogen atom, alkyl group, hydroxylalkyl group or halogenated alkyl group.

13. The ink for ink jet recording according to claim 12, wherein said counter cation of the sulfonic acid anion group and/or counter cation of the sulfinic acid anion group comprises at least one of lithium ion ($Li^+$), sodium ion ($Na^+$), potassium ion ($K^+$), ammonium ion ($NH_4^+$) and alkanolamine cation.

14. The ink for ink jet recording according to claim 12 wherein said counter cation of the sulfonic acid anion group and/or counter cation of the sulfinic acid anion group comprises at least $Na^+$ and $NH_4^+$.

15. The ink for ink jet recording according to claim 12, wherein the total amount of alkaline metal ion in the liquid component (vehicle) of the ink is 10,000 ppm or less.

16. An ink for ink jet recording comprising at least a surface-treated pigment independently dispersible in an aqueous solvent having a sulfur-containing dispersibility providing group chemically bonded to the surface thereof with a treatment containing sulfur, a penetrating agent, and water, characterized in that there are incorporated one or more selected from the group consisting of oxazolidine-based compound, alkylisothiazolone, chloroalkylisothiazolone, benzisothiazolone, bromonitroalcohol and chloroxylenol.

17. The ink for ink jet recording according to claim 16, wherein said oxazolidine-based compound is 4,4-dimethyloxazolidine, said alkylisothiazolone is octylisothiazolone and/or methylisothiazolone, and said chloroalkylisothiazolone is choromethylisothiazolone.

18. The ink for ink jet recording according to claim 16 wherein the added amount of one or more selected from the group consisting of said oxazolidine-based compound, alkylisothiazolone, chloroalkylisothiazolone, benzisothiazolone, bromonitroalcohol and chloroxylenol is from 0.01 to 0.5% by weight.

19. An ink for ink jet recording comprising at least a particulate pigment having a sulfur-containing dispersibility providing group chemically bonded to the surface thereof with a sulfur-containing treatment, a penetrating agent, and water, wherein said penetrating agent is a material having a structure represented by the following general formula (2), an acetylene glycol-based surface active agent or an acetylene alcohol-based surface active agent, 1,2-alkylene glycol and glycol ether

(2)

wherein R represents a $C_{4-10}$ alkanol group which is an n-group and/or other isomers; EO represents an ethylene oxy group; PO represents a propylene oxy group, with the proviso that EO and PO are present in the molecule and their order of arrangement is arbitrary; X represents a hydrogen atom or —$SO_3M$, wherein M represents a hydrogen ion, alkaline metal, inorganic base or organic amine; and $n_2$ and $m_2$ each represents the number of repetition of EO and PO, respectively, which is each a value averaged over the entire system.

20. The ink for ink jet recording according to claim 19, wherein R in the general formula (2) is a butyl group, pentyl group, hexyl group, heptyl group, octyl group, nonyl group and/or decyl group.

21. The ink for ink jet recording according to claim 20, wherein said butyl group is mainly composed of n-butyl group, isobutyl group and/or t-butyl group, said pentyl group is mainly composed of n-pentyl group and/or other isomers, said hexyl group is mainly composed of n-hexyl group and/or other isomers, said heptyl group is mainly composed of n-heptyl group and/or other isomers, said octyl group is mainly composed of n-octyl group and/or other isomers, said nonyl group is mainly composed of n-nonyl group and/or other isomers, and said decyl group is mainly composed of n-decyl group and/or other isomers.

22. The ink for ink jet recording according to claim 19, wherein $n_2$ and $m_2$ in the general formula (2) are from 0 to 10 and from 1 to 5, respectively.

23. The ink for ink jet recording according to claim 19, wherein the average molecular weight of said material represented by the general formula (2) is 2,000 or less.

24. The ink for ink jet recording according to claim 19, wherein said acetylene glycol-based surface active agent and acetylene alcohol-based surface active agent each are 2,4-dimethyl-5-hexyne-3-ol, 2,4,7,9-tetramethyl-5-desyne-4,7-diol, 3,6-dimethyl-4-octine-3,6-diol and/or 2,4-dimethyl-5-hexyne-3-ol, 2,4,7,9-tetramethyl-5-desyne-4,7-diol or 3,6-dimethyl-4-octine-3,6-diol having 30 or less ethylene oxy groups and/or propylene oxy groups added thereto on the average.

25. The ink for ink jet recording according to claim 19, wherein said 1,2-alkylene glycol is 1,2-($C_{4-10}$ alkyl)diol.

26. The ink for ink jet recording according to claim 19, wherein said glycol ether is one or a mixture of two or more selected from the group consisting of diethylene glycol mono($C_{4-8}$ alkyl)ether, triethylene glycol mono($C_{4-8}$ alkyl) ether, propylene glycol mono($C_{3-6}$ alkyl)ether and dipropylene glycol mono($C_{3-6}$ alkyl)ether.

27. A process for the preparation of an ink for ink jet recording which comprises treating the surface of a particulate pigment with a treatment containing sulfur to allow a sulfur-containing dispersibility providing group to be chemically bonded to the particulate pigment, and then mixing said particulate pigment thus treated with a penetrating agent and water, characterized in that said treatment is used in such an amount that the amount of the sulfur-containing dispersibility providing group to be incorporated is $10 \times 10^{-6}$ equivalent or more per g of the particulate pigment.

28. The process for the preparation of an ink for ink jet recording according to claim 27, wherein said sulfur-containing dispersibility providing group is a sulfonic acid group (—$SO_2OH$) and/or sulfinic acid group (—$RSO_2H$ in which R is a $C_{1-12}$ alkyl or phenyl group or modification product thereof).

29. The process for the preparation of an ink for ink jet recording according to claim 27, wherein there is provided a step of subjecting sulfonic acid group and/or sulfinic acid group to ionic dissociation in the ink before the addition of the ink solvent.

30. The process for the preparation of an ink for ink jet recording according to claim 27, wherein the absolute value of zeta-potential of particulate pigment at 20° C. and pH value of from 8 to 9 in a diluted ink solution obtained by diluting the ink with ion-exchanged water such that the concentration of the foregoing particulate pigment is from 0.001 to 0.01% by weight is 30 mV or more.

31. A process for the preparation of an ink for ink jet recording which comprises allowing a sulfonic acid anion group and/or a sulfinic acid anion group —$RSO_2$, wherein R is a $C_{1-12}$ alkyl or phenyl group or modification product thereof, to be chemically bonded to the surface of a particulate pigment in an amount of $10 \times 10^{-6}$ equivalent or more per g of the particulate pigment, and then mixing the particulate pigment thus treated with a penetrating agent and water, said ink comprising a counter cation of the sulfonic acid anion group and/or the sulfinic acid anion group that is selected from the group consisting of alkaline metal ions and monovalent ions represented by the chemical formula $(R_1R_2R_3R_4N)^+$ wherein $R_1$, $R_2$, $R_3$, and $R_4$ may be the same or different and each represents a hydrogen atom, alkyl group, hydroxylalkyl group or halogenated alkyl group.

32. The process for the preparation of an ink for ink jet recording according to claim 31, wherein said counter cation of the sulfonic acid anion group and/or said counter cation of the sulfinic acid anion group comprises at least one of lithium ion ($Li^+$), sodium ion ($Na^+$), potassium ion ($K^+$), ammonium ion ($NH_4^+$) and alkanolamine cation.

33. The process for the preparation of an ink for ink jet recording according to claim 31, wherein said counter cation of the sulfonic acid anion group and/or counter cation of the sulfinic acid anion group comprises at least $Na^+$ and $NH_4^+$.

34. The process for the preparation of an ink for ink jet recording according to claim 31, wherein the total amount of alkaline metal ion in the liquid component (vehicle) of the ink is 10,000 ppm or less.

35. An ink set for ink jet recording comprising a black ink, yellow ink, a magenta ink and a cyan ink, each of said inks comprising at least a pigment, a penetrating agent and water, wherein said pigment of each of said black, yellow, magenta and cyan inks is a surface-treated particulate pigment having a sulfur-containing dispersibility providing group chemically bonded to the surface thereof with a treatment containing sulfur and wherein the amount of said dispersibility providing group in said surface-treated particulate pigment is $10 \times 10^{-6}$ equivalent or more per g of particulate pigment.

36. The ink set for ink jet recording according to claim 35, wherein said black surface-treated pigment is carbon black, said yellow surface-treated pigment comprises one or two or more selected from the group consisting of C.I. pigment yellow 55, 74, 97, 109, 110, 128, 138, 147, 151, 154 and 180, said magenta surface-treated pigment comprises one or two or more selected from the group consisting of C.I. pigment red 122, 202 and 209, and C.I. pigment violet 19, and said cyan surface-treated pigment comprises one or two or more selected from the group consisting of C.I. pigment blue 15, 15:1, 15:2, 15:3, 15:4, 15:6 and 16.

37. An ink set for ink jet recording comprising a black ink, yellow ink, a magenta ink, a cyan ink, an orange ink and a green ink, each of said inks comprising at least a pigment, a penetrating agent and water, wherein said pigment of each of the black, yellow, magenta, cyan, orange and green inks is a surface-treated particulate pigment having a sulfur-containing dispersibility providing group chemically bonded to the surface thereof with a treatment containing sulfur and wherein the amount of said dispersibility providing group in said surface-treated particulate pigment is $10 \times 10^{-6}$ equivalent or more per g of particlate pigment.

38. The ink set for ink jet recording according to claim 37, wherein said black surface-treated pigment is carbon black, said yellow surface-treated pigment comprises one or two or more selected from the group consisting of C.I. pigment yellow 55, 74, 97, 109, 110, 128, 138, 147, 151, 154 and 180, said magenta surface-treated pigment comprises one or two or more selected from the group consisting of C.I. pigment red 122, 202 and 209, and C.I. pigment violet 19, said cyan surface-treated pigment comprises one or two or more selected from the group consisting of C.I. pigment blue 15, 15:1, 15:2 15:3, 15:4, 15:6 and 16, said orange surface-treated pigment comprises one or two or more selected from the group consisting of C.I. pigment orange 43 and 36, and said green surface-treated pigment comprises one or two or more selected from the group consisting of C.I. pigment green 7 and 36.

39. The ink set for ink jet recording according to claim 35, wherein the amount of said dispersibility providing group in said surface-treated particulate pigment is $10 \times 10^{-6}$ equivalent or more per g of particulate pigment.

40. An ink cartridge comprising an ink impregnating foam and an ink incorporated in the ink impregnating foam, wherein said ink comprises at least a particulate pigment having a sulfur-containing dispersibility providing group provided on the surface thereof, a penetrating agent and a liquid component comprising water, said liquid component comprising polyvalent metal ions that, upon deposition of the ink onto a recording medium, interact with the sulfur-containing dispersibility providing group to enhance a print quality of an image formed on the recording medium as compared with an image formed by deposition of the ink without the sulfur-containing dispersibility providing group, said liquid component having a sulfur content that 2,000 ppm or less as calculated in terms of $SO_4^{2-}$.

41. The ink cartridge according to claim 40, wherein said pigment is a carbon black pigment and/or organic pigment.

42. The ink cartridge according to claim 40, wherein said penetrating agent is an acetylene glycol-based surface active agent, acetylene alcohol-based surface active agent, 1,2-alkylene glycol and/or glycol ether.

43. The ink cartridge according to claim 40, wherein said ink impregnating foam is a urethane foam.

44. The ink cartridge according to claim 43, wherein said urethane foam is a urethane foam which is prepared in the presence of an organic metal compound as a catalyst.

45. The ink cartridge according to claim 44, wherein the added amount of said organic metal compound is from 0.01 to 0.2% by weight based on the weight of said urethane foam.

46. The ink cartridge according to claim 40 wherein the total amount of metallic ions and other polyvalent metallic ions from said organic metal compound catalyst contained in the liquid component of the ink is 800 ppm or less.

47. The ink cartridge according to claim 40, which is an ink cartridge for ink jet recording apparatus.

* * * * *